United States Patent
Broka et al.

[11] Patent Number: 5,809,483
[45] Date of Patent: Sep. 15, 1998

[54] ONLINE TRANSACTION PROCESSING SYSTEM FOR BOND TRADING

[76] Inventors: S. William Broka, 4401 Dolphin La., Alexandria, Va. 22309; Michael P. Walsh, 183 Sarles La., Pleasantville, N.Y. 10570; Deborah M. Clowney, 305 W. 98th St., New York, N.Y. 10025; Walter E. Stewart, 481 Jersey Ave., Apt. #3, Jersey City, N.J. 07302; Daniel R. DiSisto, 85 Sherwood Rd., Easton, Conn. 06612; Beth E. Weimer, 730 Azalea Dr., Rockville, Md. 20850; Eugene A. Callan, 6 Willow La., Campbell Hall, N.Y. 10916; Robert N. Reiss, 9928 Kentsdale Dr., Potomac, Md. 20854; Mark D. DuMont, 67 Chestnut Hill, Glen Ridge, N.J. 07028

[21] Appl. No.: 970,435

[22] Filed: Nov. 14, 1997

Related U.S. Application Data

[63] Continuation of Ser. No. 242,646, May 13, 1994, abandoned.

[51] Int. Cl.⁶ ................................................... G06F 17/60
[52] U.S. Cl. ............................................................. 705/37
[58] Field of Search .............................. 705/35, 36, 37, 705/38, 39

[56] References Cited

U.S. PATENT DOCUMENTS

| | | | |
|---|---|---|---|
| 4,903,201 | 2/1990 | Wagner et al. | 364/408 |
| 5,003,473 | 3/1991 | Richards | 364/408 |
| 5,077,665 | 12/1991 | Silverman | 364/408 |
| 5,101,353 | 3/1992 | Lupien et al. | 364/408 |
| 5,227,967 | 7/1993 | Bailey | 364/408 |
| 5,230,048 | 7/1993 | Moy | 395/600 |
| 5,231,571 | 7/1993 | D'Agostino | 364/408 |
| 5,245,535 | 9/1993 | Weiss et al. | 364/407 |
| 5,270,922 | 12/1993 | Higgins | 364/408 |
| 5,375,055 | 12/1994 | Tougher et al. | 364/408 |

OTHER PUBLICATIONS

"NASD to launch junk bond pricing system," Wall Street and Technology, v10, n10 p. 12, May 1993.

Mitchell, Constance, "Hourly Price Quotes on some Junk Bonds Planned in Bid to Curb Unruly Trading" The Wall Street Journal, Sec. C, P. 1, Nov. 11, 1992.

"NASD Submits Plan for Junk Bond Price–quote System to Regulators," Knight Ridder, Nov. 10, 1992.

*Primary Examiner*—Edward R. Cosimano
*Assistant Examiner*—Barton L. Bainbridge
*Attorney, Agent, or Firm*—Finnegan, Henderson, Farabow, Garrett & Dunner, L.L.P.

[57] ABSTRACT

A system for monitoring information about debt securities and reporting trades in the debt securities market. The system includes user stations and a host processor. Users input data requests and trade information to the user stations which transmit the requests and trade information to the host processor. The host processor processes information about the trades and requests for information using databases which contain various types of information about the debt securities and users. The host processor transmits processed trade information and requested information to the user stations which present the information to the users.

23 Claims, 49 Drawing Sheets

| FIELD NUMBER | NAME | SIZE IN CHARACTERS | FIELD NUMBER | NAME | SIZE IN CHARACTERS |
|---|---|---|---|---|---|
| 1 | CUSIP | 9 | 29 | R_SF_5D | 10 |
| 2 | NAME | 30 | 30 | R_OTHER_1 | 8 |
| 3 | NAME2 | 30 | 31 | R_OTHER_1D | 10 |
| 4 | DESCRIPTION | 30 | 32 | R_OTHER_2 | 8 |
| 5 | COUPON | 6 | 33 | R_OTHER_2D | 10 |
| 6 | MATURITY | 10 | 34 | R_OTHER_3 | 8 |
| 7 | I_DATES | 8 | 35 | R_OTHER_3D | 10 |
| 8 | INDUS_CODE | 4 | 36 | R_OTHER_4 | 8 |
| 9 | AMOUNT_OUT | 10 | 37 | R_OTHER_4D | 10 |
| 10 | R_REG_1 | 8 | 38 | R_OTHER_5 | 8 |
| 11 | R_REG_1D | 10 | 39 | R_OTHER_5D | 10 |
| 12 | R_REG_2 | 8 | 40 | EXCHANGABLE | 1 |
| 13 | R_REG_2D | 10 | 41 | EXTENDABLE | 1 |
| 14 | R_REG_3 | 8 | 42 | ADJUSTABLE | 1 |
| 15 | R_REG_3D | 10 | 43 | ZERO | 1 |
| 16 | R_REG_4 | 8 | 44 | OID | 1 |
| 17 | R_REG_4D | 10 | 45 | HRO | 1 |
| 18 | R_REG_5 | 8 | 46 | I_ACCRUAL | 10 |
| 19 | R_REG_5D | 10 | 47 | FIST_COUP | 10 |
| 20 | R_SF_1 | 8 | 48 | EXC | 3 |
| 21 | R_SF_1D | 10 | 49 | TYPE | 3 |
| 22 | R_SF_2 | 8 | 50 | RATING | 4 |
| 23 | R_SF_2D | 10 | 51 | ACTION | 1 |
| 24 | R_SF_3 | 8 | 52 | RT_CURR_DT | 10 |
| 25 | R_SF_3D | 10 | 53 | RTG_PRIOR | 4 |
| 26 | R_SF_4 | 8 | 54 | RN_IDATES | 3 |
| 27 | R_SF_4D | 10 | 55 | ISSUE_DATE | 10 |
| 28 | R_SF_5 | 8 | 56 | CUSIP_OLD | 9 |

| INPUT TO FIPS SERVER | OUTPUT FROM FIPS SERVER |
|---|---|
| THE CTCI SERVICE SENDS IPC MESSAGES REGARDING TRADE REPORTS. | THE FIPS SERVER SENDS IPC MESSAGE REPLIES REGARDING TRADE REPORTS TO THE CTCI SERVICE. |
| | THE FIPS SERVER WRITES MESSAGES TO THE BROADCAST QUEUE. |
| THE COMMUNICATION SERVICE SENDS IPC MESSAGES. | THE FIPS SERVER SENDS IPC MESSAGE REPLIES TO THE COMMUNICATION SERVICE |
| | THE FIPS SERVER WRITES DATABASE CHANGES TO THE DATABASE CHANGE LOG. |
| THE FIPS SERVER READS THE S & P STAGING FILE FOR CHANGES TO BOND ISSUE DATA. | |
| THE FIPS SERVER READS THE FIPS DATABASE. | THE FIPS SERVER WRITES TO THE FIPS DATABASE. |
| THE EVENT TIMER SERVICE SENDS IPC MESSAGES WHEN TIMERS EXPIRE. | |

*FIG. 6*

| FIELD | DESCRIPTION |
|---|---|
| DATE | THE CALENDAR DATE THAT THE TRADE WAS REPORTED. |
| SIDE | A BUY OR SELL INDICATOR FROM THE USER'S POINT OF VIEW. |
| QTY($000) | THE PAR OR FACE VALUE (IN THOUSANDS OF DOLLARS) TRADED FOR THAT TRADE IN THE ISSUE. |
| SYMBOL | THE SYMBOL REPRESENTING THE BOND ISSUE. |
| RATE | THE COUPON RATE OF THE BOND ISSUE. |
| YEAR | THE YEAR THE BOND ISSUE MATURES. |
| PRICE | A NUMERIC DOLLAR VALUE OF THE TRADE AGREED ON BY TWO PARTIES INVOLVED. |
| CONTRA | THE PARTICIPANT SYMBOL (CORPORATION, BROKER, OR DEALER) REPRESENTING A PARTY TO THE TRANSACTION. A DEALER ENTERS A 'C' IF THE CONTRA IS A CUSTOMER. |
| CAP | THE CAPACITY IS PRINCIPAL, AGENT, OR RISKLESS PRINCIPAL ROLE IN THIS TRADE. |
| AS OF DATE | THIS IS A CALENDAR DATE THAT INDICATES THE DAY THE TRADE WAS EXECUTED. THIS DATE IS LESS THAN THE REPORT DATE. |
| EXEC TIME | THE TIME THE TRADE WAS EXECUTED. |
| FIPS C/N | AN INTERNAL FIPS NUMBER ASSIGNED BY THE SYSTEM. |
| ST | AN INDICATOR OF THE TRADE'S STATUS, OR STATE: 'C' = CANCELED, 'N' = NO WAS (MODIFIED), BLANK = OK. |

REGISTER TO QUOTE

FIPS SECURITIES

| SYMBOL | RATE | YEAR | NAME | STAT. | REG. |
|--------|------|------|------|-------|------|
| A.ZZ | 06.750 | 1999 | A.ZZ NAME | A | |
| AAA.AA | 04.500 | 2010 | AAA.AA NAME | A | |
| AAG.GA | 11.125 | 2003 | AMER ANNUITY | A | |
| ALG.GD | 09.450 | 1995 | ARKLA | A | |
| AS.GA | 08.700 | 1995 | ARMCO | A | Y |
| AS.GB | 9.200 | 2000 | ARMCO | A | Y |
| B.ZZ | 08.250 | 2006 | B.ZZ NAME | A | Y |
| BB.ZZ | 08.750 | 1998 | BB.ZZ NAME | A | Y |
| C.ZZ | 04.500 | 1998 | C.ZZ NAME | A | |

[ OK ]   [ CANCEL ]

*FIG. 22*

| SYMBOL | RATE | YEAR | NAME | DESCRIPTION | NEXT CALL | CALL PRICE | FIPS | STATUS |
|---|---|---|---|---|---|---|---|---|
| AS.GA | 08.700 | 1995 | ARMCO | SF DEB | 07/14/1994 | 100.9200 | Y | A |
| AS.GB | 9.200 | 2000 | ARMCO | SF DEB | 08/31/1994 | 101.2300 | Y | A |
| AS.GC | 8.500 | 2001 | ARMCO | SF DEB | 08/31/1995 | | | A |
| AS.GD | 13.500 | 1994 | ARMCO | SR NTS | 10/14/1997 | 102.0000 | | A |
| AS.GE | 11.375 | 1999 | ARMCO | SR NTS | 10/14/1998 | | | — |
| AUR.GA | 9.250 | 1996 | AURORA ELECTR | SR SUB NTS 'A' | 08/31/1996 | | | — |
| AUR.GB | 9.250 | 1996 | AURORA ELECTR | SR SUB NTS 'B' | | | | — |
| AZR.GA | 11.000 | 2002 | AZTAR CORP | SRSUB NTS | 09/30/1997 | 103.1430 | | A |
| B.ZZ | 08.250 | 2006 | B.ZZ NAME | B.ZZ DESC | 09/30/1998 | | Y | A |
| BB.ZZ | 08.750 | 1998 | BB.ZZ NAME | | | | Y | — |
| BBB.GA | 10.875 | 1999 | BALTIMORE BANC | SUB CAPNTS | 09/30/1999 | | | — |

BROWSE REPORTS

BROWSE PARTICIPANTS

| ID | PARTICIPANT NAME | ROLE | TELEPHONE |
|---|---|---|---|
| ALEX | ALEX NOSIARA | B | 716-381-3820 |
| ANILT | ANIL MANDAVA | B | |
| BILL 1 | BILL RYAN | B | |
| BROKERB | WE QUOTEM YOU BUYEM | B | |
| BROKERB | COWABUNGA BONDS | B | 800-800-8000 |
| EDTEST | TEST FIRM | B | |
| GOLDSAB | GOLDMAN SACHS | B | 716-381-3819 |
| JOSTEST | FIPS TEST PARTICIPANT NAME | B | 1-900-382-5968 |
| KJKJH | ADF | B | |
| RAMESHB | RAMESH & CO | B | |
| RYAN9S | FIPS TEST PARTCIPANT NAME | B | 1 900 382 5968 |

CANCEL

FIG. 40

| CATEGORY | UOW NUMBER | MESSAGE NAME | USED IN API OR SYS ADMIN ONLY | BROADCAST REPLY |
|---|---|---|---|---|
| SECURITY | 1 | LOGON | API | |
| | 2 | LOGOFF | API | |
| | 3 | PASSWORD CHANGE | API | |
| | 4 | LOG MESSAGE | API | |
| | 5 | ASSUME PARTICIPANT | SYS ADMIN ONLY | |
| INFRASTRUCTURE | 6 | BROADCAST MESSAGE LIST | API | |
| TRADE REPORTS | 101 | TRADE UPDATE | API | |
| | 103 | TRADE CANCEL | API | |
| | 104 | TRADE BROWSE | API | |
| | 110 | TRADE SUMMARY | API | BROADCAST |
| QUOTES | 201 | QUOTE UPDATE | API | |
| | 203 | QUOTE STATUS CHANGE | API | |
| | 220 | INSIDE BID ASK | API | BROADCAST |
| | 221 | QUOTE DATA | API | BROADCAST |
| | 222 | QUOTE PARTICIPANT LIST | API | |
| BOND ISSUES | 301 | ISSUE UPDATE | SYS ADMIN ONLY | |
| | 302 | ISSUE VIEW | SYS ADMIN ONLY | |
| | 303 | ISSUE BROWSE | API | |
| | 304 | ISSUE DELETE | SYS ADMIN ONLY | |
| | 305 | ISSUE SYMBOL LIST | API | |
| | 306 | ISSUE STATUS CHANGE | SYS ADMIN ONLY | |
| | 310 | DEALER REGISTRTAION BROWSE | API | |
| | 320 | DEALER REGISTER/DEREGISTER | API | |
| | 330 | ISSUE DATA | API | BROADCAST |
| MARKET SERVICES | 401 | MARKET SERVICE UPDATE | SYS ADMIN ONLY | |
| | 402 | MARKET TIMES VIEW | SYS ADMIN ONLY | |
| | 410 | MARKET STATUS | API | BROADCAST |
| NEWS | 420 | NEWS ADD | SYS ADMIN ONLY | |
| | 421 | NEWS BROWSE | API | |
| | 422 | NEWS BROADCAST | API | BROADCAST |
| | 423 | NEWS DELETE | SYS ADMIN ONLY | |
| STATISTICS | 430 | SYS ADMIN STATISTICS | SYS ADMIN ONLY | |
| TIMERS | 450 | TIMER UPDATE | SYS ADMIN ONLY | |
| | 451 | TIMER BROWSE | SYS ADMIN ONLY | |
| | 452 | PARTICIPANT TIMER BROWSE | SYS ADMIN ONLY | |
| PARTICIPANTS & USERS | 501 | PARTICIPANT UPDATE | SYS ADMIN ONLY | |
| | 502 | PARTICIPANT VIEW | SYS ADMIN ONLY | |
| | 503 | PARTICIPANT BROWSE | API | |
| | 504 | PARTICIPANT DELETE | SYS ADMIN ONLY | |
| | 506 | PATICIPANT STATUS CHANGE | SYS ADMIN ONLY | |
| | 520 | USER UPDATE | SYS ADMIN ONLY | |
| | 521 | USER VIEW | SYS ADMIN ONLY | |
| | 522 | USER DELETE | SYS ADMIN ONLY | |
| | 531 | PARTICIPANT ISSUE SUSP RESUME | SYS ADMIN ONLY | BROADCAST |

*FIG. 58*

ONLINE TRANSACTION PROCESSING SYSTEM FOR BOND TRADING

This is a continuation of application Ser. No 08/242,646, filed May 13, 1994 now abandoned.

BACKGROUND OF THE INVENTION

The present invention relates generally to online processing of bond securities transactions in a multi-user environment, and more particularly to a transaction processing system for a bond market.

Bond securities are really thought of as including debt securities and actively traded, high-yield corporate notes. Currently brokers trade bonds using person-to-person telephone contact. For example, most data vendors disseminate market information for bonds by polling dealers for representative quotes. Some dealers also disseminate their own quote information.

As can be appreciated, the current bond trading system has several problems. One is that transfer of information in such systems is slow and inaccurate. Trades must rely on potentially outdated information transmitted by unreliable communication methods. As a result, the system is prone to errors and abuses. These shortcomings, and the lack of regulation in the bond market caused many investors to lose a great deal of money in junk bonds during the 1980's.

To correct problems in the bond market, the Securities and Exchange Commission (SEC) recently formulated rules for bond trading in File No. SR-NASD-92-45. These rules are intended to bring greater transparency to the bond market so traders can have accurate and timely information in bond process and trades.

Transparency is the hallmark of the highly-regulated stock or equities market. Several computerized trading systems, such as the NASD Workstation developed by the National Association of Securities Dealers (NASD), provide an on-line system for trading securities which greatly enhances the transparency of the stock market, and thus improves the ability of traders to receive accurate and timely trade information.

It is an object of this invention to provide greater transparency, reliability, and regulation to the trading of bond securities, it is an object of this invention to provide a computerized trading platform to record trades and quotes.

It is another object of this invention to provide a simple-to-use platform for users to post bond quotes for dissemination to other users.

It is yet another object of this invention to provide a computerized trading platform for monitoring trade activities in the bond trading arena for compliance with SEC regulations.

SUMMARY OF THE INVENTION

Accordingly, a regulated, computerized bond trading system has been developed to gather quote and trade information from several bond traders and other users, and to organize and disseminate such information quickly and reliably.

More specifically, system for reporting the trading of debt issues has been developed which comprises a host processing system containing issue databases having information about debt issues available to be traded, and trade databases containing data about trades of the debt issues available to be traded; and a plurality of user stations, connected to the host processing system, for providing users an ability to access the issue and trade databases, said user stations including display means for displaying data from the issue databases and the trade databases, input means for receiving user inputs about trades of the issues available to be traded and identifying the data from the issue databases and the trade databases to be displayed on the display means for providing to the host processing system the user inputs, and communications means for receiving the data to be displayed from the host processing system and for transmitting the user inputs to the host processing system.

DETAILED DESCRIPTION OF THE DRAWINGS

The accompanying drawings, which are incorporated in and constitute a part of the specification, illustrate presently preferred embodiments of the invention and, together with the general description of the preferred embodiment given below, serve to explain the operation of the invention.

FIG. 3 is an illustration of a Standard & Poor's flat file as shown in FIG. 2;

FIG. 6 is an illustration of the inputs and outputs to the FIPS server of FIGS. 4 and 5;

FIG. 15 is a table explaining the fields displayed on the Maintain Trade Report window;

FIG. 17($b$) is an illustration of a Quote Management Menu for a broker;

FIG. 18($b$) is an illustration of a Enter Quote window for a broker;

FIG. 20($b$) is an illustration of a Quote Book window for a broker;

FIG. 22 is an illustration of a Register to Quote window;

FIG. 38 is an illustration of a Browse Issues window;

FIG. 40 is an illustration of a Browse Participants window;

FIG. 58 is an illustration of the UOW codes for the IPC messages shown in FIGS. 57(a) and 57(b).

DETAILED DESCRIPTION OF THE PREFERRED EMBODIMENTS

TABLE OF CONTENTS

Figure 1:
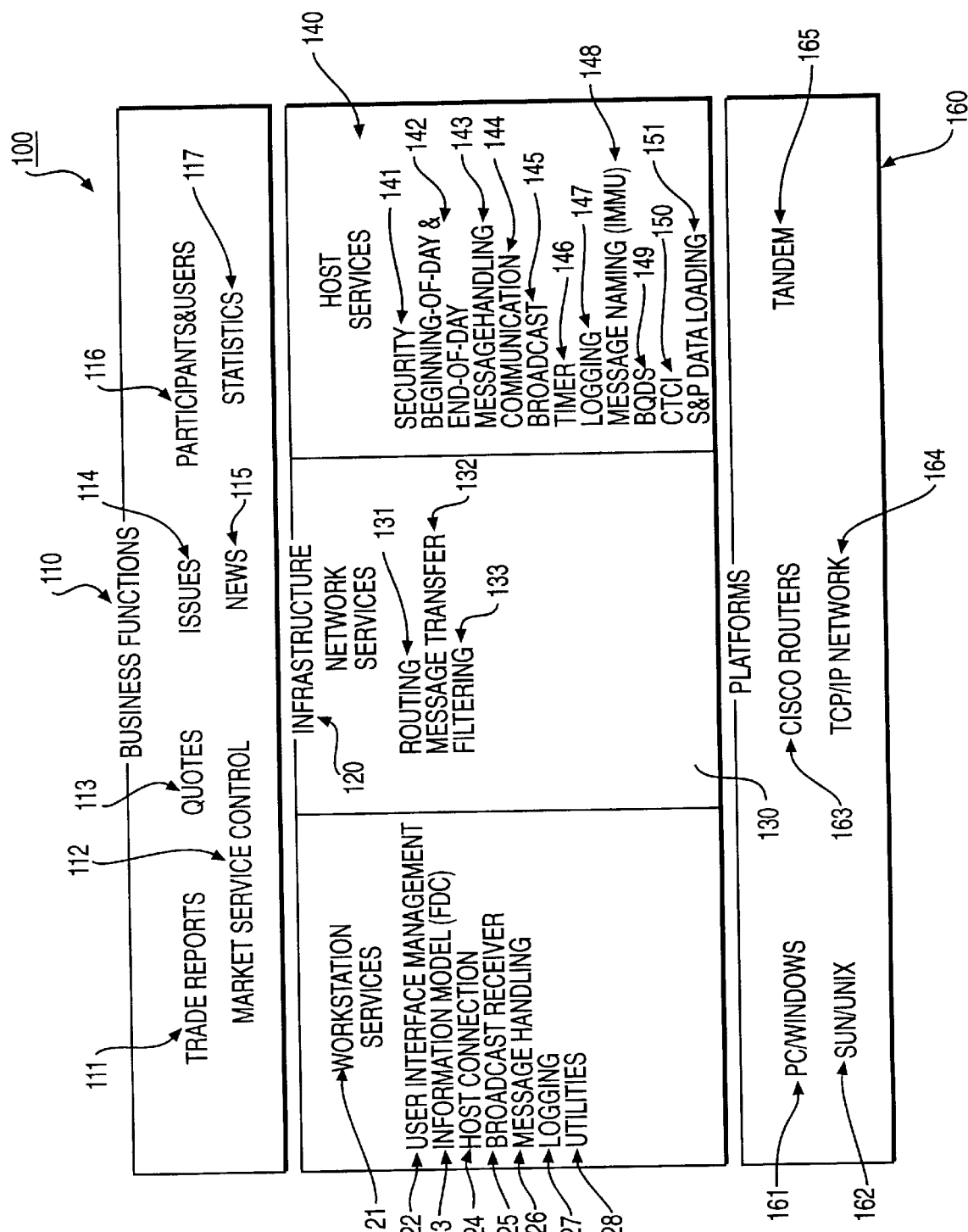
FIG. 1 is an illustration of the functional architecture for the Fixed Income Pricing System (FIPS) according to this invention.

A. DEFINITIONS
B. SYSTEM OVERVIEW
C. SYSTEM ARCHITECTURE
   1. General Software Functions
   2. Hardware
   3. Data Flow
D. USER MENUS
   1. Initiation
   2. Trade Management
      a. Enter Trade Report
      b. Maintain Trade Report
   3. Quote Management
      a. Enter Quote
      b. Withdraw/Restore Quote
      c. Quote Book
      d. Register To Quote
   4. Market Management
      a. View Market
      b. View Broker/View Dealer
      c. Maintain Group
   5. Directory Services
      a. Browse Issues
      b. Browse Participants
   6. Utilities
E. SYSTEM ADMINISTRATION
   1. System Control
      a. Control Times
      b. Manage Market Defaults
      c. Compose News
      d. System News
      e. Statistics
      f. Exit
   2. Authorizations
      a. Authorize Issues
      b. Authorize Participants
   3. Directory Services
F. MESSAGE FORMATS
I. DEFINITIONS Before describing the details of the preferred implementation, it would be helpful to define certain terms which are frequently used in this description. Other definitions will either appear as part of the description or be obvious from usage.

As explained above, a "bond" is a debt instrument used by corporations to raise capital funds. While a bond may come in various forms, they are usually for a fixed term at a fixed interest rate. Bond trading begins when a party having a bond or acting for an owner of a bond sets an "ask" price and a purchaser sets a "bid" price. When a seller and a buyer agree to a particular price, a "trade" is completed.

A "quote" may be an "ask" price, a "bid" price, or a combination of both an "ask" price and a "bid" price.

The competing interests between buyers and sellers creates the market and defines its operation. The situation representing the best price for buyers and sellers is called the inside quote. The inside quote consists of the highest offer and/or the lowest bid.

Trades are initiated and completed by individuals, firms, dealers, who may be either individuals or firms, and brokers. The actual participants to a trade are considered principals. Dealers are distinguished from individuals and firms in that they are also involved in issuing bonds. Brokers are agents that trade for others and allow dealers to remain anonymous for particular trades.

The description below uses several other terms and acronyms. Below is a partial list of terms and acronyms and their meanings.

| | |
|---|---|
| Broker's Broker | A synonym for broker. |
| CUSIP | Committee on Uniform Securities Identification Procedures which establishes a CUSIP number to represent a bond issue. |
| FBO | For Benefit Of |
| GUI | Graphical User Interface |
| IPC | Interprocess Communication |
| IPC Message | A message from a requestor consisting of a fixed format header (IPC header) followed by one or more UOWs. |
| No Was Report | When a trade is reported in error and later corrected, information on both reports is saved. The original trade report is the "no" report and the corrected report is the "was" report. |
| UOW | Unit of Work. Each UOW consists of a header, common to all UOWs, and variable data. |

II. SYSTEM OVERVIEW

A specific computerized bond trading system embodying this invention is called the Fixed Income Pricing System or FIPS. FIPS provides a distributed system for managing and reporting trades in the bond market. Users of FIPS manage and report trades and perform other functions using self-explanatory windows and menus. The windows and menus make learning the system easier and reduce opportunities for error.

FIPS can support four different types of users: view-only participants who merely observe the bond market; dealers; brokers; and system administrative users who monitor and control the market. System administrative users may also act as surrogate traders for dealers or brokers.

FIPS provides the following five basic functions to its users: trade management, quote management, market management, director services, and utilities. Each function is described in great detail in the description of user menus below, but following general overview merely explains each of the functions.

Trade management is mainly concerned with reporting trades. A trade report occurs when users enter bond trade information into the FIPS system. FIPS' basic trade reporting functions include entering a trade report, modifying a trade report, and disseminating a report. Other functions include browsing, statistics gathering, and summary updating.

Quote management is mainly concerned with updating bid and ask prices. A quote in FIPS occurs when a user enters a bid and/or offer for a particular bond into FIPS. FIPS' quote management functions include entering, modifying, withdrawing, restoring, and removing quotes. Additional quote management functions include monitoring quote activity, disseminating quote data, and setting market alerts.

Market management allows a user to form groups of specific bond issues, which then become the user's "markets," and to monitor bond information changes directly in the group. Such groups are referred to as "Minder" groups.

Directory services allow users to search databases using different criteria. Two such databases are bond issue and FIPS participant. For example, a user can browse the bond database to find issues for which the user has made quotes or to find issues of a given coupon rate and maturity year. A user can browse the FIPS participant database to list brokers, dealers, or view-only users.

FIPS utilities allowing users to customize certain interfaces and data presentation formats. For example, user may select certain issues to be grouped into "Minder" groups.

In addition to the major functions of trade management, quote management, market management, directory services, and utilities, FIPS includes system administration functions. The system administrator may control the FIPS system, authorize bond issues and participants, browse directory lists of issues and users, and assume the role of a broker, dealer, or view-only user.

Administrators use the system control functions to manage the state (i.e., open, halted, or closed) of FIPS services, set the default times for each state of the FIPS services, and compose FIPS system news. The FIPS administrators control all aspects of the FIPS system including trade reporting, trade summary dissemination, quote management, and directory services.

Finally, FIPS automatically stores all system transactions, including those of the system administrator. This is done for compliance as well as for subsequent analysis by those interested in the market.

The FIPS system includes a host and general user interfaces. One way users may interface with the FIPS host is by way of a FIPS workstation, such as a Sun Workstation running the UNIX operating system, or a 386/486 personal computer running Windows 3.X. The workstation includes a Graphical User Interface (GUI), a full communication interface with a FIPS host, and distributed processing functionality. The FIPS workstation can access the FIPS host using leased or asynchronous lines.

A second way users may access the host is through an application programming interface, API. The API allows users to create their own customized interface for trade reports, bond quotes, and other FIPS function. The API is a library of procedures an application programmer can use to access the various features and systems of FIPS.

A third user interface to FIPS is a dedicated computer-to-computer interface (CTCI) line to connect users with their own computer-based bond information system. A user can only use the CTCI interface for trade reporting, however.

III. SYSTEM ARCHITECTURE

A. General Software Functions

FIG. 1 shows an illustration of the FIPS functional architecture. FIPS processing system 100 includes business functions layer 110, infrastructure layer 120, and platforms layer 160.

Business functions layer 110 provides the basic services accessed by users and includes the following services: Trade Reports 111, Market Services Control 112, Quotes 113, Issues 114, News 115, Participants & Users 116, and Statistics 117. The function of these services will be apparent from the detailed descriptions presented below.

Infrastructure layer 120 includes the communication mechanisms and other tools that allow the various FIPS processes to work together. Infrastructure layer 120 includes workstation services module 121, network services module 130, and host services module 140.

Workstation services module 121 includes those services required to use a workstation and include: User Interface Management 122, Information Model 123, Host Connection 124, Broadcast Receiver 125, Message Handling 126, Logging 127, and Utilities 128. The functions of these services will also be more apparent from the descriptions presented below.

Network services module 130 includes those services which provide access to the entire network. These include: Routing 131, Message Transfer 132, and Filtering 133.

Host services module 140 includes those services provided for the FIPS host and include: Security 141, Beginning-of-Day & End-of-Day 142, Message Handling 143, Communication 144, Broadcast 145, Timer 146, Logging 147, Message Naming 148, bond quotation dissemination system (BDQS) 149, computer-to-computer interface (CTCI) 150, and Standard & Poor's (S&P) Data Loading 151.

Platforms layer 160 includes the software for the presently preferred computer services and hardware to support FIPS. Currently, platforms layer 160 include 386/486 PCs running Windows 3.X 161, Sun workstations running Unix 162, Cicso routers 163, TCP/IP networks 164, and Tandem computers 165.

During most system interactions, one of the services in infrastructure layer 120 will interact with one of the functions in business functions layer 110. For example, the Security service 141 works with the Participant & User business function 116 to authorize and authenticate users when they log on. Different services in infrastructure layer 120 may also communicate with each other. For example, the Broadcast service 145 works with the Communication service 144 to send messages to multiple platforms including PC/Windows 161 and Sun/Unix 162.

Business functions can have relationships with each other as well. For example, FIPS system administrators may use Market Service Control 112 with the Trade Reports 111 to restrict a user's ability to generate trade reports.

B. Hardware

Figure 2:
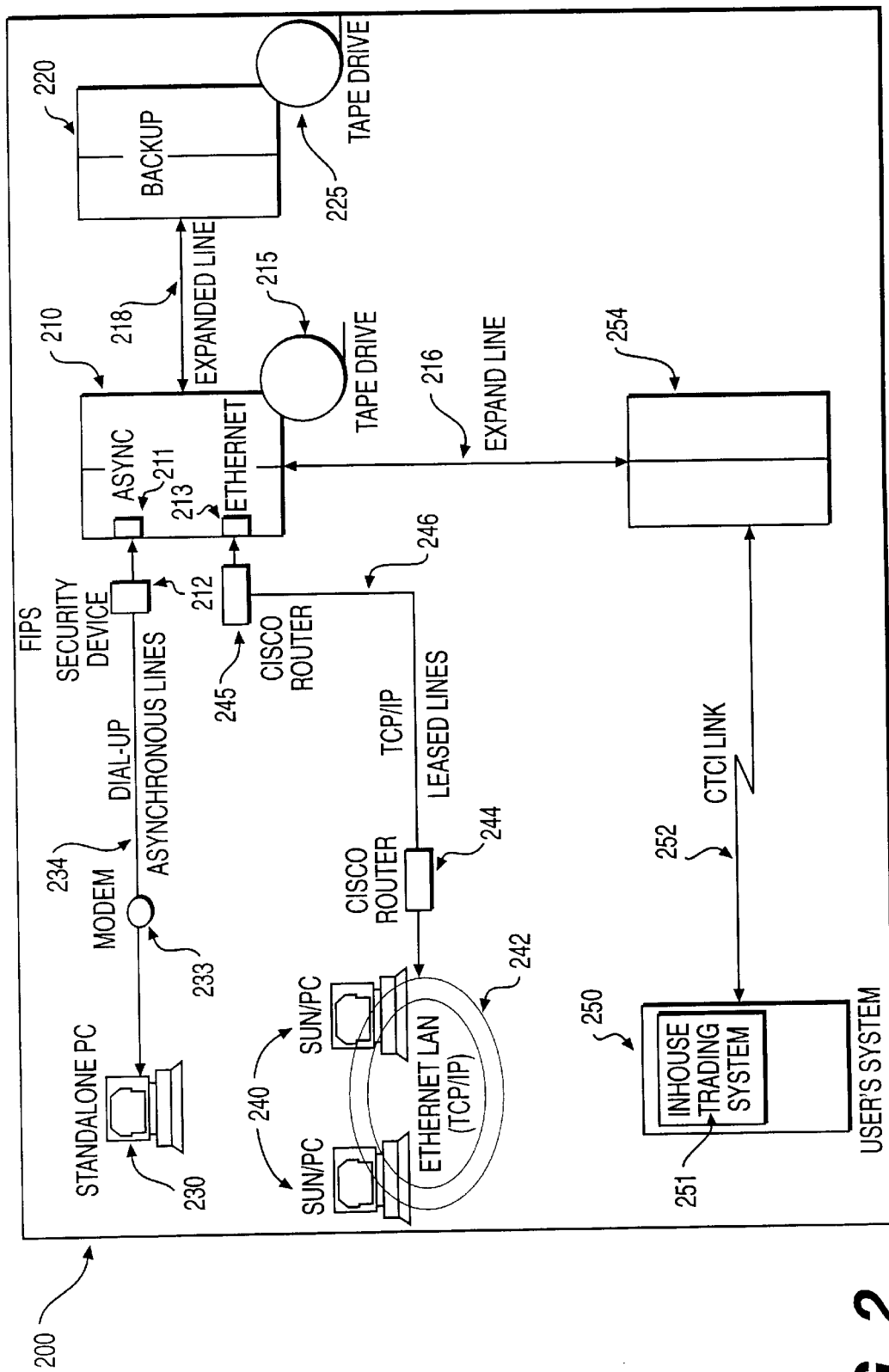
FIG. 2 is an illustration of the FIPS hardware configuration which implements the architecture of FIG. 1.

FIG. 2 shows a general block description of the FIPS hardware configuration 200. FIPS configuration 200 includes a main host 210 with an associated tape drive 215, and a backup host 220 with tape drive 225. Host 210 is connected to backup host 220 via communication line 218. Host 210 also includes an asynchronous connection 211 and an Ethernet connection 213.

Hosts 210 and 220 contain certain FIPS databases with data directly related to trading including issue data, timer data, and other FIPS-system related data. Hosts 210 and 220 also have external files for data needed by both FIPS and other external systems such as CTCI.

Some of the external data files associated with FIPS are a Standard & Poor's file, such as file 300, in FIG. 3, CTCI input and output files for communication with users' computers, a BQDS journal file containing BQDS message formats, and a Corporate Bond Compliance System (CBCS) log file. The CBCS log file includes trade reports and updates, quotes and updates, trading halts and resumptions, suspensions and activations, participant updates, and dealer registrations.

As explained above, users may access the primary system in at least three ways. First, users can employ a stand alone personal computer (PC) 230 with a modem 233 over dial-up asynchronous line 234. After host 210 authorizes the connection, security device 212 dials modem 233 back to establish a connection. In the preferred implementation, PC 230 has at least an Intel 80386 microprocessor running at 33 MHz, 16 MB of random access memory (RAM), 40 MB of free hard disk space, SVGA capability, a monitor, input device, and a floppy type drive. PC 230 can also communicate asynchronously and supports Microsoft Windows 3.X.

Second, users can access FIPS using workstations 240 connected in a network 242, such as an Ethernet network supporting the TCP/IP protocol. Workstations 240 access host 210 using a TCP/IP transport with CISCO routers 244 and 245 at both ends of a leased line 246. In the preferred implementation, workstations 240 must have at least the capabilities of PC 230 and be able to support a TCP-IP protocol and LAN functionality. For example, workstations 240 may be Sun workstations with at least 40 MB free hard disk space, an input device or devices, network capability, and floppy type drive capability. The workstations 240 also support the UNIX System V operating system, a user interface management component, a local information model of data host 210, abort connection management, and a broadcast receiver.

Third, a user may connect their existing computer 250 running an in-house trading system 251 directly to host 210 using a computer to computer interface (CTCI) connected to an equity system 254, which is in turn connected to host 210 via line 216. The equity system 254 allows dissemination of quote information to market data vendors as well as connection to in-house trading systems.

The software platforms of hosts 210 and 220 provide support for networking, remote operations, event monitoring, remote duplication, and distributed processing as shown in element 140 of FIG. 1.

C. Data Flow

Figure 4:
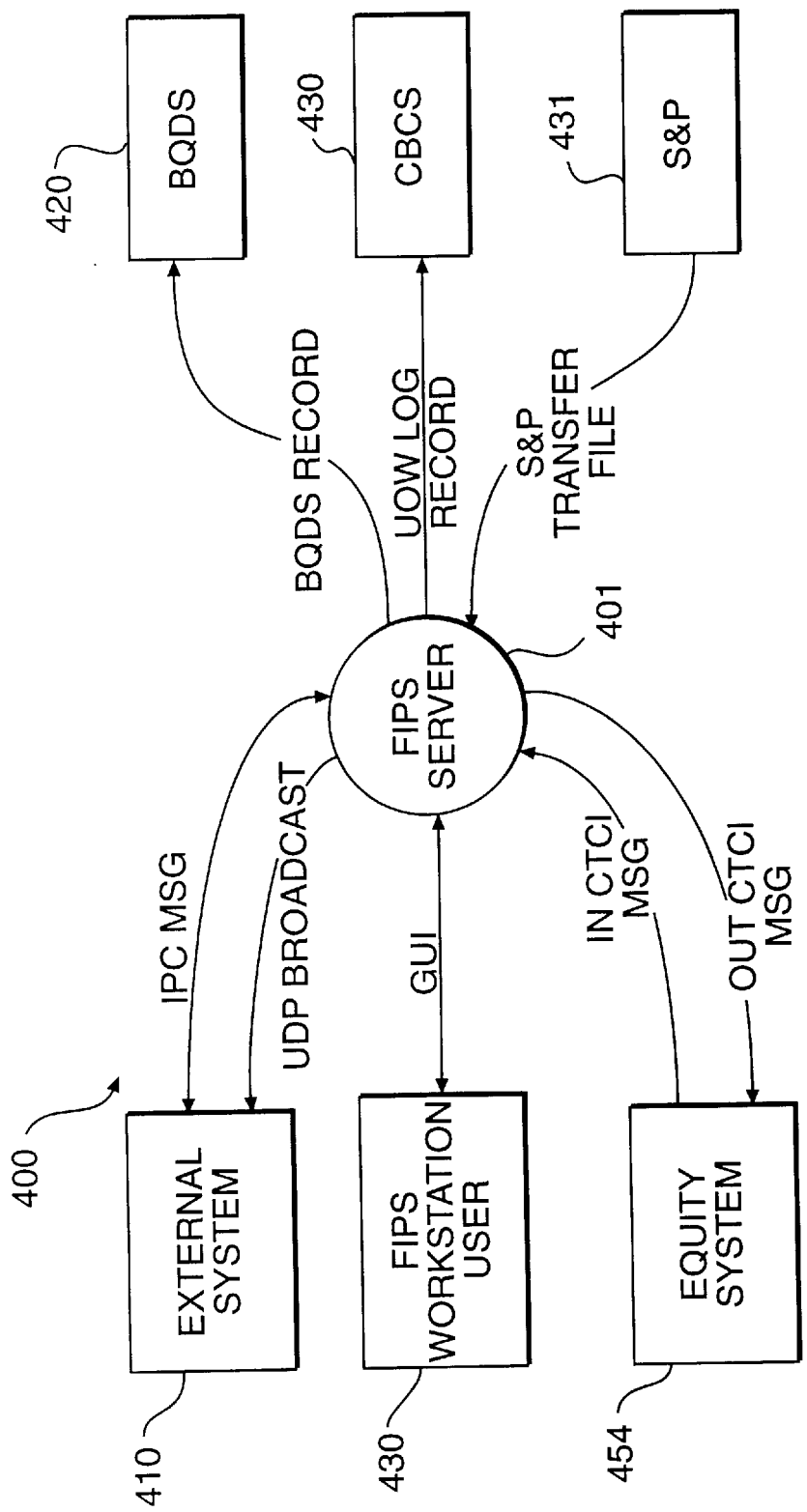
FIG. 4 is an illustration of the interfaces of the FIPS in FIG. 2 with other system.

FIG. 4 shows how the FIPS software in hosts 210 and 220 interface with other systems through FIPS server 401. External system 410, such as a PC 230, accesses FIPS server 401 using the FIPS Application Programming Interface (API) to send IPC Messages and receive automatic updates of database changes by way of UDP broadcast messages. The API consists of a data communication standard for exchanging messages with the FIPS application host and a definition of the message contents.

IPC messages are messages which define specific services and functions to be performed, and includes the data necessary for hosts 210 and 220 to complete the service or function.

FIPS workstations 230 access FIPS server 501 using a GUI interface. This is described in more detail below.

Equity system 254 reports bond trades to and receives replies about the trades from server 401 using CTCI connection 252. The connection is by way of "in" CTCI messages and "out" CTCI messages.

BQDS 420 interfaces with FIPS server 401 to obtain BQDS records. BQDS then provides these records to market data vendors, who disseminate to end users including investors, deals, and the like.

CBCS 430 interfaces with FIPS server 401 to monitor database changes using UOW log records. Persons interested in analyzing bond trading can access CBCS 430 for trading information.

FIPS obtains Standard & Poor's bond issue data by having FIPS server 401 receive a file transfer from the Standard & Poor's system 431. As explained above, FIG. 3 shows the form of such a file.

Figure 5:
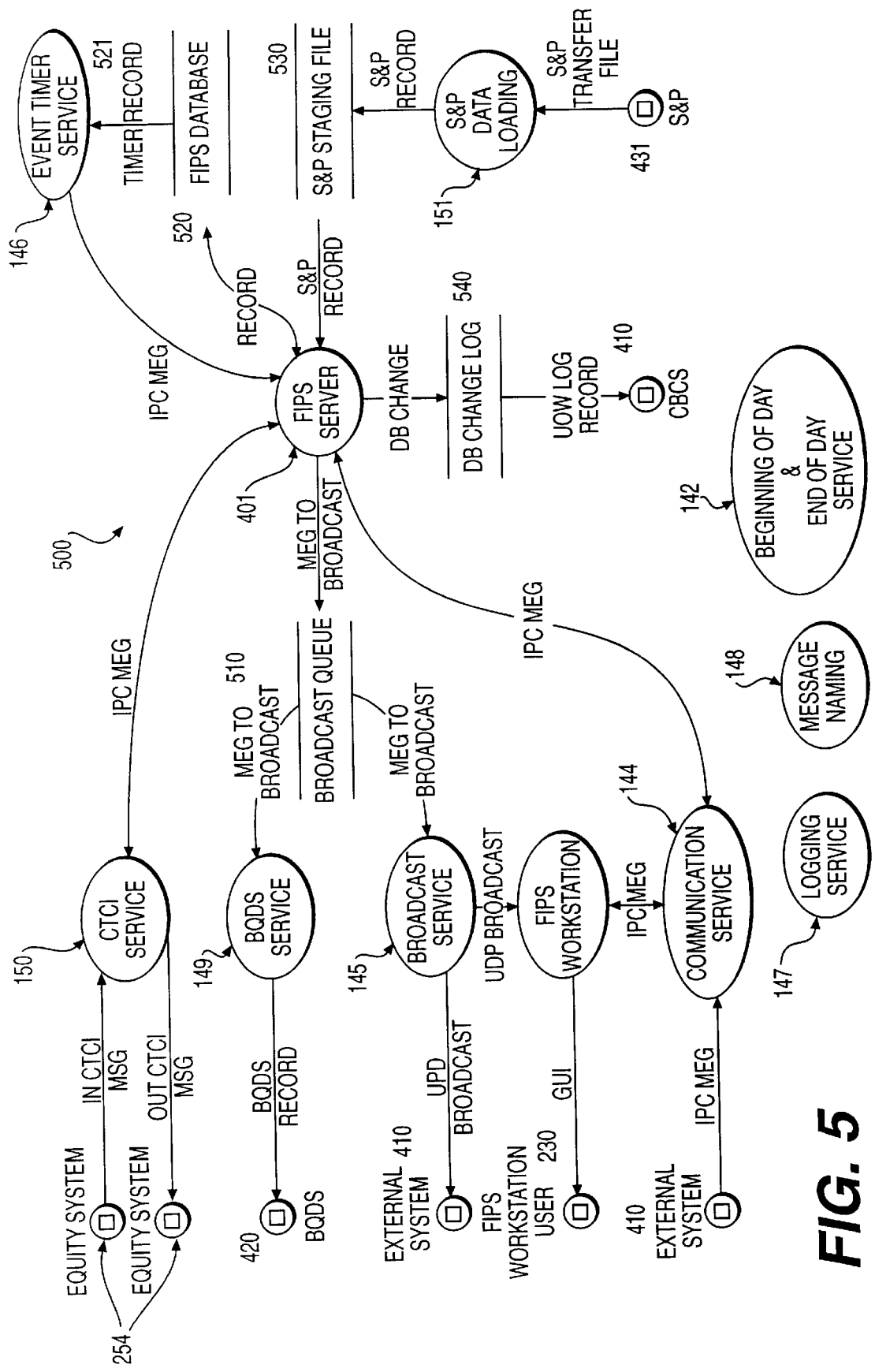
FIG. 5 is an illustration of a Data Model Diagram corresponding to FIGS. 1 and 2.

FIG. 5 shows the data flow of FIG. 4 in greater detail, and demonstrates the operation of the various services shown in FIG. 1.

As the data flow diagram 500 in FIG. 5 shows, CTCI service 150 receives IN CTCI messages from equity system 254 and transmits OUT CTCI messages to equity system 254. CTCI service 150 also communicates with FIPS server 401 using IPC messages regarding trade reports.

BQDS service 149 sends BQDS records to the BQDS 420, and Broadcast Service 145 sends UDP broadcasts to external system 410 and to FIPS workstation service 120. Both BQDS service 149 and broadcast service 145 receive messages to broadcast from a broadcast queue 510 containing messages to be broadcast from FIPS server 401.

The BQDS Processor receives messages from the Broadcast Subsystem in an IPC/UOW format. The BQDS processor then transforms the messages into a format required by the Equity System BQDS, and writes the reformatted message to the BQDS file. The BQDS file is a common file located on the FIPS system that contains a single day's worth of data. The Equity system is responsible for retrieving its required data from the BQDS file. The Equity system reads formatted messages from the BQDS file on the FIPS system via an Expand Line Communications connection.

The Equity system needs the following types of information: a standard message header; quote information with Noquote information (if required); inside information; and volume information.

The BQDS Processor is a server responsible for creating sequential data records of daily activity in the BQDS file. At the beginning of each day, the data in the BQDS file is purged to start as an empty file. Each record in the file is assigned a sequential number as it is entered. The numbers start at zero at the beginning of each day.

On rare occasions, a request for a full download of data will be needed, usually to initialize or synchronize a Market Data Vendor's database. All requests by vendors for retransmission of current data are handled by a process on the Equity system. A program will be run as needed to scan the FIPS database and build the BQDS download file consisting of all quotes and inside information.

FIPS workstation service 120 transmits the UDP broadcast to the FIPS workstation user 210 over a GUI interface, and exchanges IPC messages with communication service 144. Communication service 144 also receives IPC messages from external system 410, and exchanges IPC messages with FIPS server 401.

FIPS server 401 exchanges records with FIPS databases 520. One type of record in database 520, a timer record 521, is sent to a event timer service 146, which generates an IPC message back to FIPS server 401. The S&P service 440 sends the S&P transfer files to S&P data loading service 151 which creates an S&P record that is stored in S&P staging file 530. The records from file 530 are then sent to FIPS server 401.

When there is a change to any FIPS database, FIPS server 401 stores that change in DB change log 540. Log 540 then sends UOW log records to the CBCS 410. The FIPS server 400 also has access to other services, such as logging service 147, message naming service 148, and beginning of day and end of day service 142.

FIG. 6 is a table showing representative inputs to and outputs from the FIPS server 401 involved in the transaction.

Figure 7:
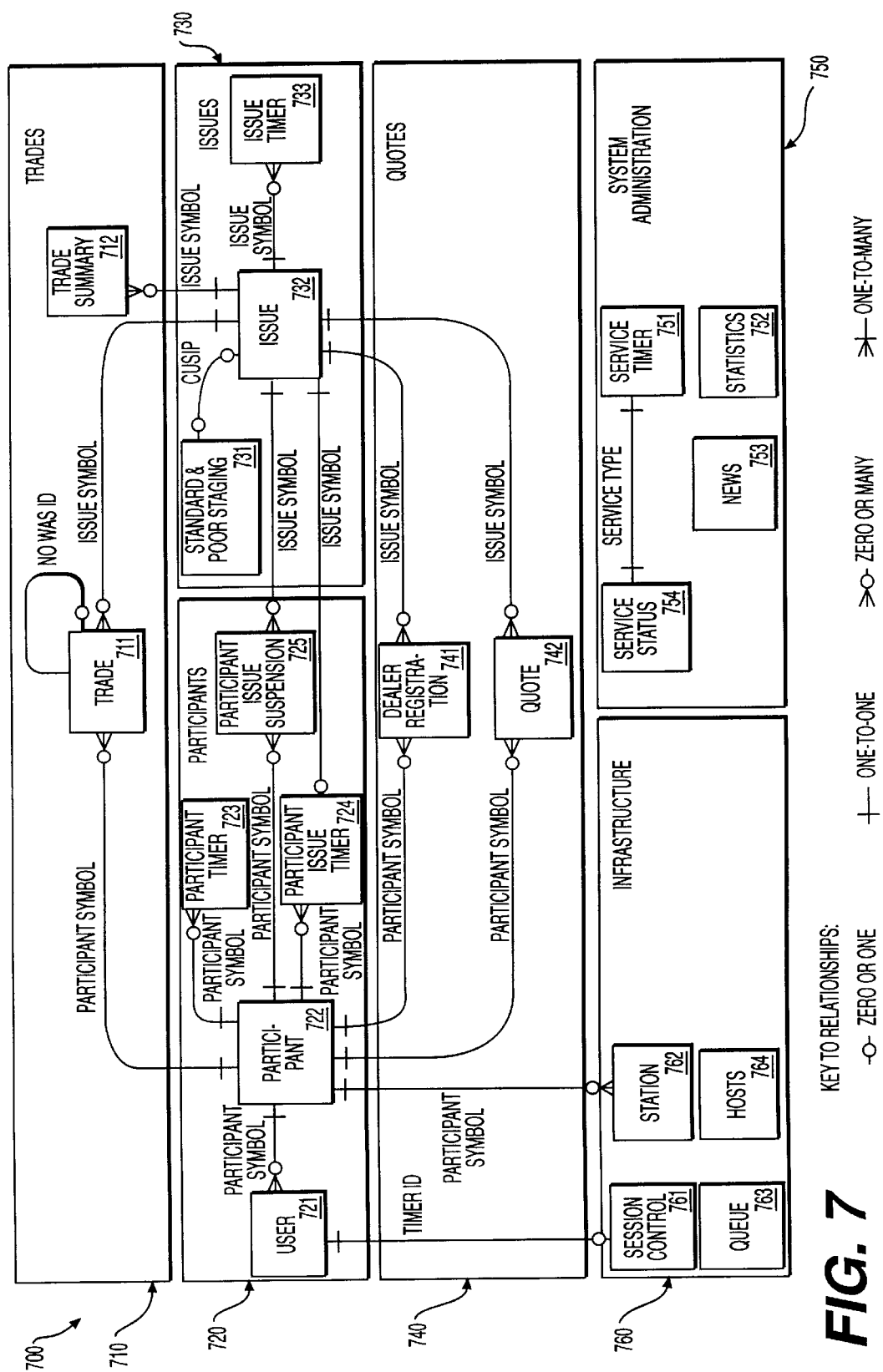
FIG. 7 is an illustration of the FIPS data flow diagram for the system in FIG. 2.

FIG. 7 illustrates the relationships between the various database files for some FIPS functions including trades 710, participants 720, issues 730, quotes 740, system administration 750, and infrastructure 760.

In trades function 710, trade table 711, contains information about specific trades and trade summary table 712 contains a summary of the different trades. The participant symbol information in trade table 711 is in participant table 722 of participants function 720, and the issue symbol information in trade table 711 and trade summary table 712 is in issues table 732 in issues function 730.

Participant symbol information in participant table 722 is also in user table 721, which contains information about FIPS users, participant timer table 723, which contains information about times in the future when users are suspended from FIPS activity, participant issue timer 724, which contains information about the times particular bonds are active and inactive, and participant issues suspension table 725, which contains information regarding when a participant is suspended from activity in a particular issue. Tables 721, 722, 723, 724, and 725 are all in participant function 720.

Participant symbol information in participant table 722 is also in dealer registration table 741, which contains information about dealers within the FIPS system, and quote table 742, which contains information about particular quotes. Dealer registration table 741 and quote table 742 are in quotes function 740. Those tables also have issue symbols from issue table 732.

Issue table 732 is in issues function 730 along with issue timer table 733 and Standard & Poors Staging file 732. Issue table 732 contains information about FIPS hardware, and issue timer table 733 contains information about when certain issues are active. The issues symbol information in issue table 732 is for issue timer 733, participant issue suspension table 725 and participant issue timer 724.

Infrastructure functions 760 includes session control table 761, which contains information about information about individual login sessions for particular users, station table 762, which contains information about which users are associated with particular workstations, hosts table 764, which contains information about lists of addresses for each participant used for broadcast messages and queue table 763, which contains about all current messages being broadcast. Station table 762 uses the participant symbol data in participant table 722, and session control table 761 includes the user ID information in user table 721.

System administration function 750 includes service timer table 751, which contains information about times during which services are active, statistics table 752, which contains information about general system statistics such as number of users, trades and quotes, news table 752, which contains all past system news messages, and service status table 754, which contains information about the current status of particular services. Service status table 754 and service timer table 751 use the same service type information.

IV. USER MENUS

Preferably, a user interfaces with the FIPS host 210 through a standard GUI on the workstations 230 and 240. The GUI provides an easy-to-use system having only the information to which the user is entitled based on its role. This section describes the various user message windows for interfacing to the FIPS system.

User-message windows display general status or application information. The specific types of messages are Information, Question/warning, Help/warning, Error, or Host transaction messages. Information messages require no user interaction and provide information about what the workstation is doing. Question/warning messages warn users of potential errors and perform a "double check" with the user before an action takes place by requiring acknowledgment or rejection before the action may take place. Help/warning messages describe errors such as invalid user input and do not require a specific response. Error messages are more severe than warnings and usually indicate workstation problems. Host transaction messages provide information regarding host transactions and communications as well as Host generated errors. These messages are maintained in a list that the user can review.

FIPS is a menu-based system having a menu bar with a variety of functions. A user can select an item on the menu bar or an function on the menu by any acceptable device, such as a mouse or a keyboard. Most windows requiring input from the user will contain an "OK" button and a "cancel" button. If the user selects the OK button, the information indicated by the user is sent to the FIPS host 210 for processing. If the user selects the cancel button, the current function is cancelled and the user returns to the previous function.

A. Initiation

Figure 8:
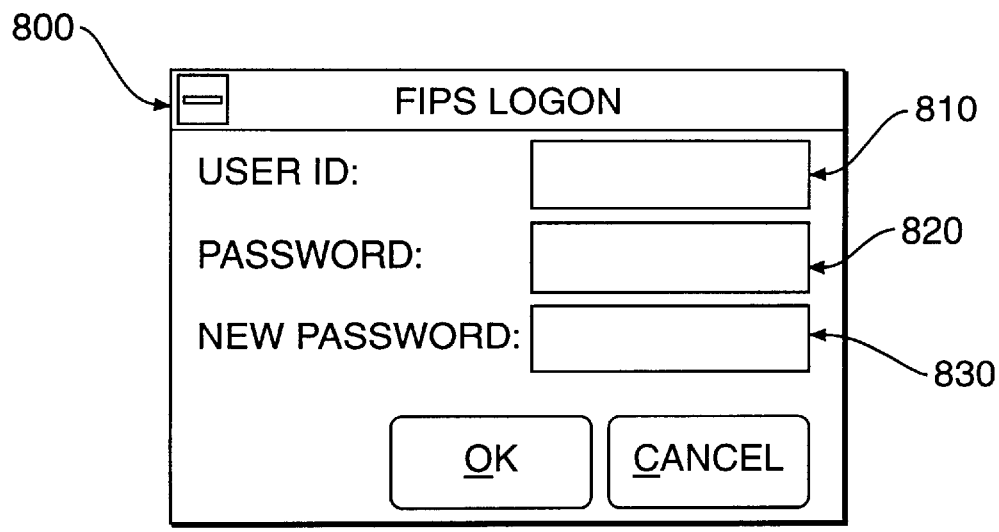
FIG. 8 is an illustration of a logon window to access FIPS.

FIG. 8 shows the FIPS logon window 800. Users enters their user identification (ID) into field 810, and then password into password field 820. Users also have the option of entering a new password in field 830.

Figure 9:
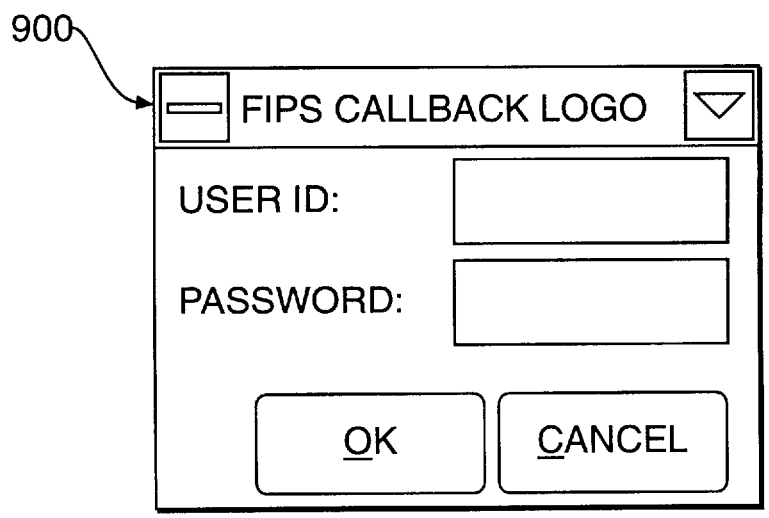
FIG. 9 is an illustration of a FIPS callback logon window.

FIG. 9 shows a callback logon window 900. Once the proper information is entered in window 800, FIPS establishes a return connection, as described earlier, and presents the user with window 900. If the information entered in either window 800 or 900 is not accepted by the FIPS host, FIPS presents an error message to the user.

Figure 10:
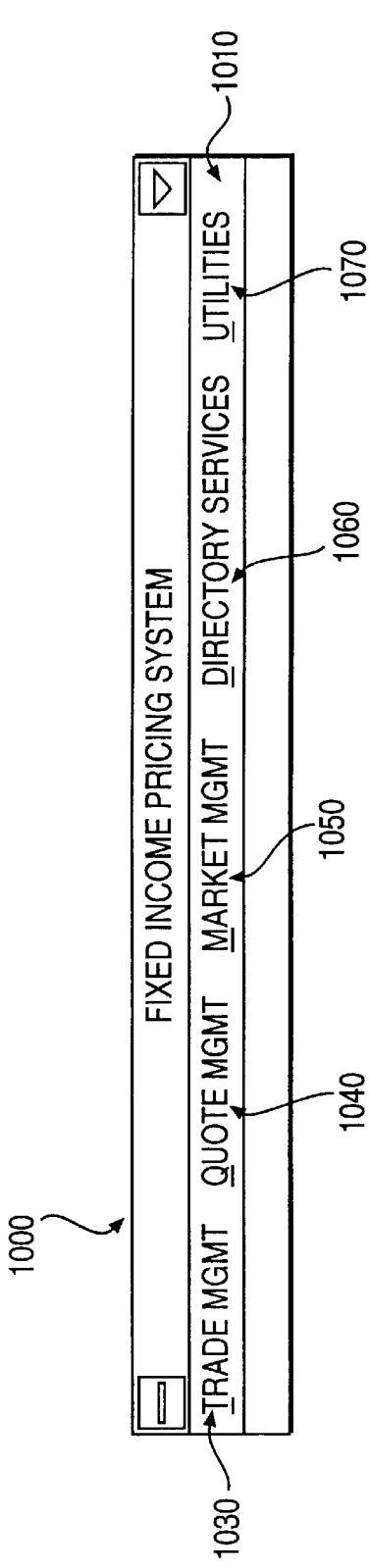
FIG. 10 is an illustration of a FIPS user main menu window.

Once logged onto the FIPS, a user is presented with a main window 1000 as in FIG. 10 with a menu bar 1010. Menu bar 1010 has menus for trade management 1030, quote management 1040, market management 1050, directory services 1060, and utilities 1070. These menu options correspond to the basic FIPS function explained above.

B. Trade Management

Figure 11:
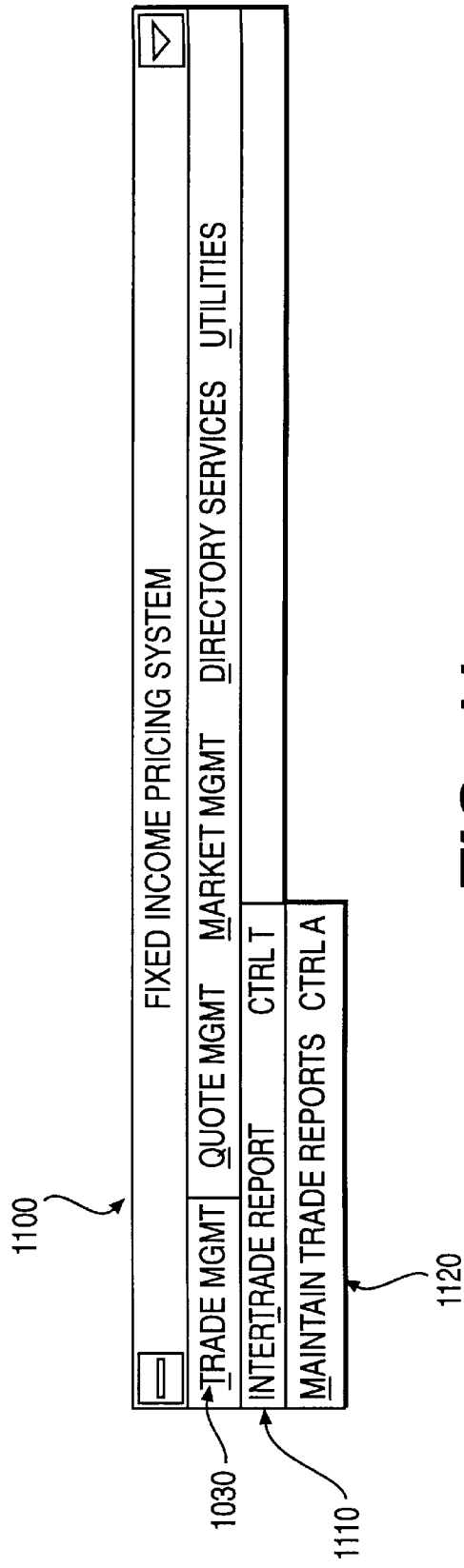
FIG. 11 is an illustration of a Trade Management menu.

If a user selects the trade management function 1030 from main menu bar 1010, FIPS presents the user with the trade management menu 1100 shown in FIG. 11. Trade management menu 1100 includes an Enter Trade Report function 1110 and a maintain trade report function 1120.

1. Enter Trade Report

A user chooses Enter Trade Report function 1110 if the user is a participant in a bond trade transaction since such a user must enter the results of the trade into FIPS. The data to be captured and validated for a report includes participants, issue, price, quantity, date of trade, and time of trade. Access to individual trade reports is limited to the NASD compliance group members and the trader participant who entered the trade report. Once the user selects the enter trade report function, FIPS presents the user with a window appropriate to the type of user.

Figure 12:
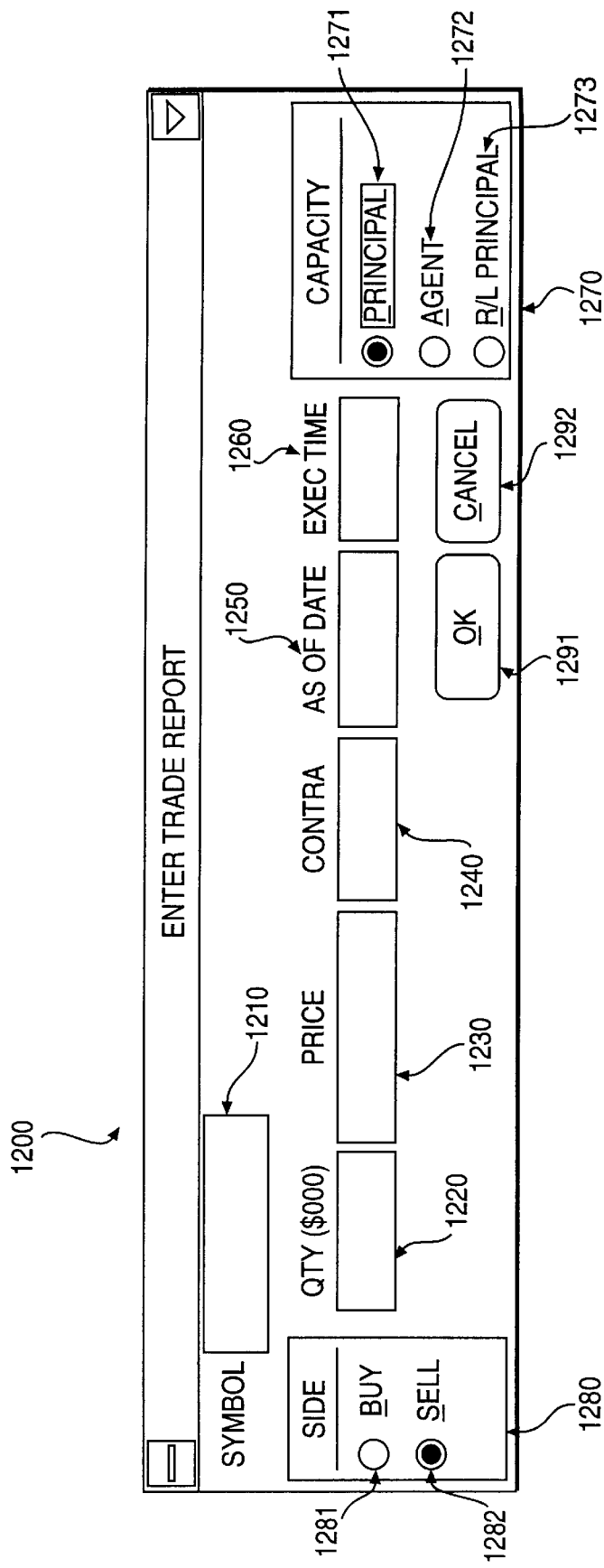
FIG. 12 is an illustration of a Enter Trade Report window for a dealer.

If the user is a dealer, FIPS supplies the Enter Trade Report window 1200 shown in FIG. 12. Window 1200 allows dealers to input the necessary information about a trade, including quantity, price, the other party to the trade, the type of trade, the execution date and time of the trade, and the capacity of the dealer.

Next, the user selects either a Buy or Sell trade report using button 1281 for a buy report, and button 1282 for a sell report. Buttons 1281 and 1282 appear in side box 1280. If user is a dealer, the default trade type is "sell."

The user then enters the face value amount of the transaction in thousands of dollars in quantity field 1220, and the price of the trade in price field 1230.

FIPS compares the entered price in field 1230 with the current inside bid and ask. If the price is not within 10%, FIPS sets a software flag for users who monitor the market for compliance with SEC regulations.

Users enter into Contra field 1240 a participant symbol to identify the other party to the trade. If the user inputs its own participant symbol in contra field 1240, FIPS rejects the symbol as invalid. If the other party to the trade is a FIPS participant, then the user must enter the other party's symbol. If the other party is not a FIPS user, then the user enters a 'C' in the Contra field 1240. If the user does not know the Contra code or FIPS symbol, the user must use the directory services described below to obtain the symbol or Contra code.

FIPS generates a report date for each trade report. The report date is the date when FIPS records the entered trade report. Users may override this date by filling in the As-Of-Date field 1250. If users enter a date in field 1250, they must also enter an execution time in Exec Time field 1260.

The user must select one of three capacity types in box 1270. If the user is acting as a dealer, the user selects principal button 1271. If the user is acting as a broker, he selects agent button 1272. If the user is acting as a riskless principal, he selects R/L principal button 1273. A riskless principal is a user who buys and sells an equal number of a particular issue at the same time.

Once host 210 accepts the trade, the FIPS software sends an acknowledgment for display in a host transaction window (not shown). If the FIPS software rejects the trade report because of an invalid field, the FIPS software generates a message for display in a warning window (not shown).

Figure 13:
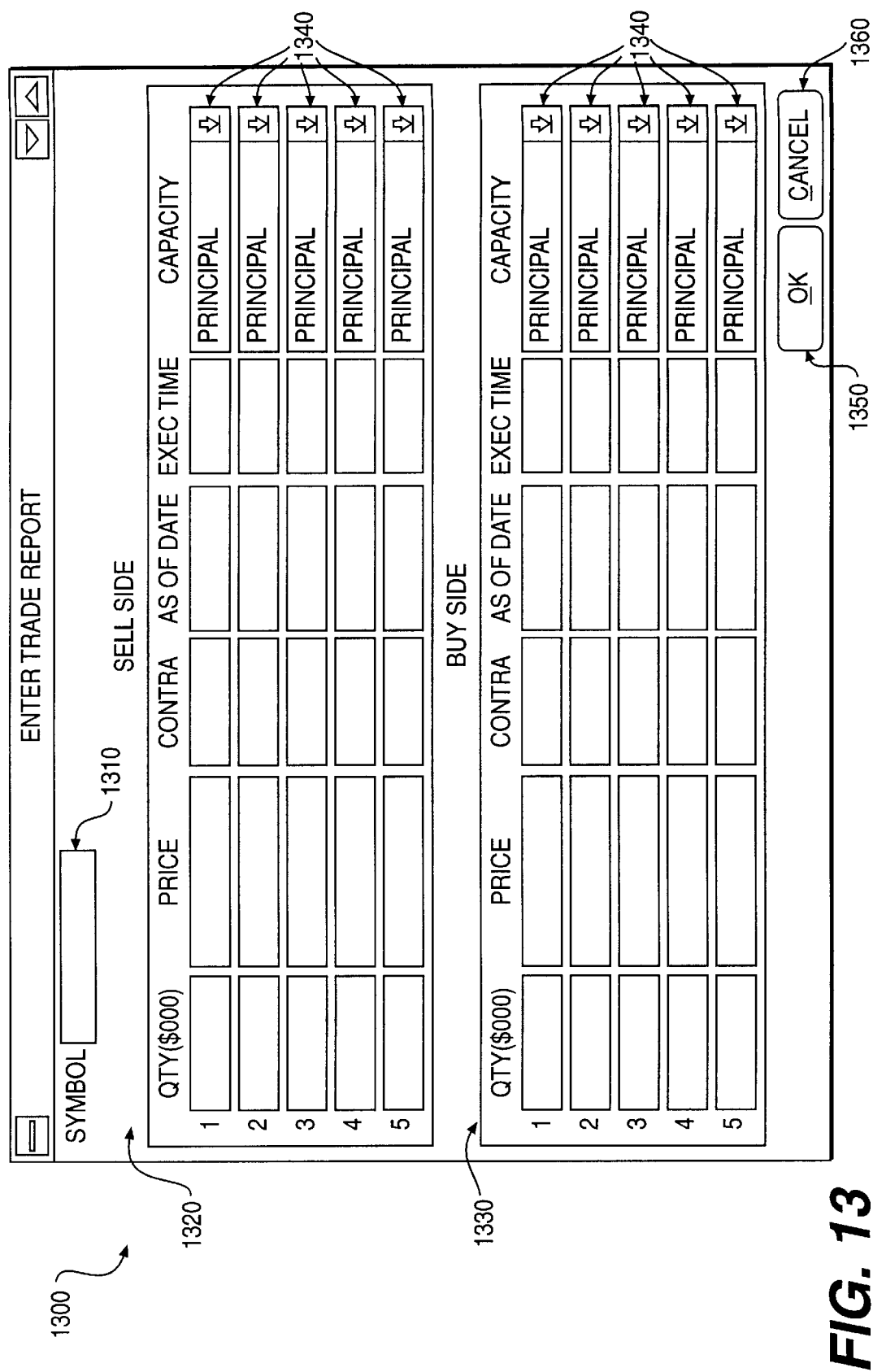
FIG. 13 is an illustration of a Enter Trade Report window for a broker.

Brokers also enter trades by selecting the Enter Trade Report function 1110 from menu 1100, however they are presented with a different Enter Trade Report window 1300 as shown in FIG. 13. The use of the broker Enter Trade Report window 1300 is similar to that of the dealer Enter Trade Report window 1200.

First, the broker enters a symbol into field 1310. Next, the broker fills in information regarding the trade reports for that bond in the appropriate fields which generally have the same functions as the equivalent fields in the dealer's Enter Trade Report window 1200.

There are certain differences, however. For each sell trade report, the user enters data in a line of fields in the Sell Side fields 1320, and for each buy trade report, the user enters data in a line of fields of the Buy Side fields 1330. If the broker is acting as a riskless principal, all price fields for a given issue must be the same. In addition, the user must select a Capacity from the list box 1340 for each trade report.

After the broker selects the OK command button 1350, the system ensures the sum of the quantities on the Buy Side equals the sum of the quantities on the Sell Side. If the sums are not equal, the broker receives a Question/Warning message that requires a response, but the broker may still cause FIPS to process the trade.

2. Maintain Trade Report

Figure 14:
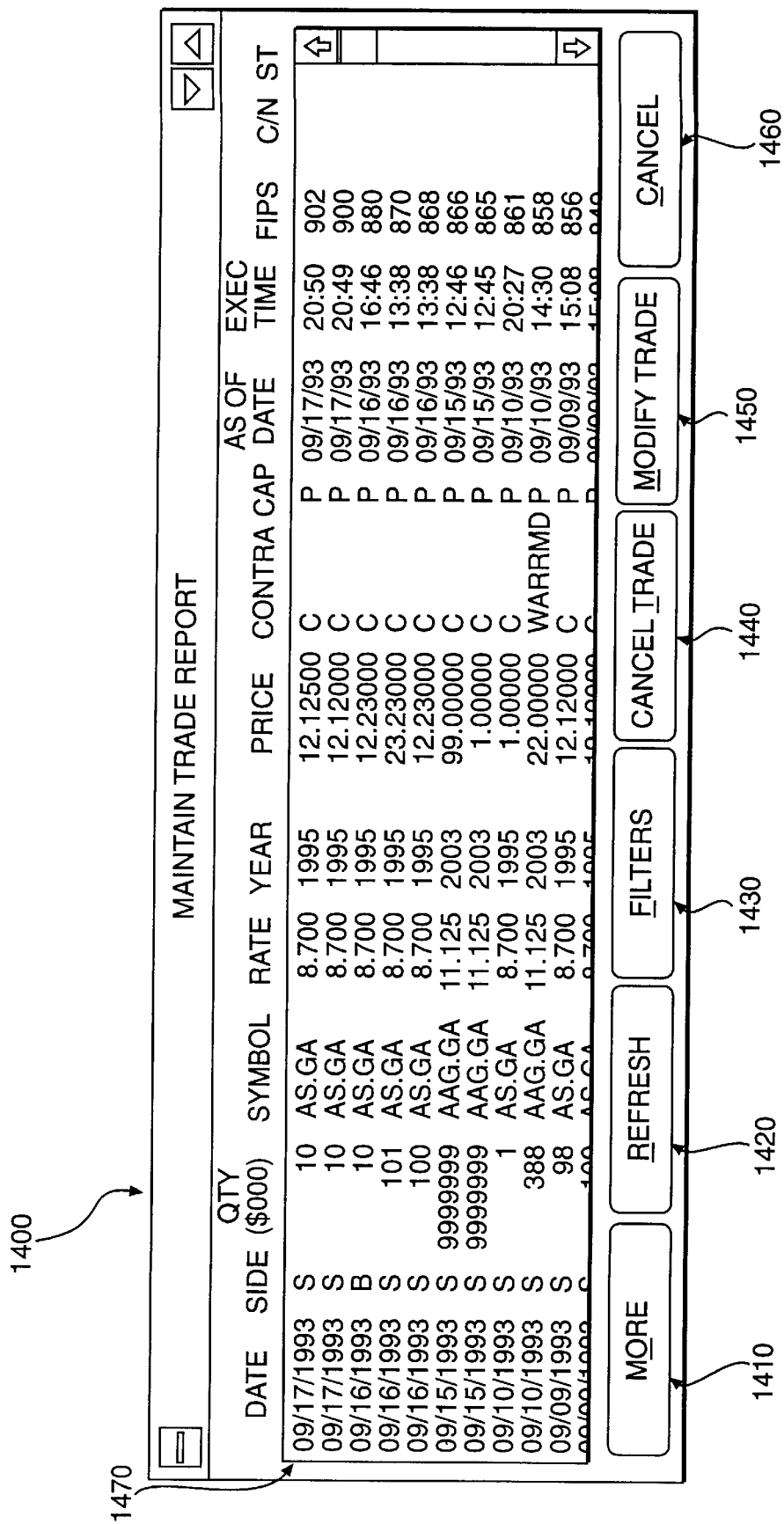
FIG. 14 is an illustration of a Maintain Trade Report window.

When a user selects the Maintain Trade Reports function 1120 from menu 1100, FIPS displays reports for which the user has been a party over the past seven calender days. Such reports include trade reports, modify trade reports, generate modification trade reports (NO WAS trade reports), cancel trade reports, and generate cancelled trade records. A representative display window 1400 is shown in FIG. 14.

Users may perform various operations on the information displayed in window 1400. Most of window 1400 is taken up with trade list box 1470 which lists each trade and includes certain information about each trade. FIG. 15 provides descriptions for the various information displayed in list box 1470.

When the user selects More button 1410, FIPS host 210 sends the next block of trade reports. Selecting refresh button 1420 causes FIPS to refresh window 1470 with the most up-to-date trades.

Figure 16:
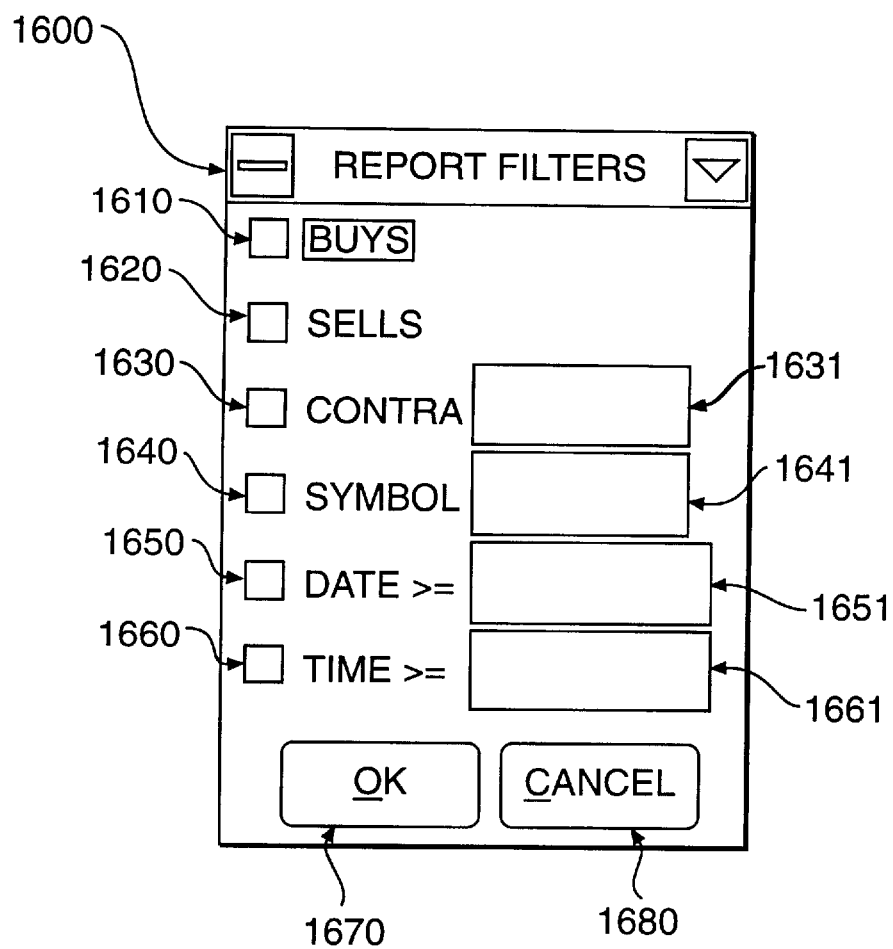
FIG. 16 is an illustration of a Report Filters window.

When the user selects the Filters button 1430, FIPS will display reports which meet certain criteria. The criteria appear in a report filters window 1600, shown in FIG. 16, which appears after Filters button 1430 is selected.

When the Report Filter window 1600 is displayed, users can select several filter criteria. Selecting Buys button 1610 causes FIPS to display all trades in which the user acted as a buyer. Selecting Sells button 1620, causes FIPS to display all trades in which the user acted as a seller.

The user can select Contra button 1630 and enter into the text box 1631 the FIPS participant symbol representing the participant on the other side of a trade. This causes FIPS to display those trades made with this participant.

The user selects Symbol button 1640 and enters into the text box 1641 FIPS issue symbol, causing FIPS to display trades of that particular issue. If the user selects Date button 1650 and enters a date into text box 1651, FIPS displays all trade reports after that date. If the user selects Time button 1660 and enters a time into box 1661, FIPS displays all the current trade reports after that time.

If the user selects OK button 1670 after entering any desired information into the various criteria fields, FIPS will close window 1600 and process the filter information in FIPS host 210. FIPS host 210 transmits the trade reports filtered by the selected criteria to the workstation 240 or the PC 230 for display.

To modify a trade report, the user selects the report from list box 1470, and then selects Modify Trade command button 1450. In response, the FIPS software generates a Modify Trade Report window (not shown) which looks and behaves like the Enter Trade Report window of FIG. 12.

Once a user modifies the trade report, information is transmitted to the FIPS host 210 creating a "NO WAS" trade report. For a NO WAS trade, the system maintains a new, corrected trade report, called a "WAS" report, and the old, incorrect trade report, called a "NO" report. When host 210 accepts the trade, the FIPS software sends a message (containing a new control number for the WAS trade report) for display in list box 1470. After the screen is refreshed, the system marks the old, NO trade report under the state (St) column with an 'N'.

C. Quote Management

Figure 17A:
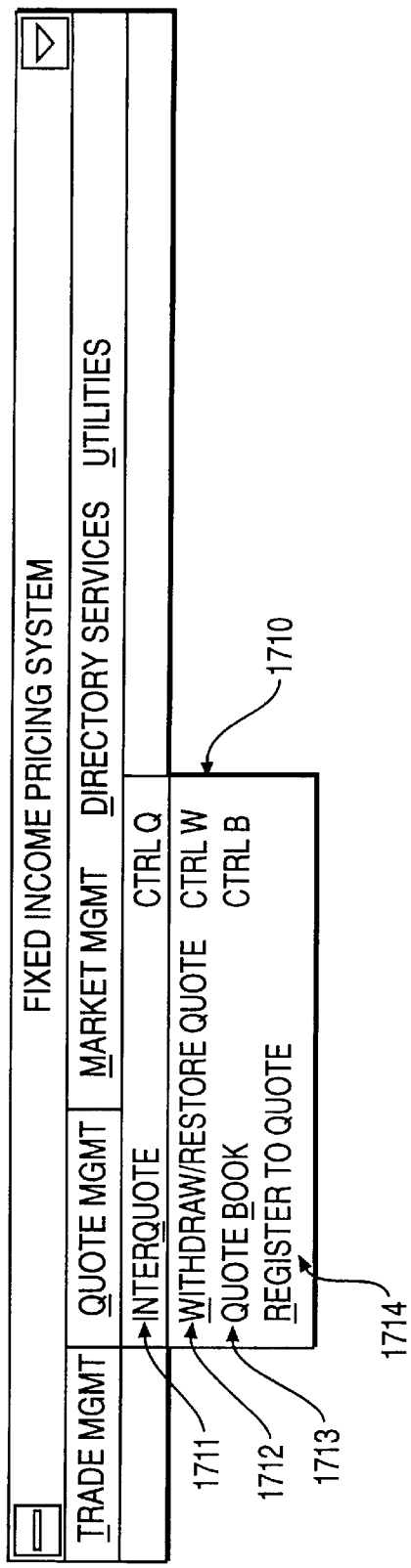
FIG. 17($a$) is an illustration of a Quote Management Menu for a dealer.
Figure 17B:
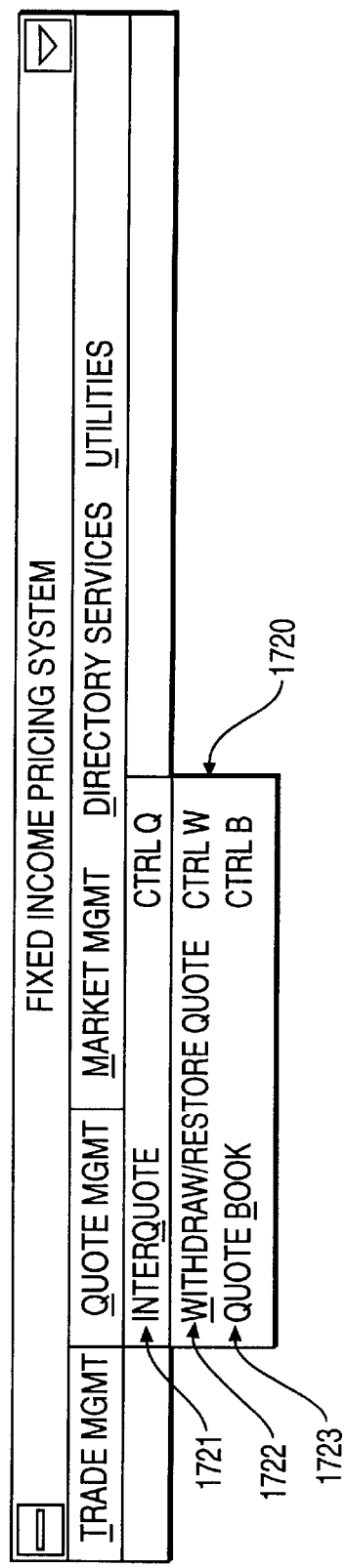

The user manages quotes by selecting the Quote Management function 1040 from menu 1000. The functions provided under the Quote Management menu differ according to whether the user is a broker or a dealer. A dealer is provided with menu 1710 as shown in FIG. 17(*a*). Menu 1710 includes Enter Quote function 1711, Withdraw/Restore Quote function 1712, Quote Book function 1713, and Register to Quote function 1714. A broker is provided with menu 1720 shown in FIG. 17(*b*). Menu 1720 includes Enter Quote function 1721, Withdraw/Restore Quote function 1722, and Quote Book function 1723.

1. Enter Quote

Figure 18A:
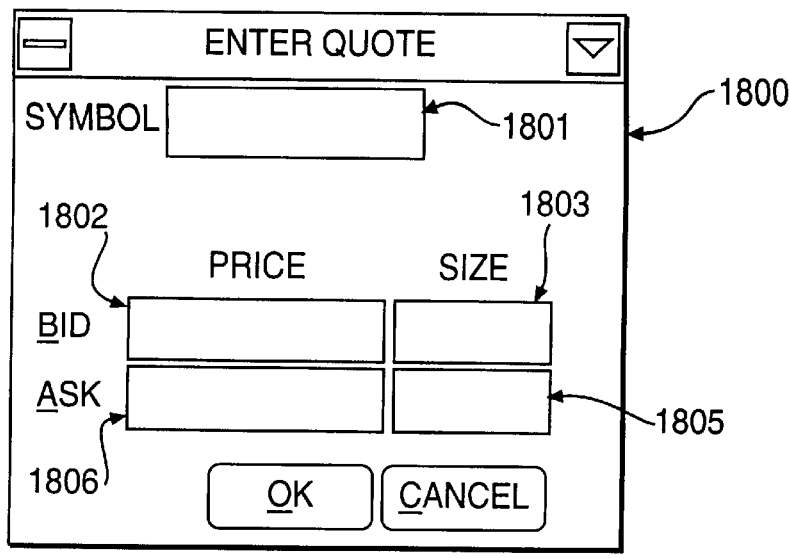
FIG. 18($a$) is an illustration of a Enter Quote window for a dealer.
Figure 18B:
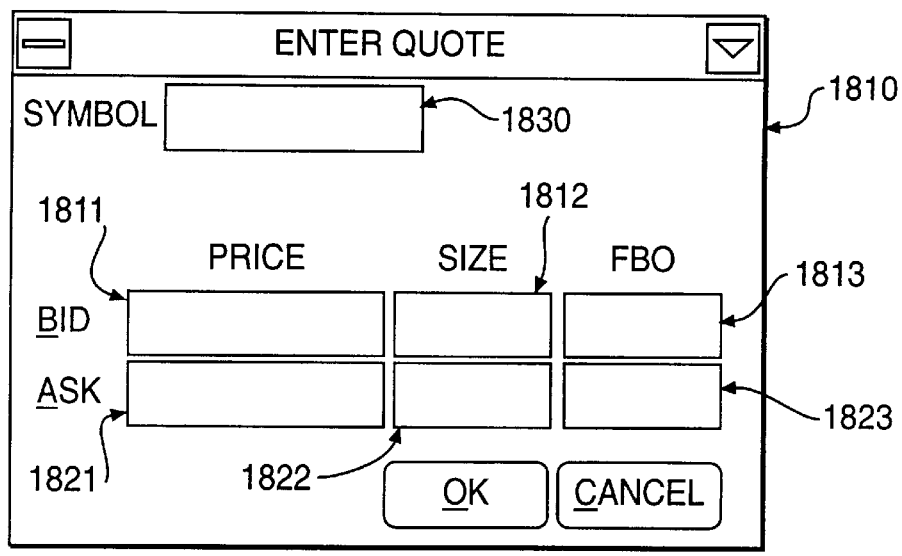

When a dealer selects Enter Quote function 1711 from menu 1710, FIPS displays Enter Quote window 1800 as shown in FIG. 18(*a*). To enter a quote, the dealer enters the issue Symbol in symbol field 1801, the bid price in field 1802, the bid size in field 1803, the ask price in field 1806 and the bid size in field 1805.

When a broker selects Enter Quote function 1721 from menu 1720, FIPS displays window 1810 as shown in FIG. 18(*b*). The fields in the broker window 1810 are similar to the fields in dealer window 1800 with the exception of the FBO fields 1813 and 1823 of broker window 1810. The broker may use these fields to enter client's symbol in a private FBO (for benefit of) field to identify quotes on behalf of the client.

Symbol field 1830 is similar to field 1801 of enter quote window 1800 and is where the user inputs the issue being quoted. The user inputs the dollar price of the issue that it is willing to pay to purchase the issue in bid price field 1811. The user inputs the dollar price of an issue that it is willing to receive for selling the issue in ask price field 1821. The size fields 1812 and 1822 are the number of issues that the user wants to buy and sell, respectively. In the FBO fields 1813 and 1823, the user inputs the dealer that it is representing when making a particular quote. When a user represents a dealer, it is acting in the capacity of a broker.

2. Withdraw/Restore Quote

Figure 19:
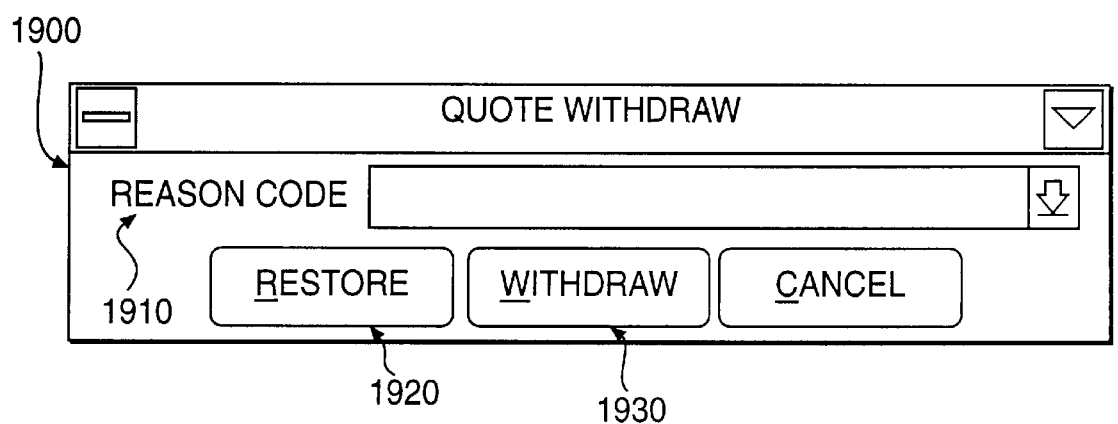
FIG. 19 is an illustration of a Withdraw/Restore Quote window.

Users may withdraw all of their quotes (or restore all previously withdrawn quotes) by selecting the Withdraw/Restore Quote function 1712 from the dealer menu 1710 or menu function 1722 from the broker menu 1720. In response, FIPS presents both brokers and dealer with window 1900 as shown in FIG. 19.

Users must select a reason for withdrawing or restoring from a list provided in a combination box 1910. Some of reasons a quote can be withdrawn or restored are merger and acquisition, an excused withdraw which might occur it a user is suspended from trading, a dealer not making markets, negative earnings, equipment failures, issue halt, and company news.

When an administrative user assumes the role of a trading user, the administrative user can use any of the reasons allowed for trading users. An administrative user sets the excused withdraw reason when withdrawing quotes for the trading user, and is the only reason an administrative user can use to restore quotes. When an administrative user halts an issue, the administrative user can use the reason "Issue Halt".

A user effects a withdrawal or restore by selecting button 1920 or 1930, respectively.

3. Quote Book

Figure 20A:
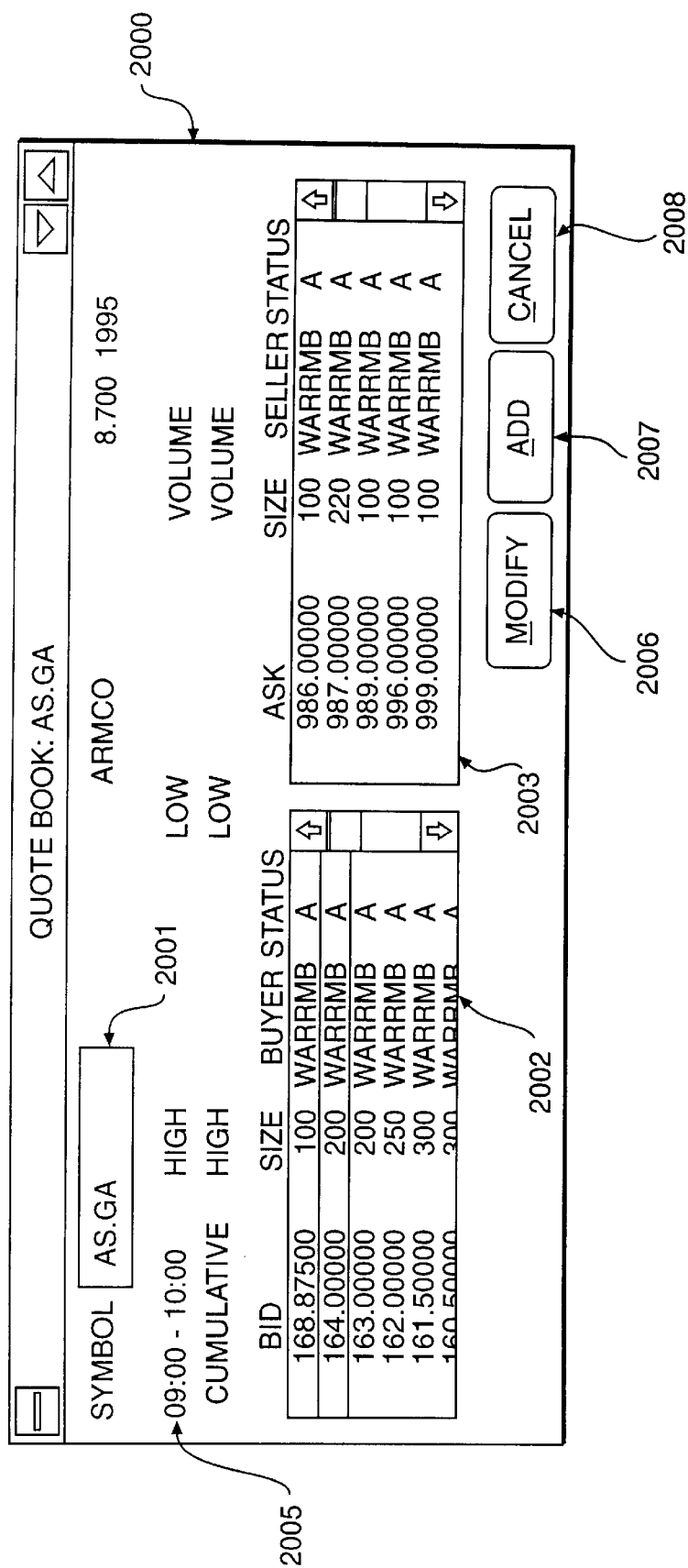
FIG. 20($a$) is an illustration of a Quote Book window for a dealer.
Figure 20B:
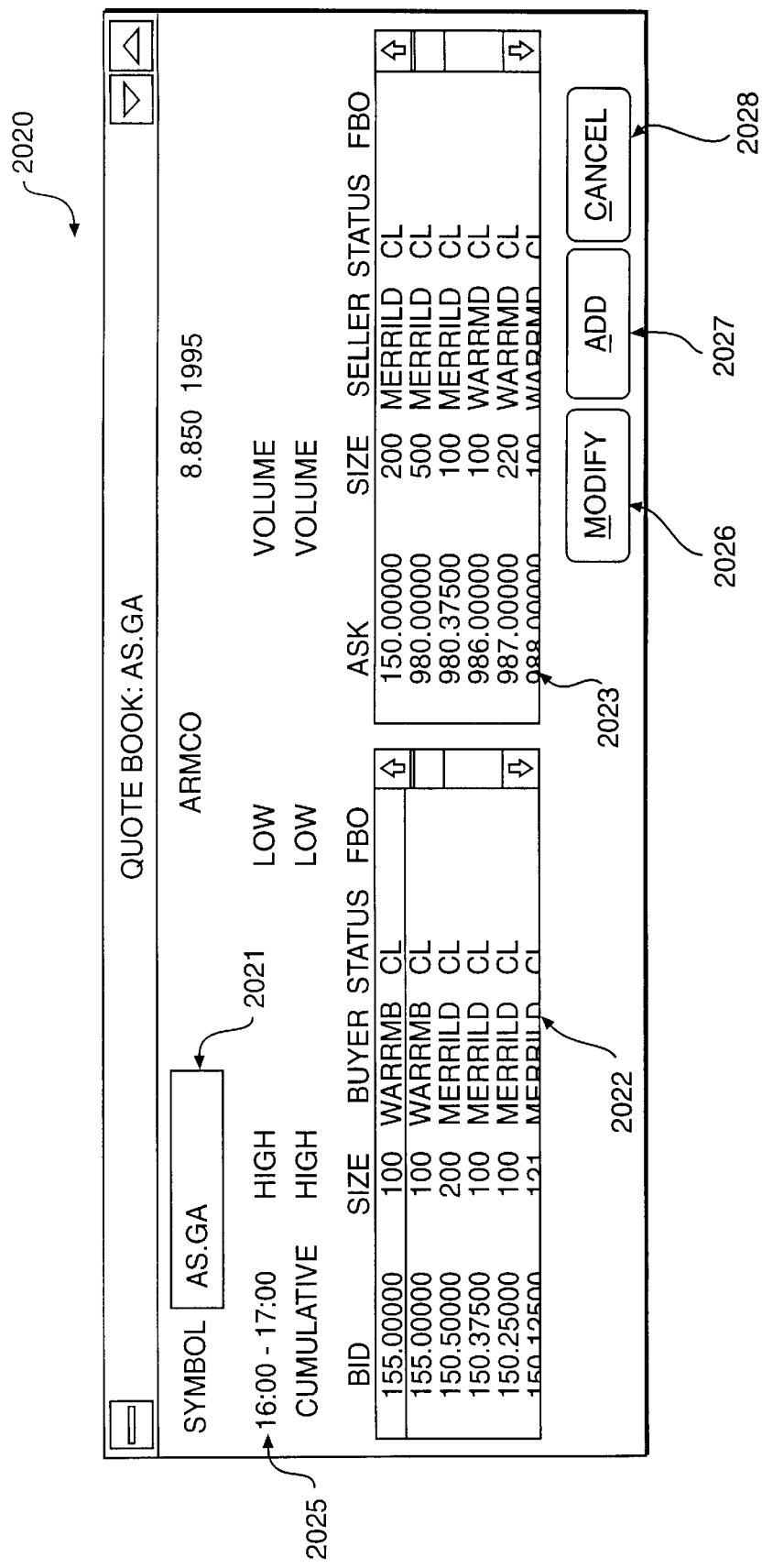

When a dealer selects Quote Book function 1713 from the dealer menu 1710, FIPS displays Quote Book window 2000 as shown in FIG. 20(*a*). When a broker selects the Quote Book function 1723 from the quote management menu 1720, FIPS displays Quote Book window 2020 as shown in FIG. 20(*b*). Both Quote Book windows 2000 and 2020 allow the user to view all of the active quotes in a particular issue once the user types in Symbol from the issue of choice in the symbol fields 2001 and 2021.

In window 2000, a dealer's active bids appear in list box 2002 and active asks appear in list box 2003. Withdrawn quotes are seen only by the user that withdrew them.

The dealer and broker windows are similar, except the broker's window has additional FBO fields for the active Bids and Asks as shown in areas 2022 and 2023 of FIG. 20(*b*). These FBO fields contain values for individual quotes only if the broker viewing the data is the broker for the particular quote.

After the user enters a symbol in Symbol fields 2001 or 2021, the FIPS system retrieves the data from the appropriate databases and automatically fills in the remainder of the fields in windows 2000 and 2020, respectively.

A dealer's own quote in the list is shown with an indicator on the left, such as an asterisk shown in the second entry of list box 2002 of FIG. 20(*a*). A broker's quotes on the list contain a value in the FBO field of list 2022 and 2023.

The bids and asks are displayed in list boxes with the fields Price, Size, Seller, Status, and FBO (only for brokers). Bids may be displayed in several formats, for example, descending price/descending time order. Asks may also be displayed in several formats, for example, ascending price/descending time order.

The Status column may contain the following codes: A for an Active quote; Cl for a Closed market; H for a Halted Issue; Pr for a Preopen market; and W for a Withdrawn. A withdrawn quote requires an additional letter to represent the reason for the withdraw.

The time fields 2005 and 2025 show an hour range for which the High, Low, and Volume for the selected issue are displayed. The system updates the High, Low, and Volume numbers hourly. For example, the hour shown in FIG. 20 (09:00–10:00) changes to 10:00–11:00 when host 210 sends the 11:00 messages. The cumulative High, Low, and Volume for the entire day, up to the last hourly message sent by the host 210 are also shown.

Figure 21A:
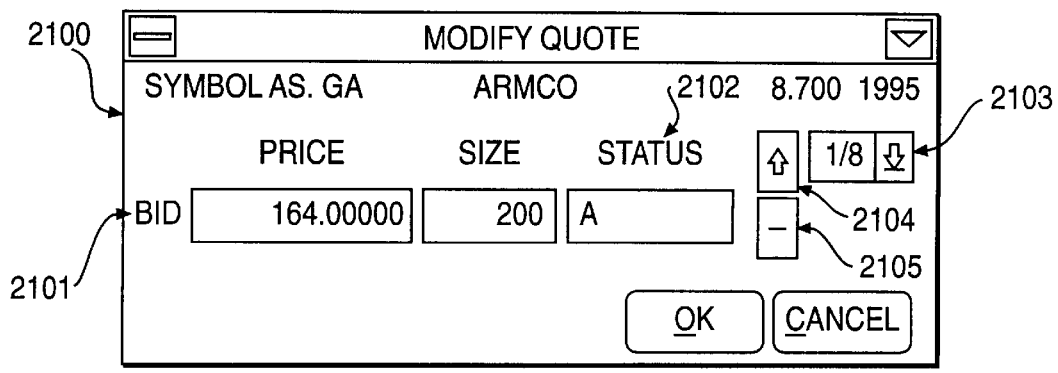
FIG. 21($a$) is an illustration of a Modify Quote window for a dealer.
FIG. 21(b) is an illustration of a Modify Quote window for a broker.
Figure 21B:
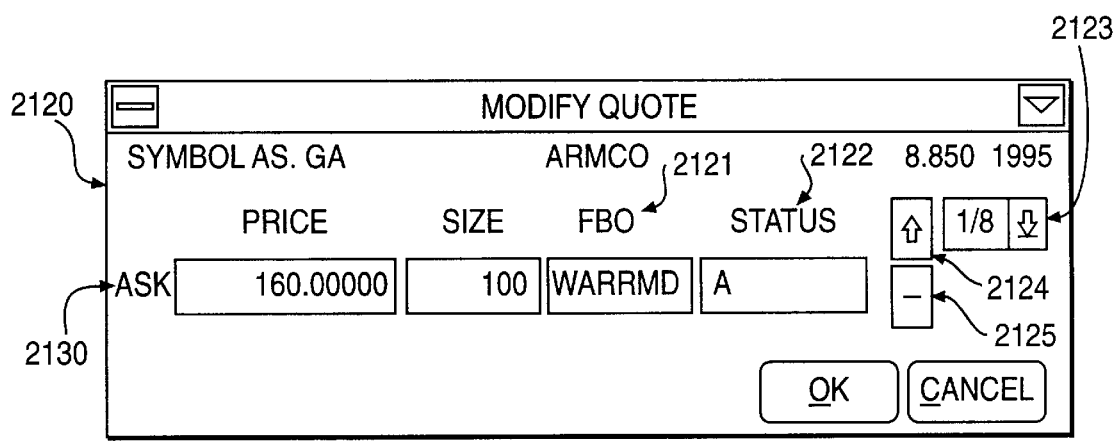

Three functions are available in the Quote Book windows 2000 and 2020. If the user selects a quote and then selects the Modify button (2006 from the dealer window and 2026 from the broker window), the system displays the Modify Quote window 2100 as shown in FIG. 21(*a*) if the user is a dealer and window 2120 if the user is a broker as shown in FIG. 21(*b*). If the user selects the Add button (2007 from the dealer window and 2027 from the broker window), FIPS presents Enter Quote window 1800, shown in FIG. 18(*a*), if the user is a dealer, and Enter Quote window 1810, shown in FIG. 18(*b*), if the user is a broker.

Window 2100 in FIG. 21(*a*) is displayed for a bid, and window 2120 in FIG. 21(*b*) for an ask.

In either window, the display is preceded by host 210 retrieving the Symbol, Name, Rate, and Maturity Year for the issue selected from the Quote Book window 2000 or 2020. If the quote being modified is a bid, FIPS sets the price, size, and status for a bid label, such as label 2101 in FIG. 21(*a*). If the quote being modified is an ask, FIPS sets the same information for an ask label, such as label 2130 in FIG. 21(*b*). The FBO field 2121 presented to brokers cannot be changed. To change this field, the broker must withdraw and then add a new quote.

Status fields 2102 and 2122 in Modify Quote windows 2100 and 2120 indicate whether the current quote is withdrawn or active. Valid values are A for Active and W for Withdrawn. The user does not input a status value for a quote because that value is controlled by FIPS.

Fields 2103 and 2123 contain the tick increment, which defaults to ⅛. A tick represents the increment by which the bid or ask may be incremented or decremented. In the preferred embodiment, the tick value can be ⅛, ¼, ⅜, or ½.

Selecting the uptick function (+) 2104 and 2124 increases the prices by the tick value. Selecting the downtick function (−) 2105 and 2125 decreases the prices by the tick value.

If any validations fail when modifying quotes, the user receives a message.

4. Register To Quote

Dealers select the Register To Quote function 1714 from the menu 1710 to register or de-register themselves as a dealer in a particular FIPS bond issue. The Register to Quote window 2200, shown in FIG. 22, contains issue data including: Symbol, Rate, maturity year, issue name, issue status (A for active, I for Inactive), and registration indicator (Y for yes, blank for no). To toggle from "Y" to blank (i.e., registered to not registered), the user selects the issue and then selects the OK button. This causes FIPS to change the status indicator.

D. Market Management

Figure 23A:
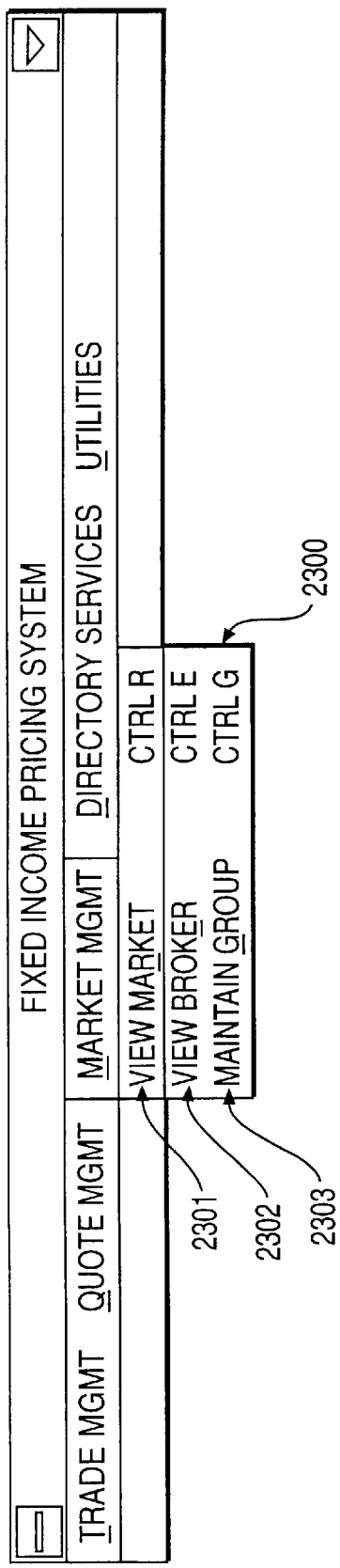
FIG. 23(a) is an illustration of a Market Management Menu for a dealer.
Figure 23B:
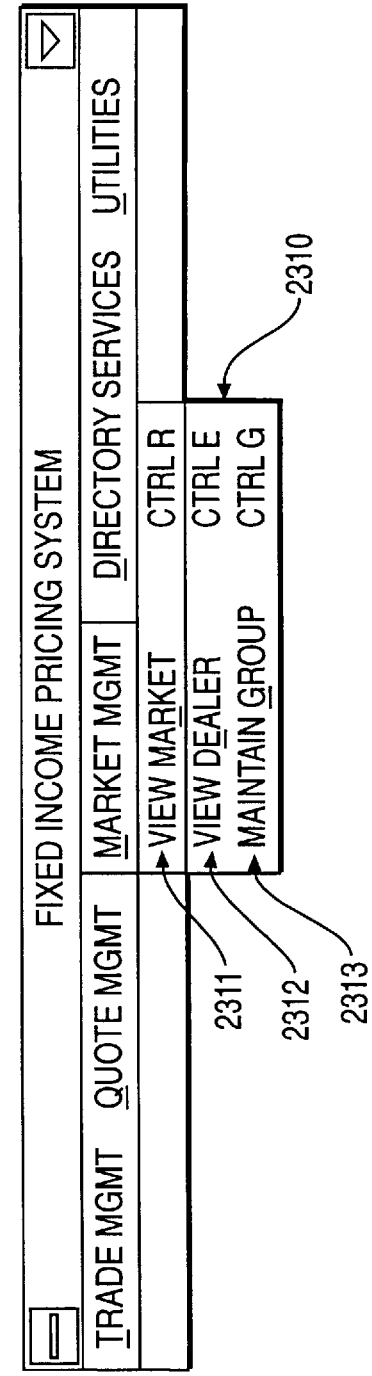
FIG. 23(b) is an illustration of a Market Management Menu for a broker.

Users manage their view of a market by selecting the Market Management function 1050 from menu 1010. If the user is a dealer, FIPS displays window 2300 as shown in FIG. 23(*a*). If the user is a broker, FIPS displays window 2310 as shown in FIG. 23(*b*).

The functions available to a dealer include View Market 2301, View Broker 2302, and Maintain Group 2303. The functions available to a broker include View Market 2311, View Dealer 2312, and Maintain Group 2313.

1. View Market

The View Market functions 2301 and 2311 behave similarly to allow brokers and dealers to dynamically view updated quote and trade information on defined groups of issues.

Figure 24:
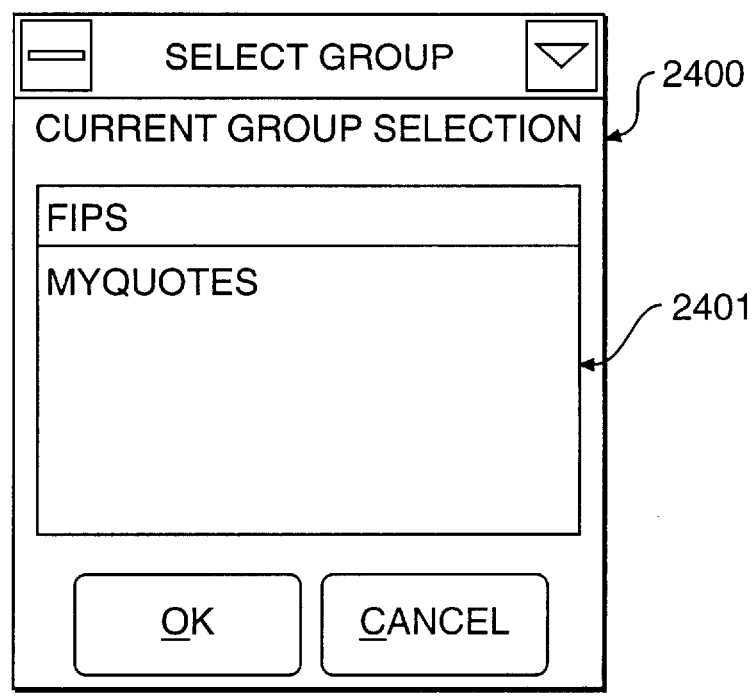
FIG. 24 is an illustration of a Select Group window.

When users select the View Market function 2301 or 2311, FIPS activates the Select Group window 2400, shown in FIG. 24, from which the user selects a group to view.

The Select Group window 2400 contains a Current Group Selection list box 2401 of system-defined groups and user-defined groups.

FIG. 24 shows only system-defined groups, such as "FIPS," which contains all FIPS issues, and "MYQUOTES," which contains all issues for which the user has quotes.

Figure 25:
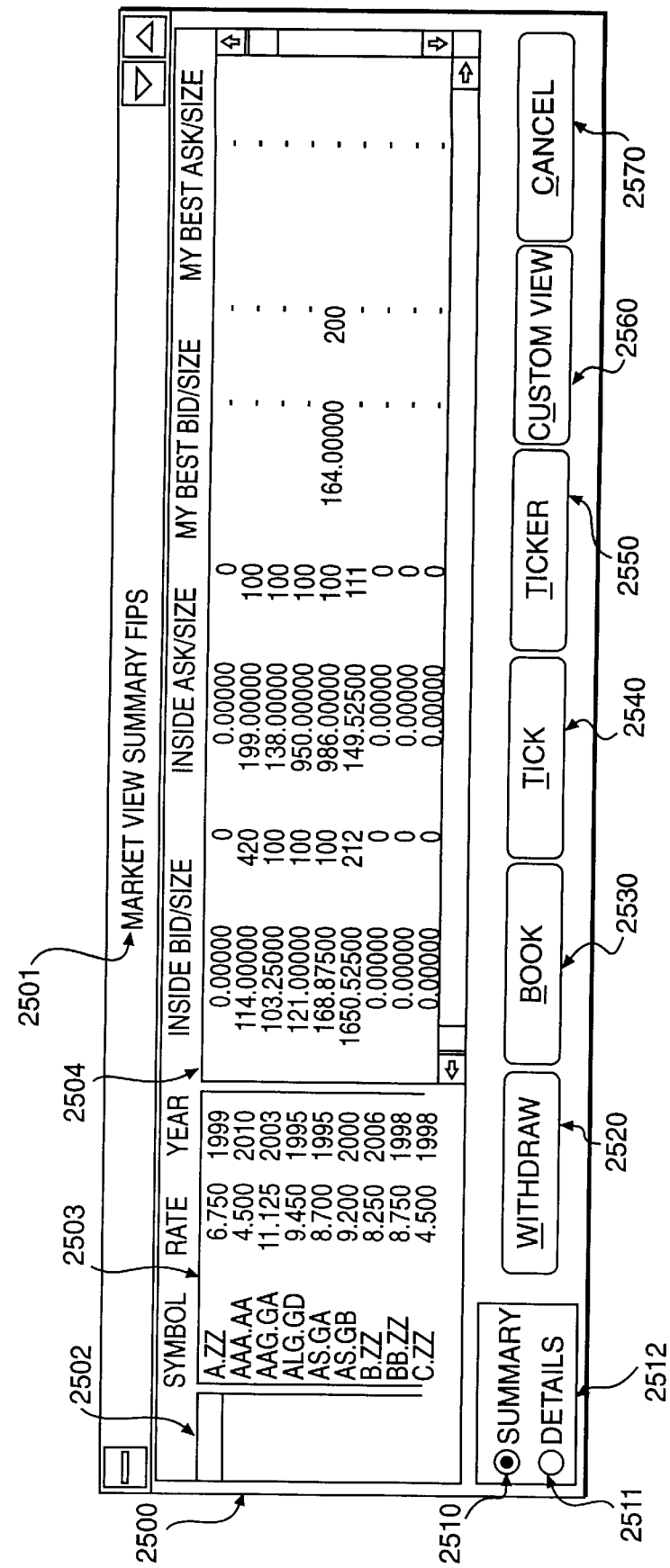
FIG. 25 is an illustration of a Market View window.

After the user selects a group by selecting OK button 2402, FIPS displays the Market View window 2500 as shown in FIG. 25. Market View window 2500 has sample data of the system-defined FIPS group.

The group's name is included in the menu title 2501. If the Market View window 2500 for this group is already open in the background, it receives the input focus and becomes the active window.

Issues may be displayed in the order in which they were created in the group create/modify process. The data for each issue may not be edited in this window. Data is only displayed.

Data for the issues may be displayed in three list boxes 2502, 2503, and 2504. Recent Activity Indicator list box 2502 shows the most recent activity in the market. An indicator R means the corresponding issue has the most recent trade reported. An indicator Q means the corresponding issue has the most recent quote entered. An indicator I means the corresponding issues has the most recent inside in the market.

List box 2503 shows symbols followed by the bond rate and maturity Year. If all the issues cannot be simultaneously shown, box 2503 may be scrolled. List box 2504 displays trade and quote data items. If all the items in box 2504 cannot be simultaneously shown, the window can be scrolled horizontally.

The window 2500 also supports other functions as shown by the buttons at the bottom of window 2500. Summary button 2511, displays one line of data per issue. Details button 2512 causes FIPS to display of one summary line per issue followed by a line of data for each of the user's quotes in that issue.

Figure 26:
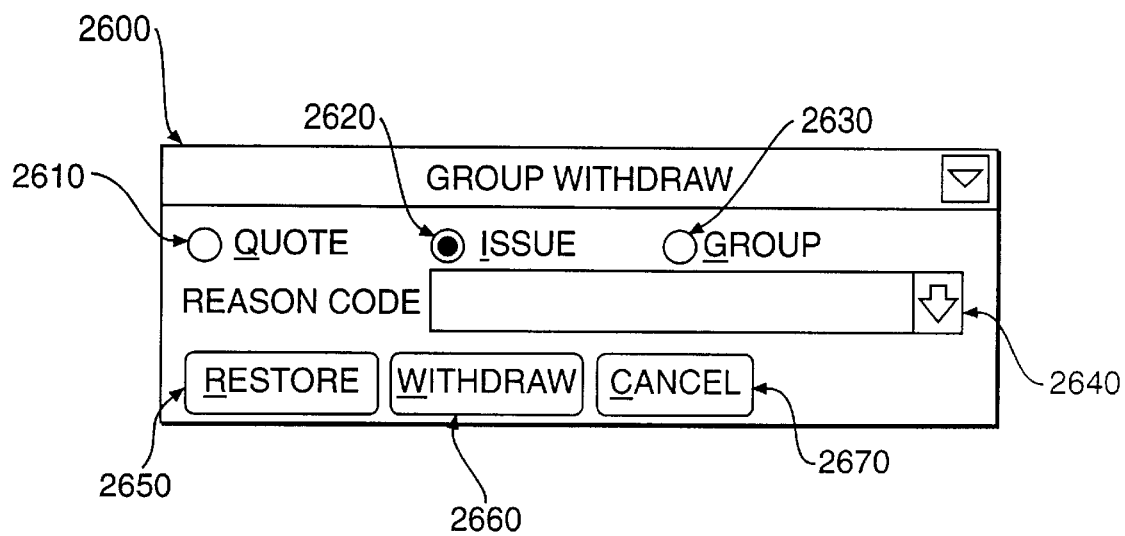
FIG. 26 is an illustration of a Group Withdraw window.

Withdrawal button 2520 causes FIPS to display the Group Withdraw window 2600 as shown in FIG. 26. The first decision a user has is which issue to affect. The user selects Quote button 2610 to affect a specific quote. This field is disabled, however, if the line selected in the Market View window 2500 is of trade data.

The user selects Issue button 2620 to affect all quotes for the specific issue. The user selects Group button 2630 to affect all quotes for this specific group.

To withdraw or restore quotes, the user must select a reason from list box 2640. The user selects the restore button 2650 to restore previously withdrawn quotes, or withdraw button 2660 to withdraw the quotes.

Book button 2530 in FIG. 25 causes FIPS to display the Quote Book window for the selected issue. The quote book is shown in FIGS. 20(*a*) and 20(*b*).

Figure 27:
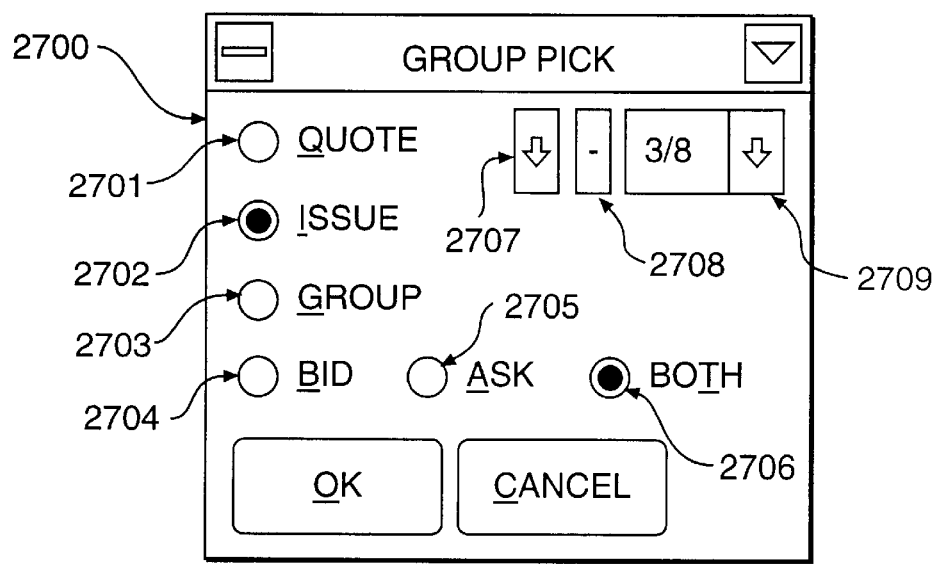
FIG. 27 is an illustration of a Group Tick window.

Selecting Tick button 2540 in FIG. 25 causes FIPS to display the Group Tick window. Group Tick window 2700, shown in FIG. 27, allows the user to tick update either a single quote by selecting button 2701, all quotes for a single issue, by selecting button 2702, or an entire group of issues, by selecting button 2703. The user can also tick update either bid quotes, by selecting button 2704, ask quotes, by selecting button 2705, or both bid and ask quotes, by selecting button 2706. The tick value may be moved up by selecting button 2707, down by selecting button 2708, or to any desired value by using list box 2709.

Figure 28:
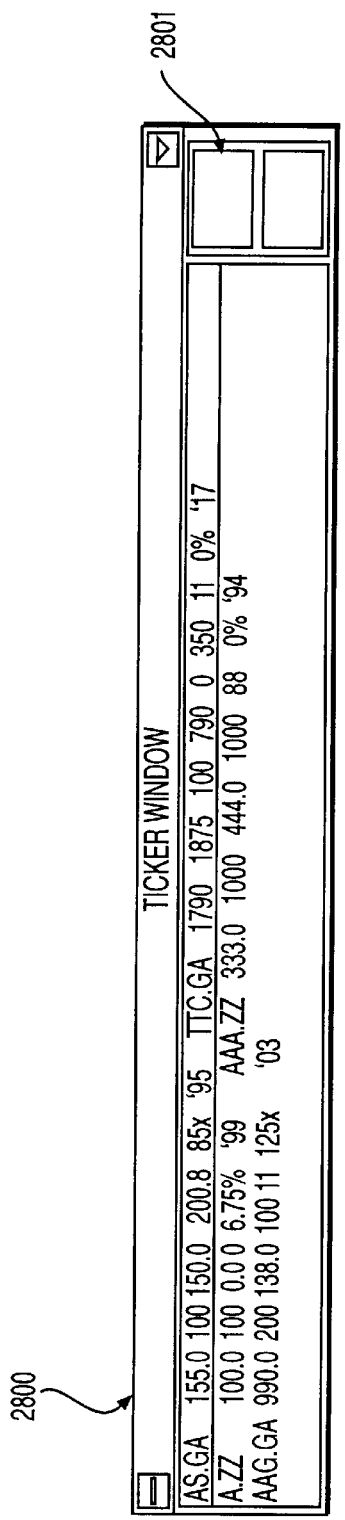
FIG. 28 is an illustration of a Ticker window.

Ticker button 2550 in FIG. 25 causes FIPS to display a ticker window 2800 for the selected group as shown in FIG. 25. The ticker displays the current inside quotes for a group. FIG. 28 shows a ticker window 2800 which FIPS displays when the user selects the ticker function button 2550 in FIG. 25. Ticker window 2800 displays data for the group named in the title.

The user can open one ticker per group up to a maximum of 10 tickers. Each ticker includes the coupon rate and maturity year to identify the issue, and the inside quote including bid, ask, and size. The ticker does not show last sale.

After a ticker process is started and a ticker window displayed, data scrolls, for example, up and to the left. The system will continue to scroll up the display as new lines are filled. When the last issue in the list is displayed, the system will begin again at the top of the list.

FIPS allows users to change the number of lines in the ticker display by resizing the ticker window using size button 2801. The minimum height of the ticker window is the height required to display a single line of ticker data. The maximum height of the ticker display is the height required to display 15 lines of data. When the user selects size button 2801, FIPS adjusts the height of the ticker window the nearest whole line of data.

Figure 29:
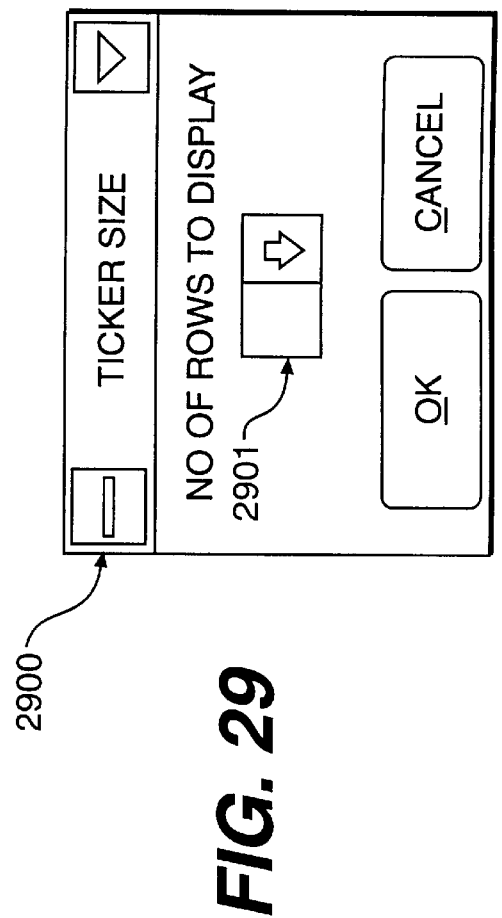
FIG. 29 is an illustration of a Ticker Size window.

When a user selects the button 2801, FIPS displays ticker size window 2900 as shown in FIG. 29. The user selects the desired number of lines in list box 2901 and presses OK button 2902 to signal FIPS to change the size.

Custom View button 2560 in FIG. 25 allows users to customize the view of the selected group's data items. All changes to the data items in the group will be saved as this group's default for future viewing. When the user selects button 2560, the FIPS software presents the user with Customize View Market window 3000 in FIG. 30 allowing the user to select the display columns for the Market View window 2500. The user reaches this window from two different paths, each with slightly different effects. If the Custom View button 2560 is selected from the Market View window 2550, the customizing applies only to that group. If the Customize function button 2560 is selected from the Maintain Group window, described below, the customizing applies to the current selection in the Maintain Group Window's combination box 3220.

Figure 30:
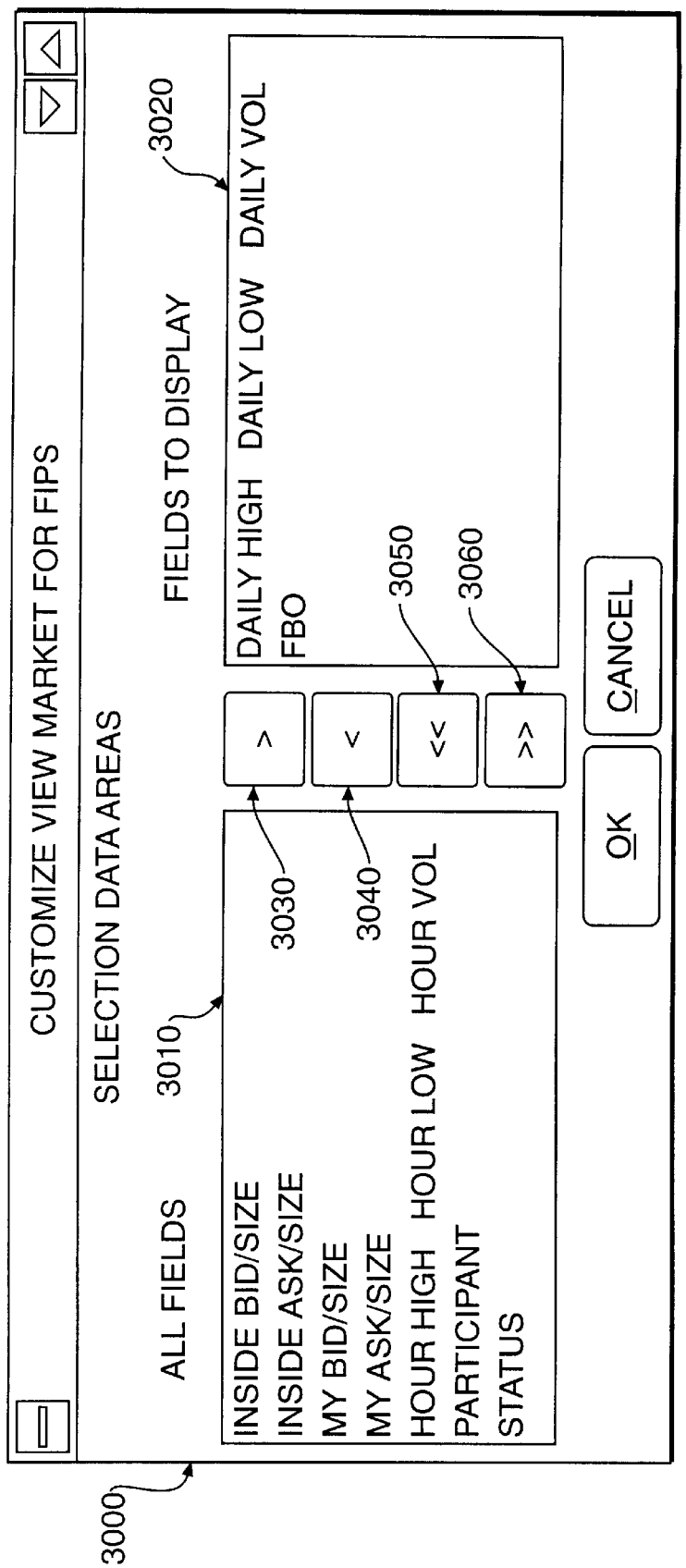
FIG. 30 is an illustration of a Customize View Market window.

FIG. 30 provides an illustration for customizing the FIPS group if accessed from the Market View window 2500. The window can display inside data and trade data on other items. The inside data includes Inside Bid/Size; My Bid/Size; Inside Ask/Size; and My Ask/Size. The Trade data includes Hour High; Hour Low; Hour Vol; Daily High; Daily Low; and Daily Vol. Other items include Participant; Status; and FBO.

Window 3000 also contains several function buttons. The ">" button 3030 allows the user to transfer a data item from list box 3010 to list box 3020. The "<" button 3040 allows the user to transfer data items from list box 3020 to list box 3010. The "<<" button 3050 transfers all data items from list box 3020 to list box 3010. The ">>" button 3060 transfers all data items from list box 3010 to list box 3020.

Window 3000 contains two list boxes of data items. List box 3020 contains the fields to display in the View Market window 2500. List box 3010 contains the fields that will not by displayed in the View Market window 2500. The user selects and transfers data items from one list box to the other depending on whether the item is to be displayed.

2. View Broker/View Dealer

Figure 31A:
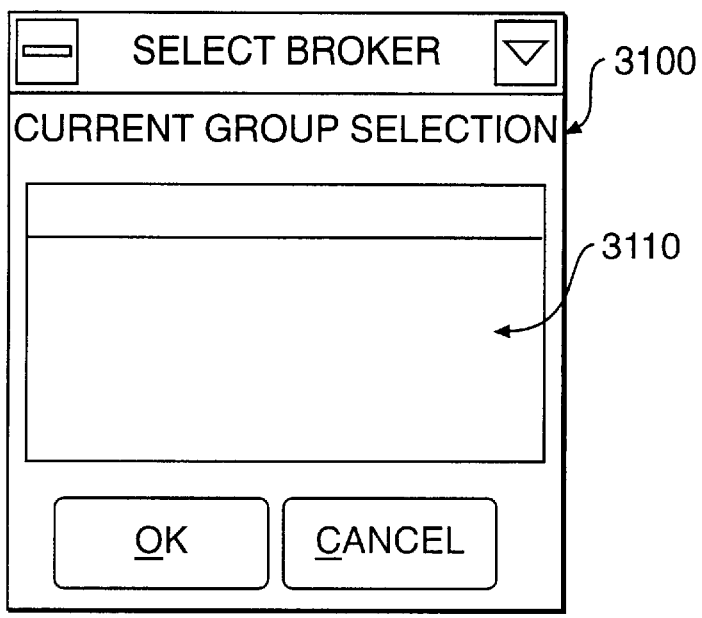
FIG. 31(a) is an illustration of a Select Broker window.
Figure 31B:
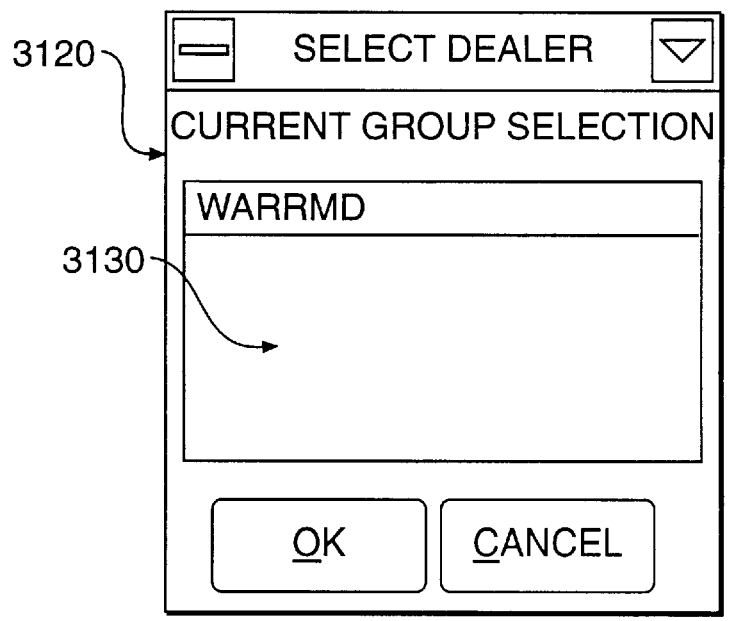
FIG. 31(b) is an illustration of a Select Dealer window.

A dealer selects the View Broker function 2302 from menu 2300 to activate Select Broker window 3100 illustrated in FIG. 31(*a*). A broker selects the View Dealer function 2312 from menu 2310 to activate Select Dealer window 3120 illustrated in FIG. 31(*b*).

When presented with windows 3100 or 3120, users select a participant ID which represents another participant. If the user is a broker, list box 3110 contains all dealers (FBO field) for which the broker maintains a quote. If the user is a dealer, list box 3130 contains IDs for all brokers that maintain a quote for this user.

After a user selects a broker (or dealer) from the list, FIPS displays the Market View window 2400 (FIG. 24) which contains data pertaining to the selected user. After a dealer selects a broker, the view contains all issues that match the user to the broker selected. After a broker selects a dealer, the view contains all issues that match the user to the dealer selected.

3. Maintain Group

Figure 32:
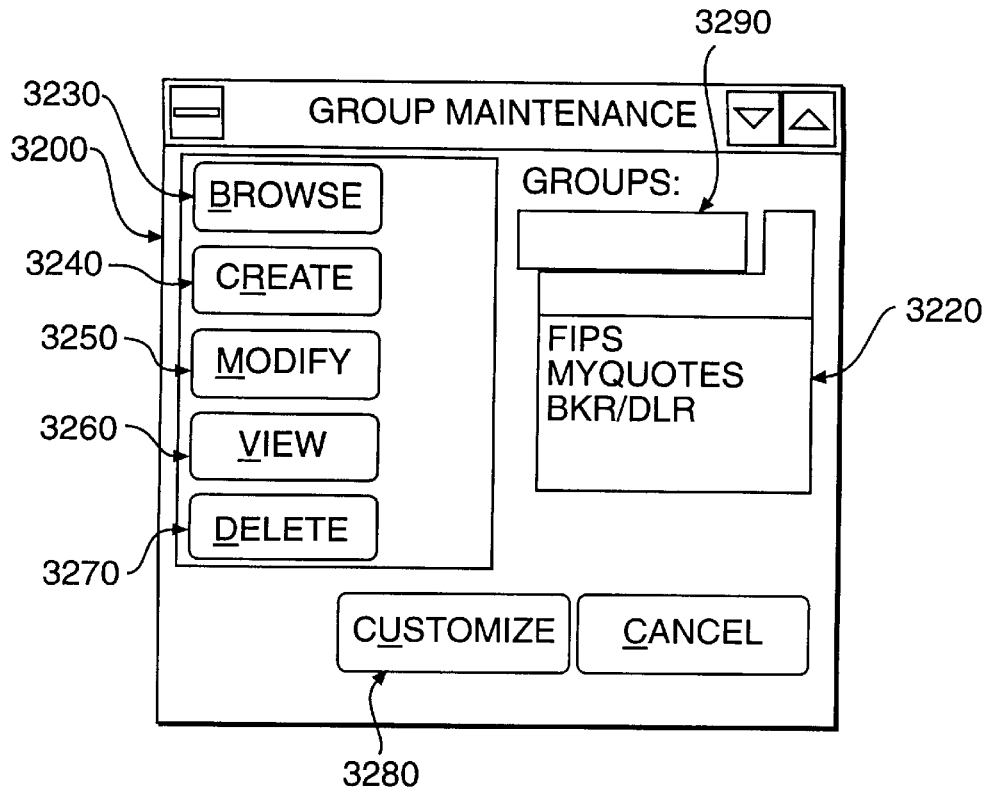
FIG. 32 is an illustration of a Group Maintenance window.

If a user selects the Maintain Group function 2303 from menu 2300 or function 2313 from menu 2310, the FIPS software displays the Group Maintenance window 3200 as shown in FIG. 32. Window 3200 allows users to maintain customized groups of issues. Window 3200 accesses system-defined groups and user-defined groups and displays names in combination box 3220. Only system-defined names are shown in FIG. 32. Once a user selects a group, he may choose various operations by selecting an appropriate button. These buttons include Browse button 3230, Create button 3240, Modify button 3250, View button 3260, and Delete button 3270.

Figure 33:
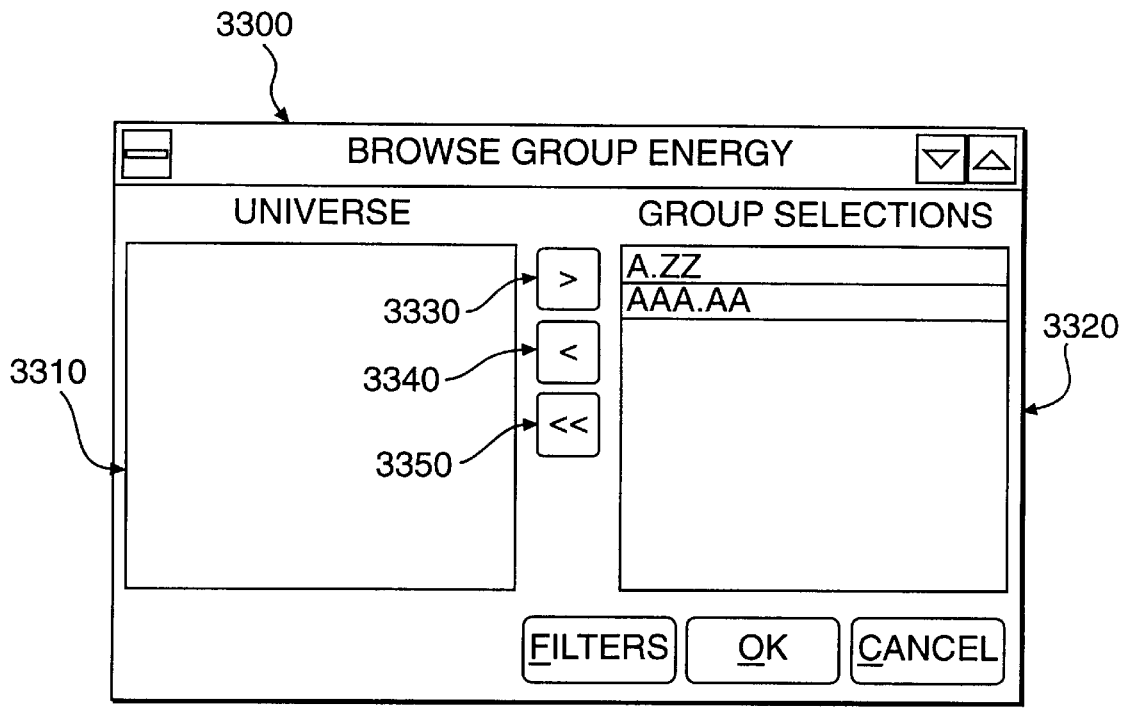
FIG. 33 is an illustration of a Browse Group window.

Selecting Browse button 3230 allows a user to browse the list of issues in a group for which the user has selected a group name from the Groups list 3220. In response, the FIPS software presents Browse Group window 3300 as shown in FIG. 33.

In window 3300, list box 3310 lists all issues, and list box 3320 lists those issues selected for a particular group. The functions selected by ">" button 3330, "<" button 3340, and "<<" button 3350 move selected issues from one list box to the other as described in reference to FIG. 30.

Figure 34:
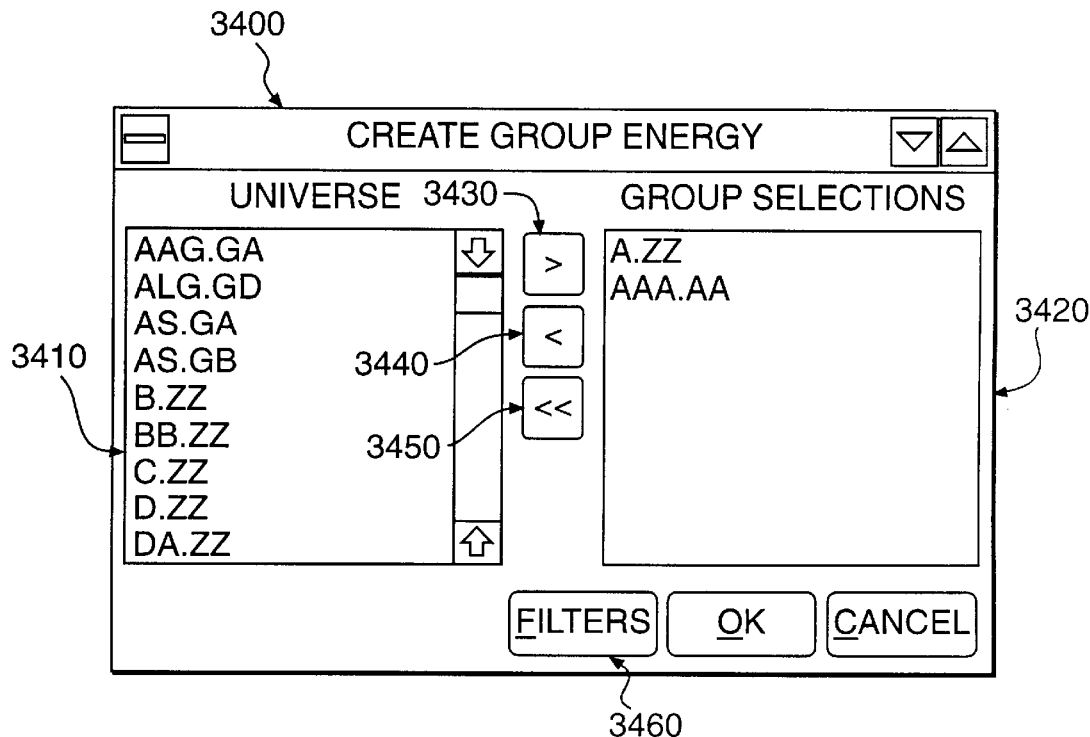
FIG. 34 is an illustration of a Create Group window.

If, instead of browsing, a user wishes to create a new group of bond issues, the user enters a new name in the Groups combination box 3290 of window 3200 and selects the Create button 3240. In response, the FIPS software presents Create Group window 3400 shown in FIG. 34. Bond issues that a user can select are displayed in the Universe list box 3410, and a group's bond issues are displayed in the Group Selections list box 3420. To add a bond issue to a group, the user selects it from Universe list box 3410 and then selects the ">" button 3430. The selected issue will then appear as the next item in the Group Selections list box 3420. To delete an issue from the group, a user selects it from the Group Selections list box 3420 and the selects the "<" button 3440. The issue will then be deleted from the group. Selecting the "<<" button 3450 deletes all issues for the group.

Figure 35:
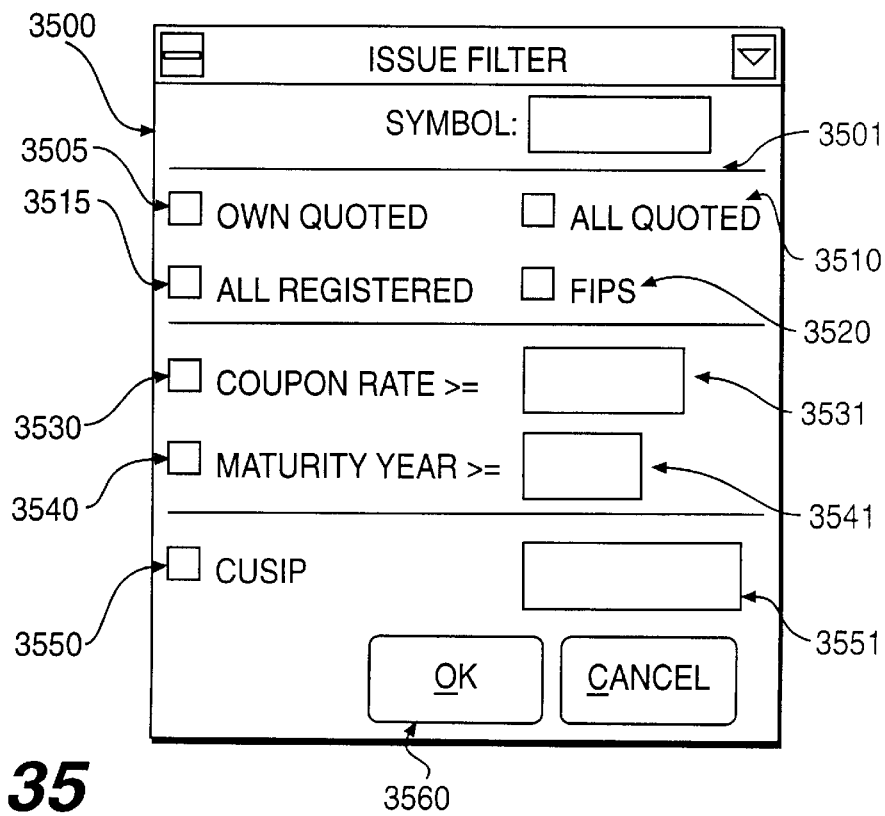
FIG. 35 is an illustration of an Issue Filter window.

When the user selects Filters button 3460, FIPS displays an Issue Filter window 3500 as shown in FIG. 35 from which the user selects one or more filter criteria. The criteria are represented by the various functions. Entering a symbol in field 3501 allows a user to begin listing issues by symbol. The user may enter a partial or full symbol ID.

Selecting Own Quoted button 3505 displays all FIPS and Non-FIPS issues containing quotes for this user. Selecting All Quoted button 3510 displays all FIPS and Non-FIPS issues containing quotes. Selecting All Registered button 3515 displays all issues for which the dealer is registered to quote. Selecting FIPS button 3520 displays all FIPS issues.

A user may also select Coupon Rate button 3530 and enter a coupon rate in the associated text box 3531. FIPS will then search the issue table 731 (FIG. 7) for issues at the given rate. If this field is checked, it becomes the primary key for the list. A user may also select Maturity Year button 3540 and enter a year in the associated text box 3541. This allows a participant to browse the issue table 731 in ascending order from the maturity year.

Selecting CUSIP button 3550 allows users to browse the issue table 731 by the issuer CUSIP member. When the selections have been made a user selects the OK button 3560. If no buttons are selected in window 3500, window 3400 displays all FIPS Securities alphabetically by symbol.

Figures 36, 37:
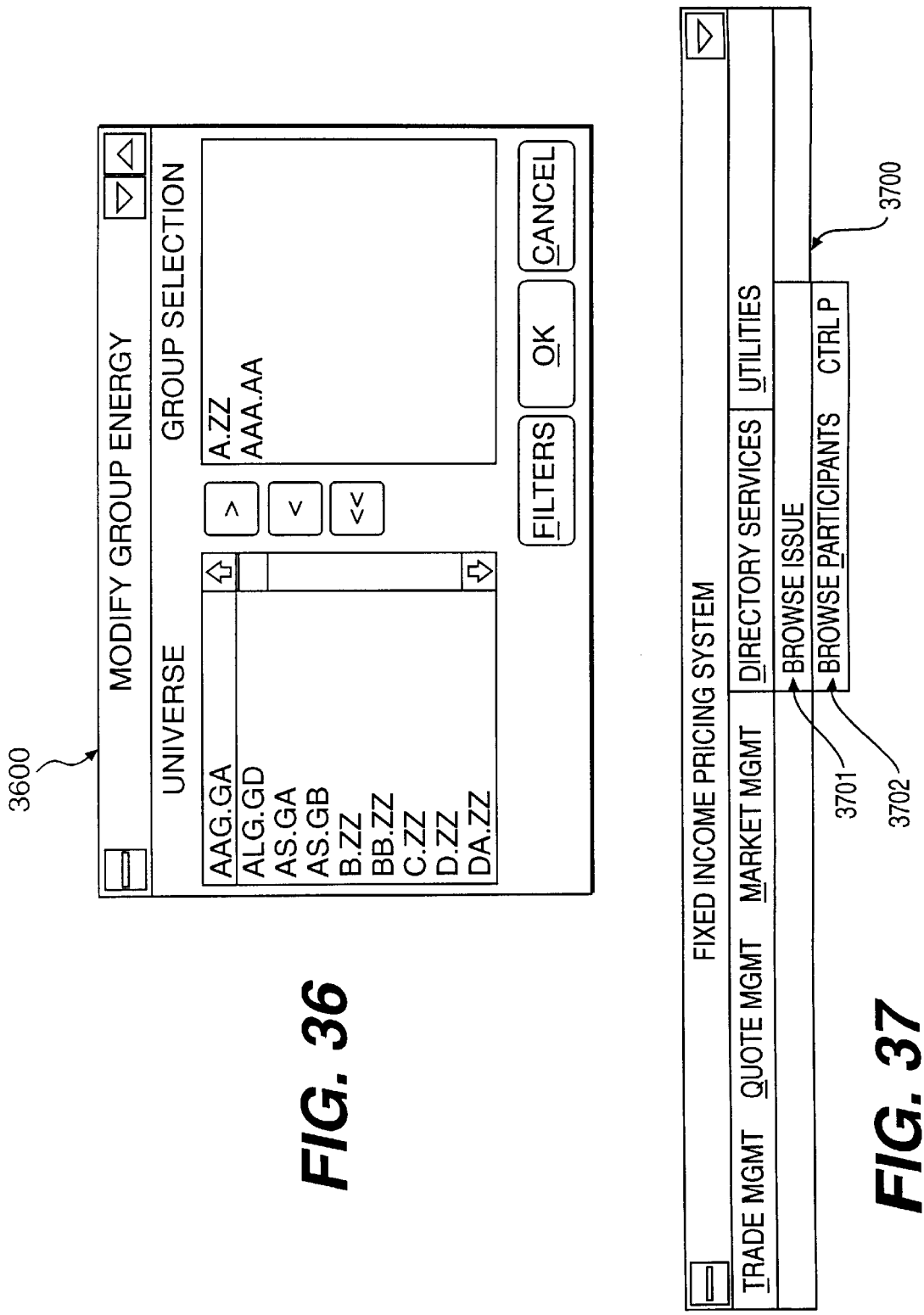
FIG. 36 is an illustration of a Modify Group window.
FIG. 37 is an illustration of a Directory Services Menu.

Returning to FIG. 32, a user can modify a group's list of issues by selecting Modify button 3250 and a group from the list box 3220. This causes the display of Modify Group window 3600 as shown in FIG. 36. Modify Group window 3600 is used in the same manner as Create Group window 3400 in FIG. 34.

If a user selects a group from list box 3220 and then selects View button 3260 from window 3200 of FIG. 32, FIPS displays an window similar to Browse Group window 3300 so the user may view the issues in a particular group. If a user selects a group from list box 3220 and then selects Delete button 3270, FIPS deletes that group from the list box 3220. The user must recreate the group to have it return.

E. Directory Services

If, in FIG. 10, a user selected Directory Service function 1060 from menu bar 1000, FIPS would display menu 3700 as shown in FIG. 37. The user may then choose Browse Issues function 3701 or Browse Participants function 3702.

1. Browse Issues

Choosing Browse Issues function 3701 allows the user to view data contained in the Participant file 722 (FIG. 7). Once the user selects this function, the FIPS software presents the user with a window similar to window 3500 shown in FIG. 35. The user operates this window in the same manner as window 3500, and when the user selects the OK button, FIPS displays Browse Issues window 3800 according to the criteria selected for filtering. Choosing More button 3810 scrolls the window.

2. Browse Participants

Figure 39:
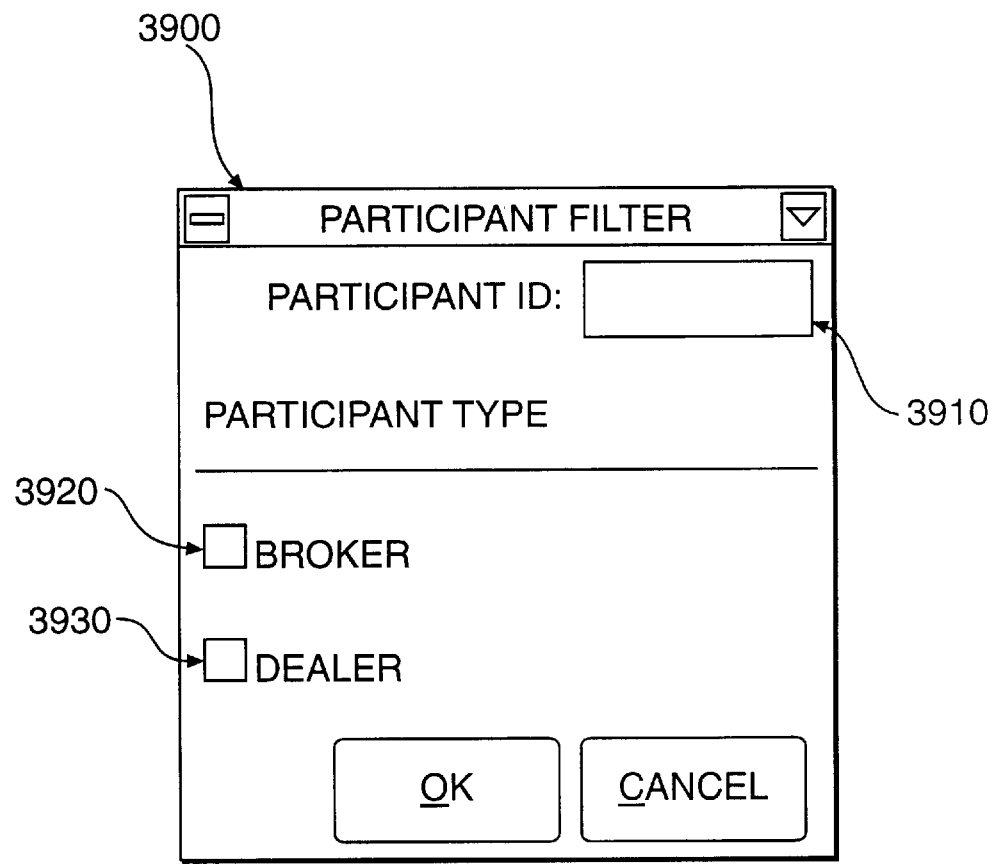
FIG. 39 is an illustration of a Participant Filter window.

Choosing the Browse Participants function 3702 activates a Participant Filter window 3900 shown in FIG. 39. Window 3900 allows users to define filters to view user data. Users may enter a participant ID in field 3910, select Broker field 3920, or select Dealer field 3930.

After choosing the desired filters, the user can select OK button 3940, causing FIPS to display a Browse Participants window, such as window 4000 in FIG. 40.

F. Utilities

Figure 41:
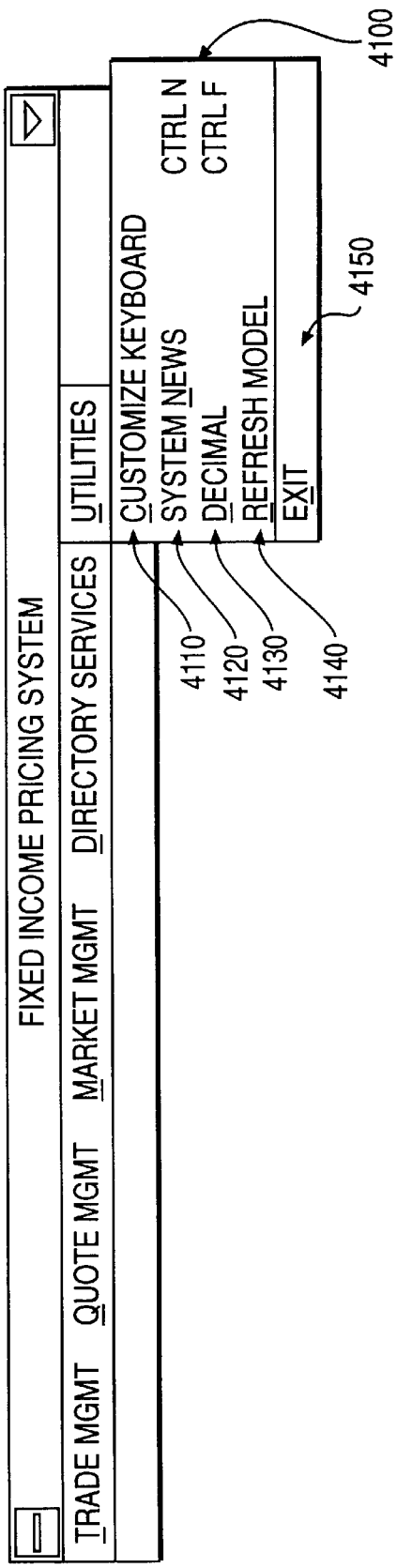
FIG. 41 is an illustration of a Utilities Menu.

If the user selects function 1070 from menu 1010 in FIG. 10, the FIPS software presents menu 4100 as shown in FIG. 41. FIPS Utilities menu 4100 gives users the ability to choose the Customize keyboard function 4110, System News function 4120, Decimal function 4130 to change from decimal to fractional representation, Refresh Model function 4140 to refresh the data on the workstation or Exit function 4150 to leave the FIPS application.

Customize Keyboard function 4110 allows the user to assign function keys to fractions (such as ⅛, ¼, and ½). System News function 4120 allows users to look at current FIPS system news. Decimal function 4130 toggles between decimal and fractional modes for entering prices. Refresh Model function 4140 obtains new data from the FIPS host 210 (FIG. 2) for the FIPS data stored on the workstation. Exit function 4150 allows the user to log off and exit from the FIPS application.

Users are also alerted to any newsworthy information by the Broadcast News Alert window. This window automatically appears after an administrative user generates a news message by any of the following actions: modifying the status of an issue; modifying the status of a user; and comparing a news message. The Broadcast News Alert Window displays only the most recent news message. If users want to see any earlier news items, they can select the System News menu item. When opened, the System News Window displays the most recent news.

V. SYSTEM ADMINISTRATION

Figure 42:
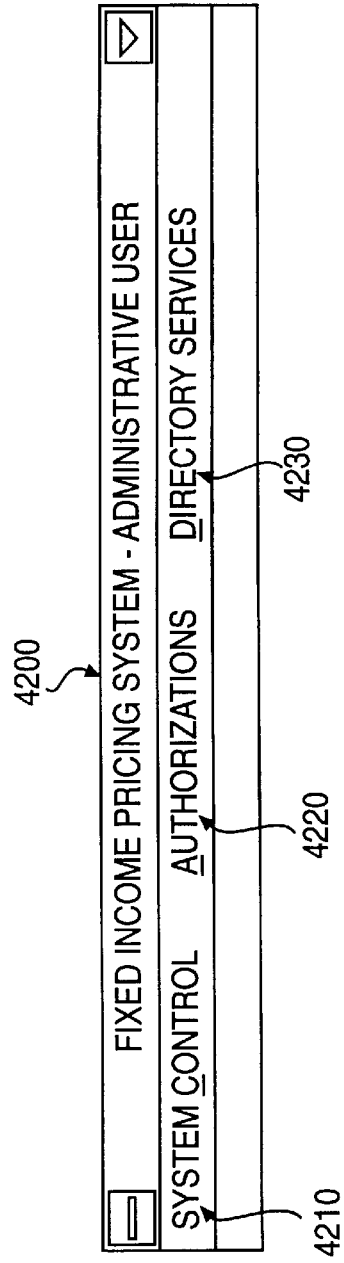
FIG. 42 is an illustration of an administrative user's main window.

FIPS administrative functionality is accessed from the administrative user main menu bar 4200 as shown in FIG. 42. Only administrative personnel are entitled to access these functions.

The administrative user menu bar contains functions for System Control 4210, Authorizations 4220, and Directory Services 4230.

A. System Control

Figure 43:
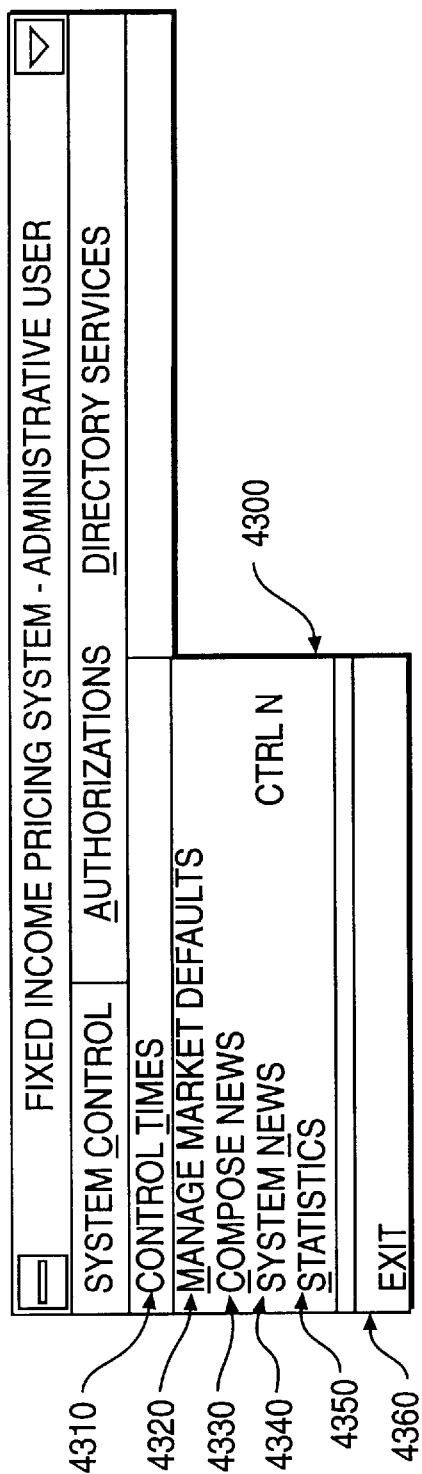
FIG. 43 is an illustration of a System Control Menu.

FIPS System Control functions are accessed according the System Control menu 4300 shown in FIG. 43. Menu 4300 includes Control Times function 4310, Manage Market Defaults function 4320, Compose News function 4330, System News function 4340, Statistics function 4350, and Exit function 4360.

1. Control Times

Figure 44:
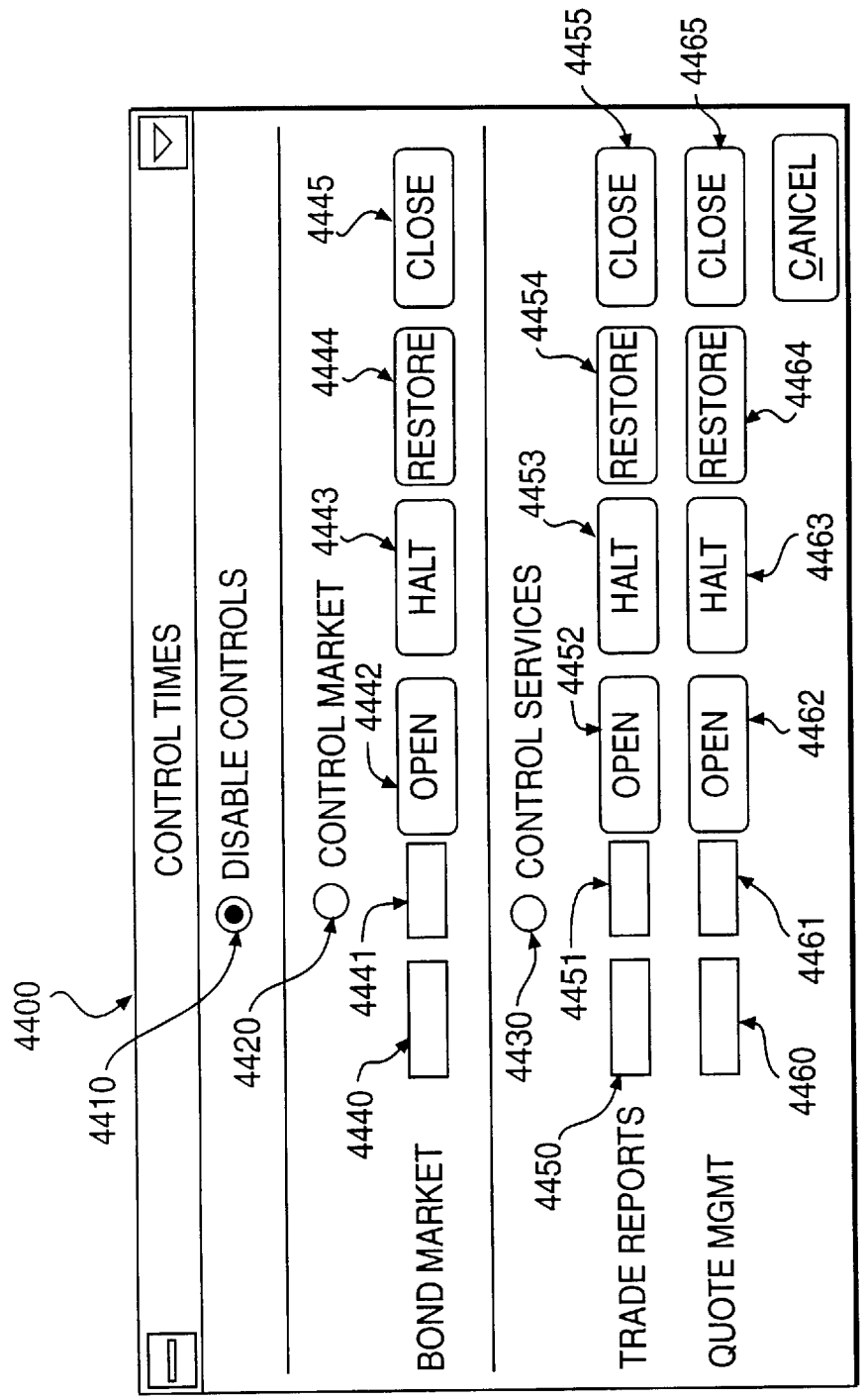
FIG. 44 is an illustration of a Control Times window.

When the user selects Control Times function 4310, the FIPS software presents window 4400 shown in FIG. 44 to control the status of the market. The market, in this instance, is the collection of FIPS functions and services which allow trade reporting and quoting.

The user selects Disable Controls button 4410 to prevent unintentional changes. If the user selects Control Market button 4420, the user controls the status of the entire market. If the user selects Control Services button 4430, the user may separately control the status of the trade reporting functions and quote management functions. For example, text box 4440 displays the current status of the market, and text box 4441 displays the time the current status became effective.

If the user selects Open button 4442, it will have no effect since the market is already in an open status. However, if the user selects Halt button 4443 when the market is in an open status, the FIPS software will suspend market operations. The user must then select Restore button 4442 to reopen the market. The user selects the Close button 4445 when the market is open or halted to close the market and stop all activity.

If the user selects Control Services button 4430, the user may control trade reporting and quote management similar to controlling the entire market as described above.

2. Manage Market Defaults

Figure 45:
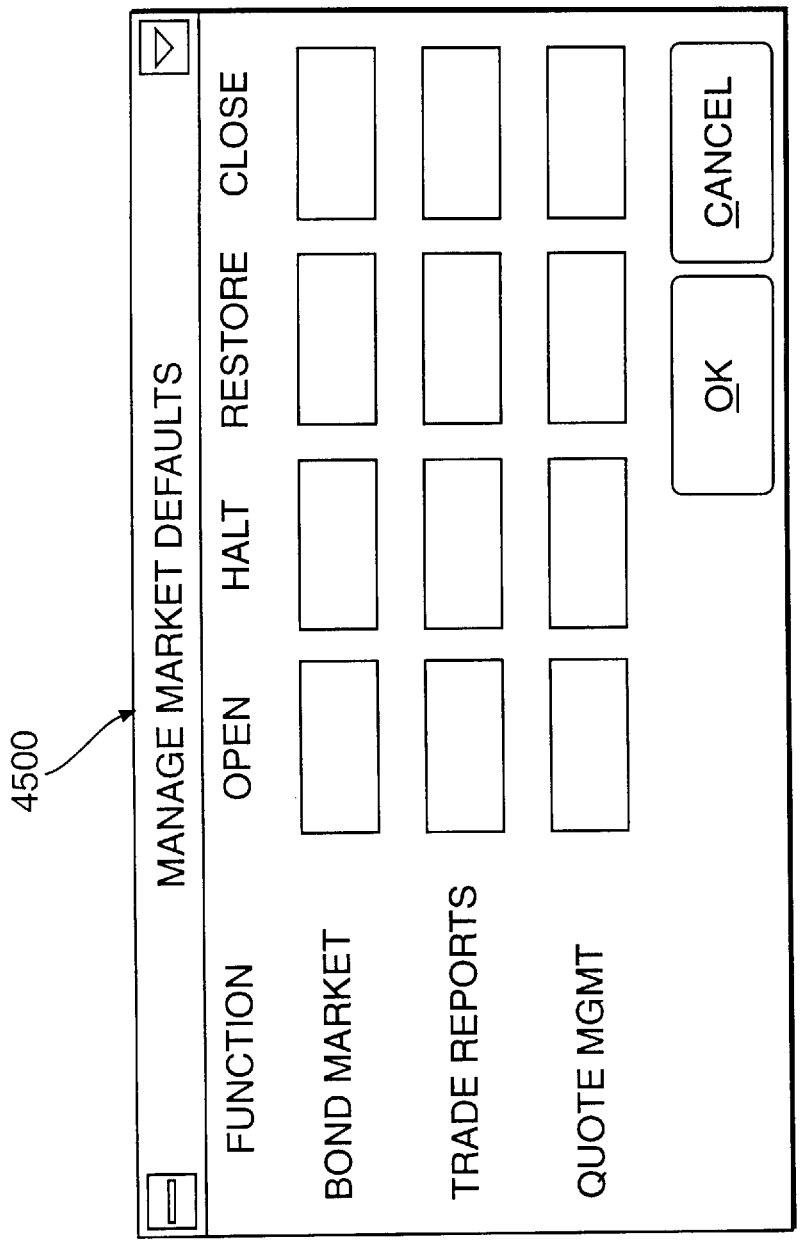
FIG. 45 is an illustration of a Manage Market Defaults window.

To create the default times used in window 4400, the user selects Management Market Defaults function 4320 from menu 4300. In response, the FIPS software presents Manage Market Defaults window 4500 as shown in FIG. 45. With window 4500 users may set the open, halt, restore, and close times for the bond market, trade reports, and quote management.

3. Compose News

Figure 46:
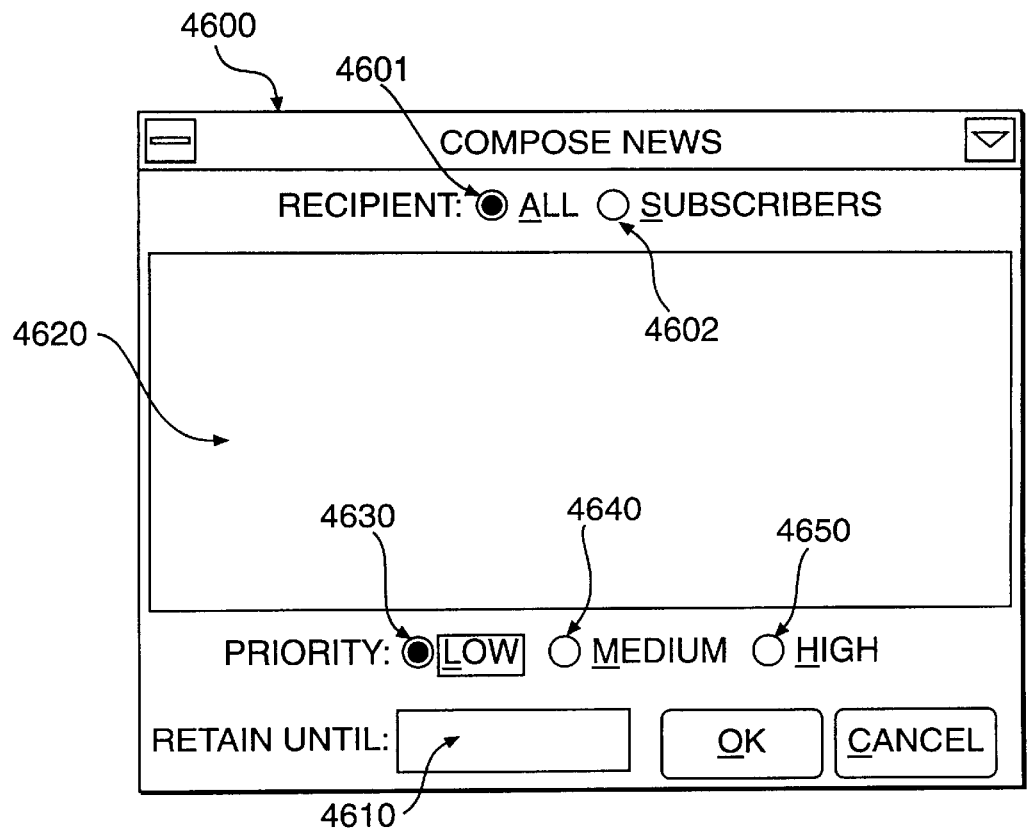
FIG. 46 is an illustration of a Compose News window.

If a user selects the Compose News function 4330 from the menu 4300, the FIPS software presents Compose News window 4600 as shown in FIG. 46. With window 4600 users select the recipients, either all or only subscribers, using buttons 4601 and 4602, respectively. Subscribers are those users who are not part of the system administration. The user then types the news into window 4620 and selects priority as either low, using button 4630, medium, using button 4640, or high, using button 4650. The users may also indicate how long FIPS will retain the message in text box 4610.

4. System News

Figure 47:
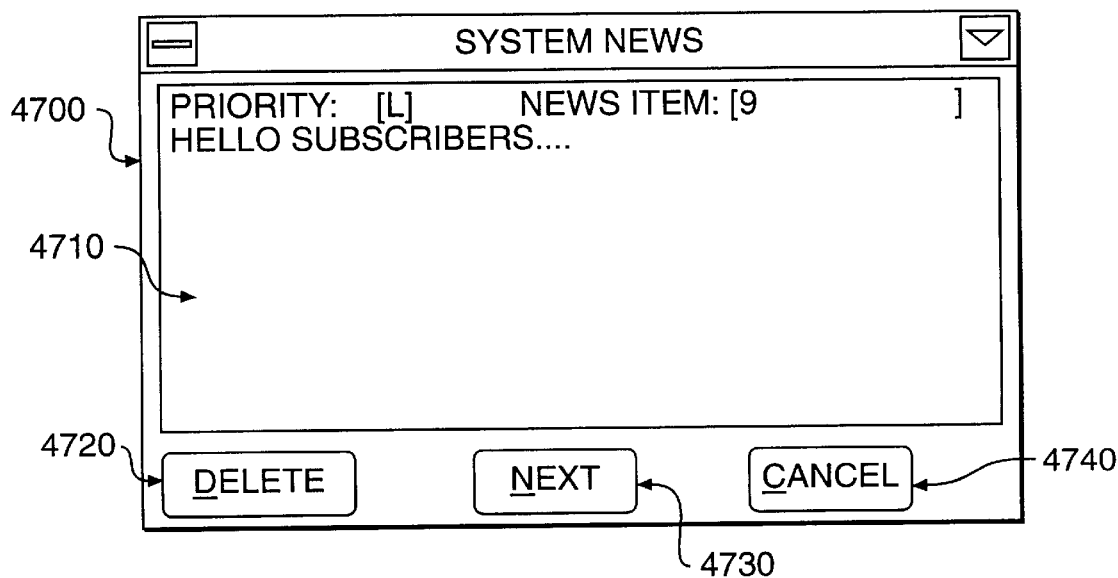
FIG. 47 is an illustration of a System News window.

If a user selects the System News function 4340 from the menu 4300, the FIPS software allows the user to view current news messages or delete specific ones using window 4700 shown in FIG. 47. The news messages are shown one at a time in text box 4710. The user may select Delete button 4720 to delete the message, next button 4730 to view the next message, or cancel button 4740 to exit the function.

5. Statistics

Figure 48:
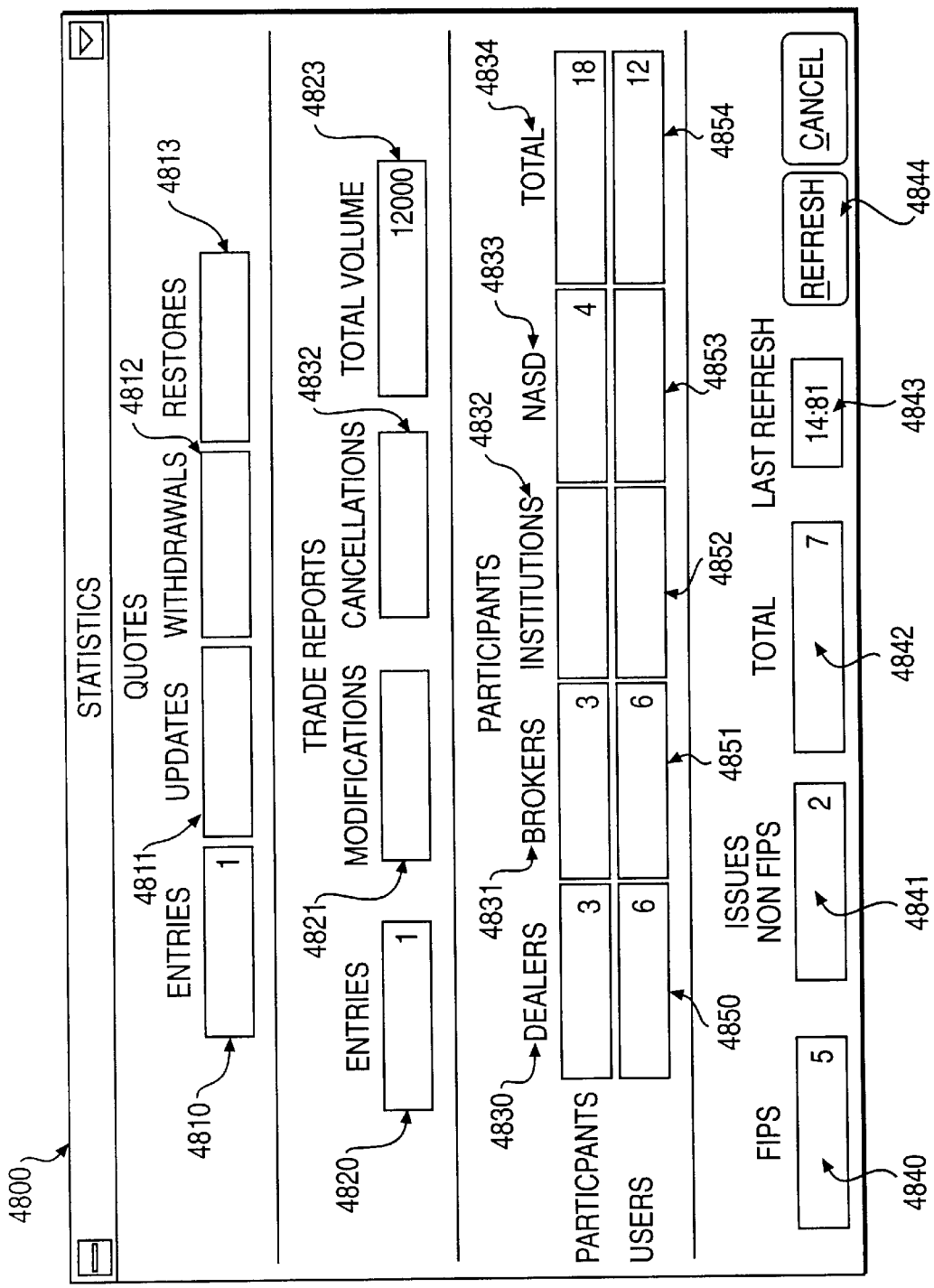
FIG. 48 is an illustration of a Statistics window.

If the user selects the Statistics function 4350 from menu 4300, the FIPS software presents summary information about the current day's trade reports, quotes, participants and users, and Issues as shown in window 4800 of FIG. 48. Window 4800 shows information about quotes during the current day, including field 4810 which shows the number of quote entries, field 4811 which shows the number of quote updates, field 4812 which shows the number of withdrawals, and field 4813 which shows the number of restores.

Information about trade reports during the current day including the number of entries in field 4820, the number of modifications in field 4821, the number of cancellations in field 4822, and the total volume in field 4823.

Participant statistics include, for participants and users, the number of dealers in field 4830 and 4850, the number of brokers in fields 4831 and 4851, the number of institutions in fields 4832 and 4852, the number of NASD firms in fields 4833 and 5833, and totals for both participants and users in fields 4834 and 4854.

Also shown are the number of FIPS issues in field 4840, the number of non-FIPS issues in field 4841, and the total number of issues in field 4842 as well as the last time the window was refreshed in field 4843.

If the user selects the Refresh button 4844, the FIPS software updates all the fields in window 4800 and displays the refresh time in field 4843.

6. Exit

When a users chooses Exit function 4360, FIPS logs the user off the FIPS system.

B. Authorizations

A users authorizes issues and participants be selecting the Authorization function 4220 from menu bar 4200. In response, FIPS displays Authorizations menu 4900 shown in FIG. 49.

FIPS uses a Participant Symbol to represent a firm trading in fixed income securities. The administrator must add a participant to FIPS in order for the firm to perform any FIPS function. Each FIPS Participant has Users who must be assigned login IDs and passwords through an Authorize Users sub-window.

1. Authorize Issues

Figure 49:
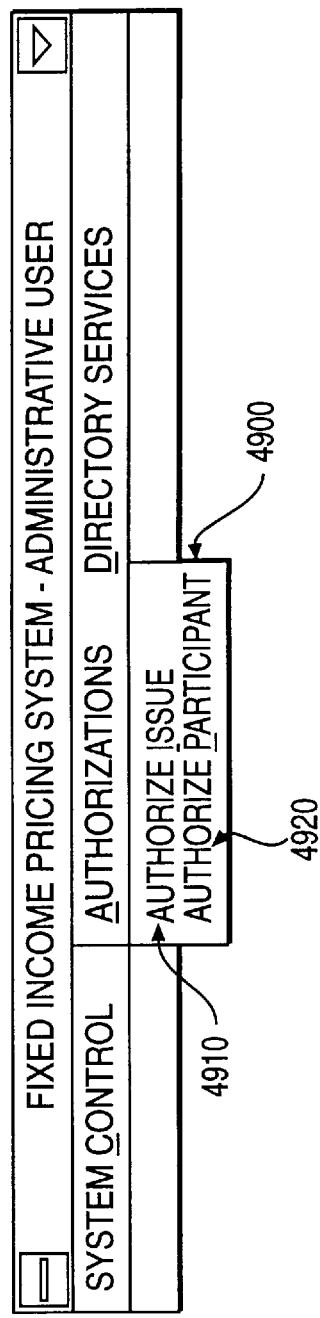
FIG. 49 is an illustration of an Authorizations menu.
Figure 50:
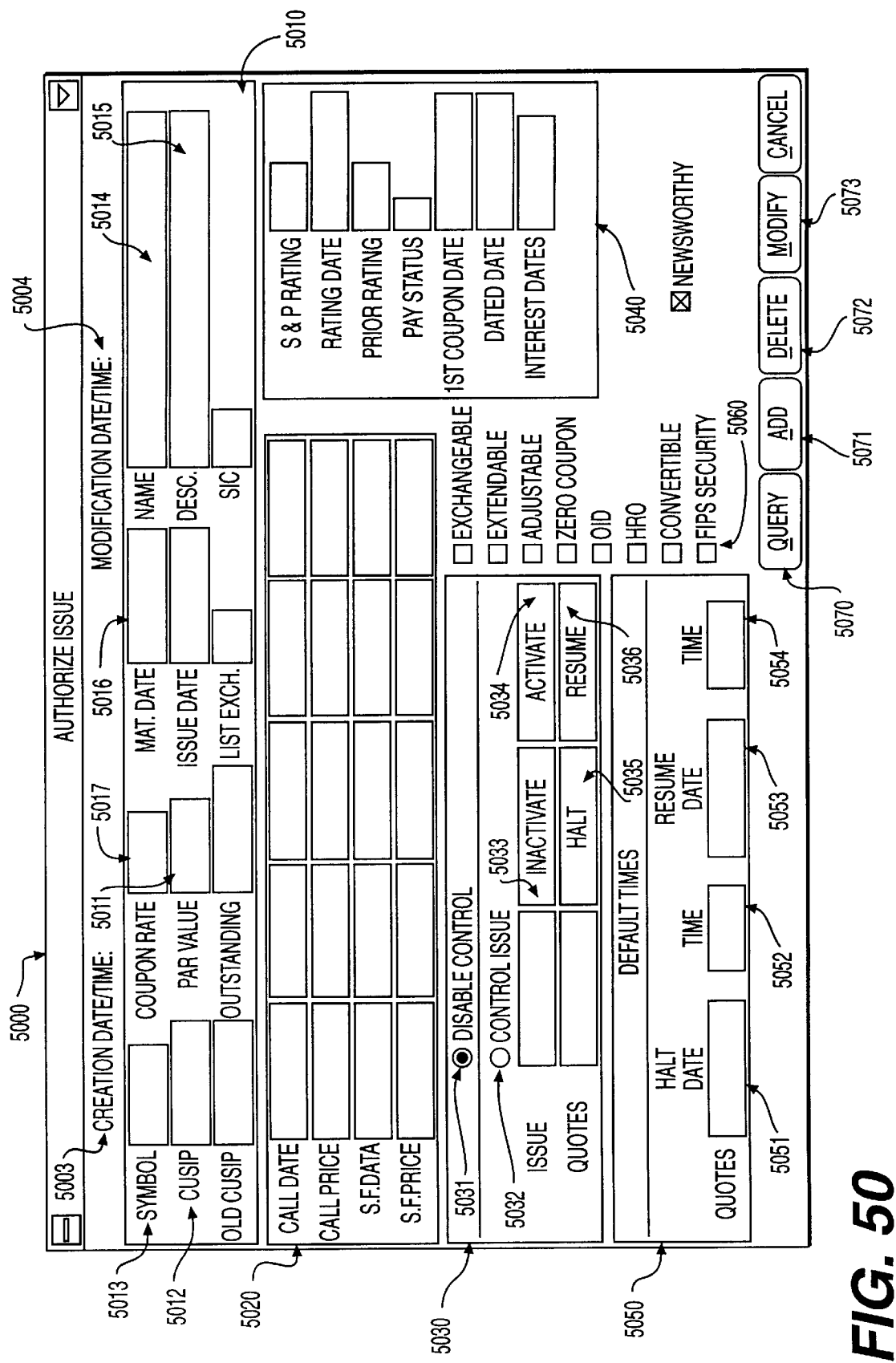
FIG. 50 is an illustration of an Authorize Issue window.

When a user selects Authorize Issue function 4910 from menu 4900 shown in FIG. 49, FIPS displays the Authorize Issue window 5000 shown in FIG. 50. The user can assign issue symbols and designate FIPS issues. Window 5000 also allows the user to view and update an issue. The user accesses a particular issue by entering a symbol in symbol field 5013 and selecting the query button 5070.

Window 5000 contains several fields for issue information. Some of the data is added by the user and some of the data is automatically added by the host 210. The data shown in window 5000 may be grouped into several types of information, including general data shown in area 5010, price and date data shown in area 5020, control data shown in area 5030, rating data shown in area 5040, default times data shown in area 5050, and issue type data shown in area 5060.

Creation Date/Time field 5003 is a system-generated label showing the date and time the issue was added to the FIPS system Modification Date/Time field 5004 is a system-generated label showing the date and time the issue was last modified.

Data included in the general data area 5010 includes Par Value field 5011, which is the value of the bond, CUSIP field 5012, which is the CUSIP designation for the issue, name field 5014, which is the issuers name, description field 5015, which gives a short description of the bond, maturity date field 5016, which shows the maturity date for the issue.

Area 5020 of window 5000 shows information about the call data, call price, S.F. (sinking fund) date and S.F. price.

A user controls the issue activity in area 5030. If the user selects Disable Control button 5031, the remainder of the buttons and fields in this area have no effect. On the other hand, if the user selects Control Issue button 5032, the user may control the availability of the issue and its quote activity.

If a user selects InActivate button 5033, the issue is no longer active in FIPS. The Activate button 5034 allows the user to place the issue in active status. A user can also control whether quotes are allowed on a issue using Halt button 5033 to stop quotes, and Resume button 5036 to allow quotes.

A user may establish default times for quote halts and resumes in area 5050. In Halt Date field 5051, the user enters a date when quoting for the issue is to be halted. The user enters the halt time in Time field 5052. The user enters the date and time when quoting may resume in Date field 5053, and Time field 5054, respectively.

A user may specify the type of issue in area 5060. The user merely has to select the buttons defining the issue to specific its type.

A user may also access other functions from Authorize Issue window 5000. If the user selects the Query function 5070, he will obtain data on an issue based on a previously entered Symbol or the CUSIP. If the issues from the Standard and Poor's database and is not yet in the FIPS Issue table 732. In response, FIPS sends the data to complete window 5000.

If the user selects Add button 5071 for a new issue, FIPS receives the data entered in window 5000 for processing. If the user selects Query button 5070 to retrieve the data for an issue and then selects Delete button 5072, FIPS deletes the issue. If the user selects Query button 5070 to retrieve the data for an issue, modifies the data displayed in window 5000, and then selects Modify button 5073, FIPS will modify the data in FIPS host 210 according to the changes made by the user.

When an issue is added, modified, or deleted, a News Alert is sent (at the Administrators discretion) to other users if Newsworthy field 5068 is selected.

2. Authorize Participants

Figure 51:
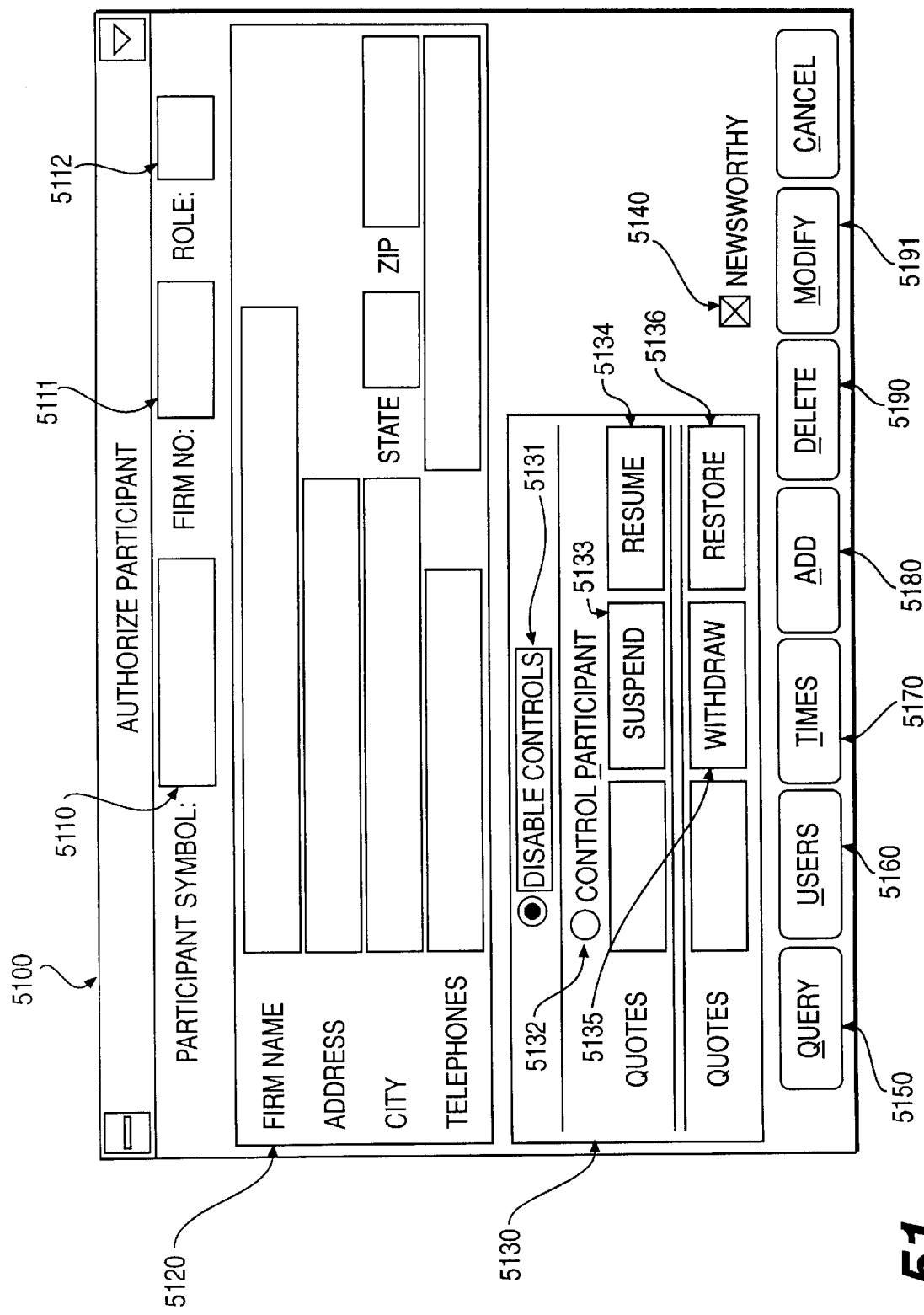
FIG. 51 is an illustration of an Authorize Participant window.

Before having access to FIPS, a participant must be authorized using Authorize Participant function 4920 from menu 4900 shown in FIG. 49. If a user who is allowed to authorize participants selects Authorize Participant function 4920, FIPS displays Authorize Participant window 5100 shown in FIG. 51.

The user must enter an identification symbol in Participant Symbol field 5110 as well as a firm number in field 5111 and the role of the participant in field 5112. Users can have the following possible roles: dealers, member firms who are dealers; brokers, member firms who are broker's brokers; institutions (view-only participants); and system operations.

In text area 5120, address information about the participant is entered by the authorizer including the firm name, street address, city, state, zip code, and telephone number.

The participant's access can be controlled by the authorizer in area 5130. If the authorizer selects button 5131, the authorizer may change to controls. However, if the authorizer selects Control Participant button 5132, the authorizer may control whether the participant may make quotes and whether the participant may withdraw or restore quotes.

If the authorizer selects Suspend button 5133, FIPS immediately suspends all quote activity for the user on all issues. When the authorizer selects Resume button 5134, FIPS reserves the quote activity.

If the authorizer selects Withdraw button 5135, all quotes for that participant are withdrawn from the FIPS system. If the authorizer selects Restore button 5136, all of the participant's quotes are restored in FIPS.

If the authorizer selects Query button 5150 after having entered a participant symbol if field 5110, FIPS retrieves the information for that participant and displays it in window 5100. The information may be modified or deleted as described below.

Figure 52:
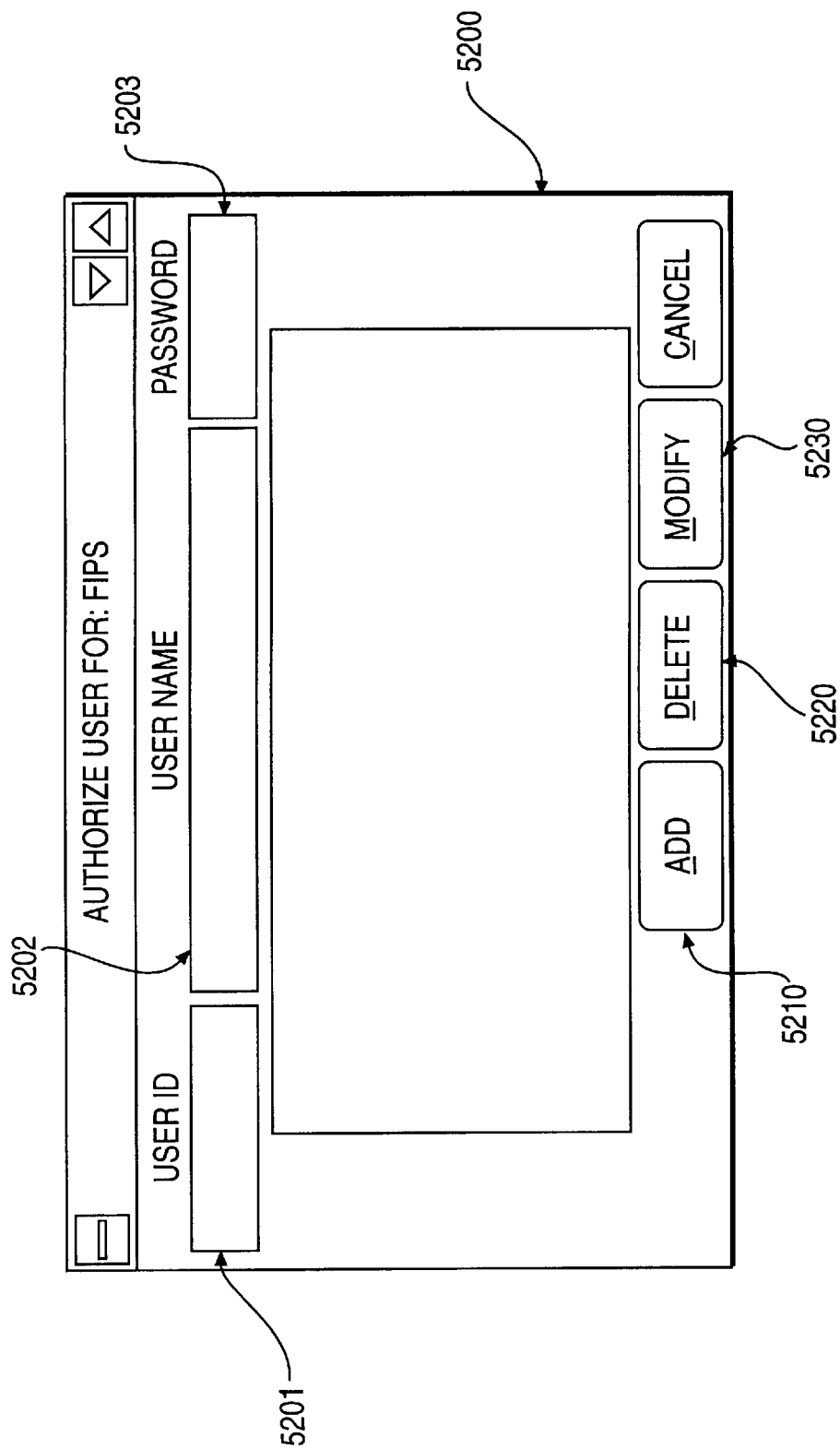
FIG. 52 is an illustration of an Authorize Users window.

If the authorizer selects Users button 5160, FIPS displays the Authorize Users window 5200 shown in FIG. 52. The authorizer enters the users's ID into field 5201 and the user's name in field 5202. The password field 5203 will not display a password for an existing user but allows the authorizer to enter a password for a new user or change a password for an old user.

The authorizer may then add the user by selecting Add button 5210. In a manner similar to that described earlier, the authorizer may delete the user by selecting Delete button 5220, or modify the user information by selecting Modify button 5230.

Figure 53:
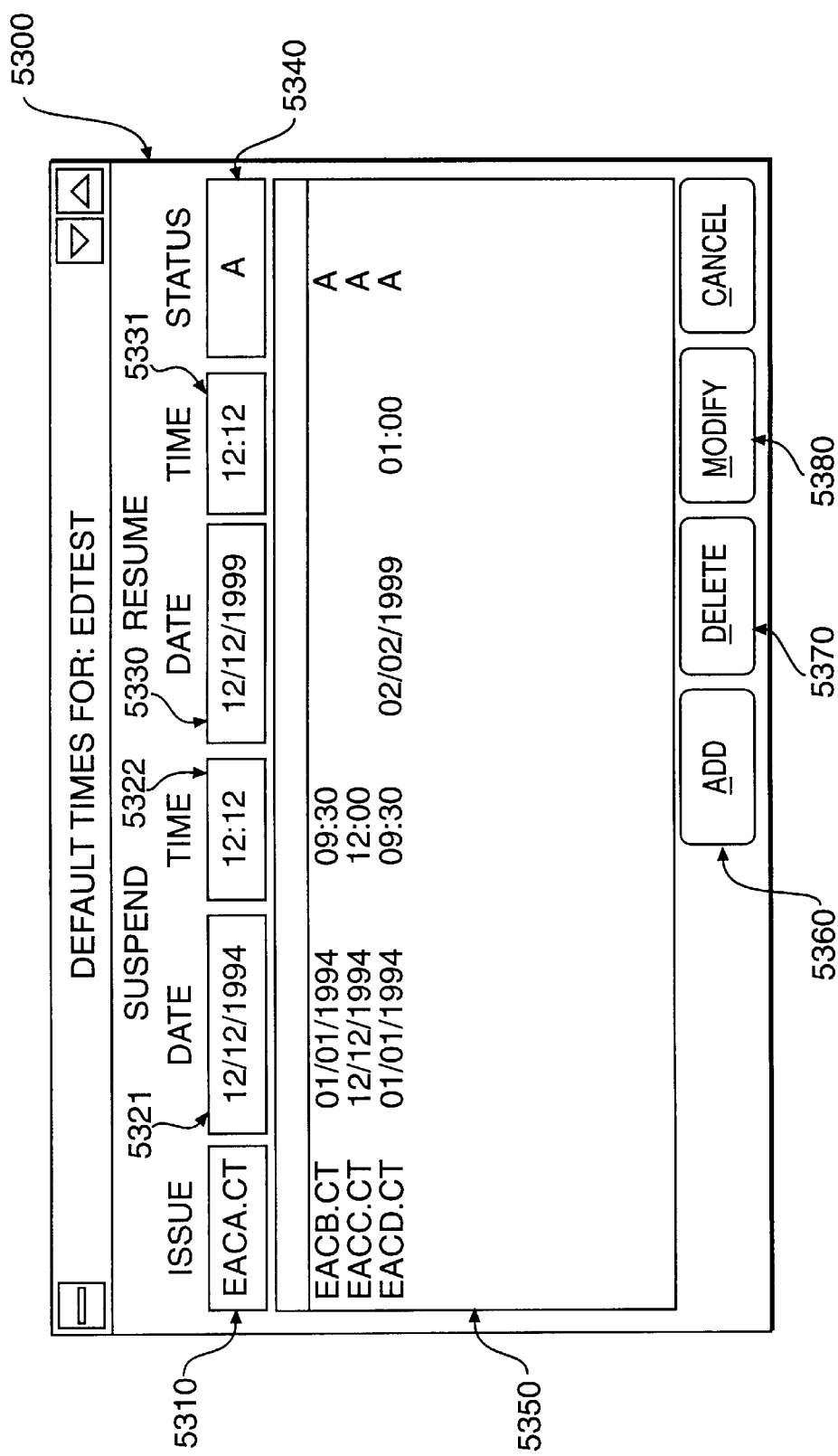
FIG. 53 is an illustration of a Default Times window.

The Authorize Participant window 5100 also allows an authorizer to set dates and times a participant is suspended from trading and can resume trading in particular issues by selecting the Times button 5170 from window 5100. In response to the authorizer selecting button 5170, FIPS displays Default Times window 5300 shown in FIG. 53.

The authorizer enters a particular issue in field 5310. The authorizer then enters a suspend date and time in fields 5321 and 5322, respectively. A resume date and time may also be entered by the authorizer in fields 5330 and 5331, respectively. The field 5340 display the current status of the issue. Once the authorizer has entered the desired information, he selects the Add button 5360 for the information to be processed by FIPS host 210.

Those issues for which the authorizer has set suspended dates and times for a particular participant are displayed in area 5350. If the authorizer selects one of these entries, he may delete or modify the entry by selecting Delete button 5370 or Modify button 5380, respectively.

C. Directory Services

Figure 54:
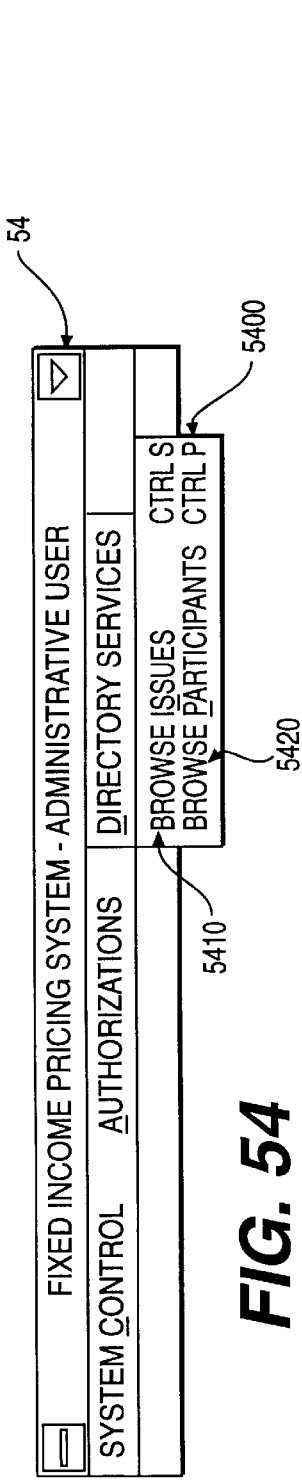
FIG. 54 is an illustration of an Administrative User's Directory Services menu.

A user may browse issue and participant lists using Directory Services function 4230 from menu 4200 shown in FIG. 42. FIPS presents the user with menu 5400 as shown in FIG. 54. The user may then select Browse Issues function 5410 or Browse Participants function 5420.

Figure 55:
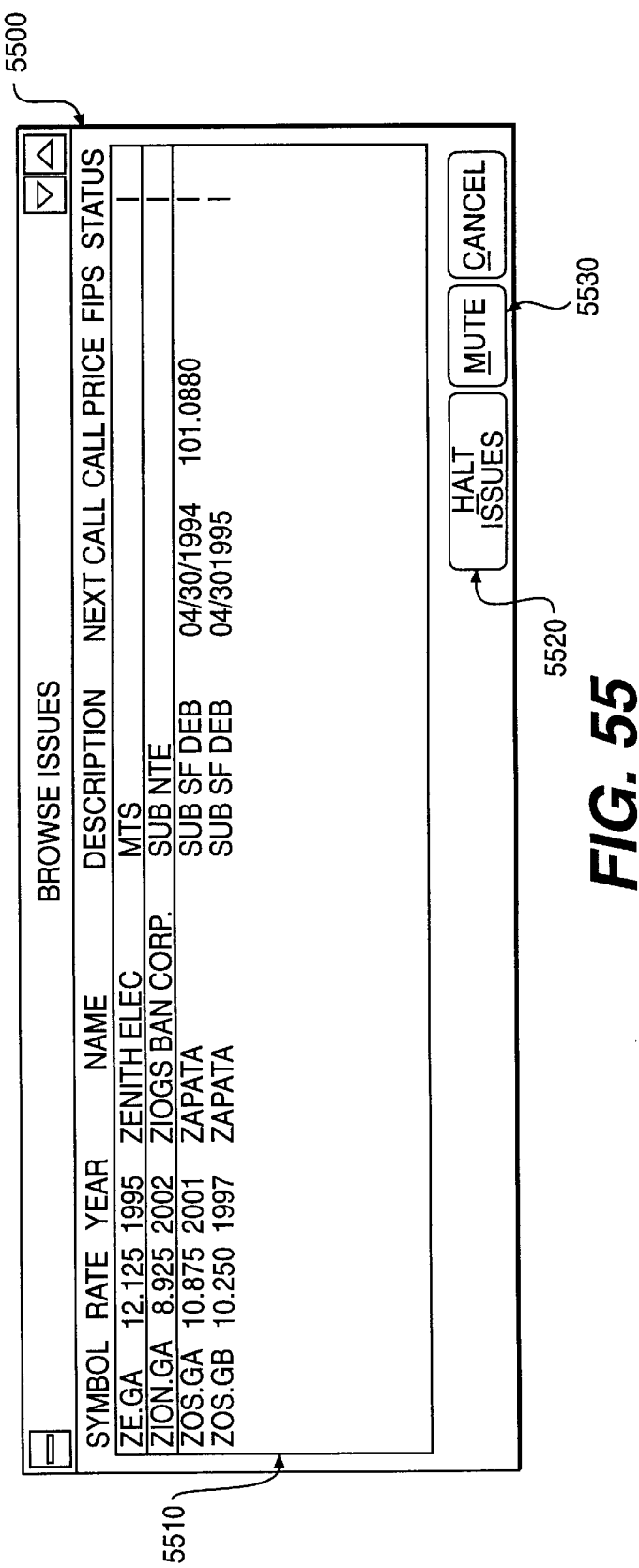
FIG. 55 is an illustration of an Administrative User's Browse Issues window.

If a user selects Browse Issues function 5410 from menu 5400, FIPS displays Browse Issues window 5500 as shown in FIG. 55. Window 5500 displays information about the issues in area 5510 including the symbol, rate, maturity year, name, description, next call date, the call price, and the FIPS status. If all of the issues cannot be displayed in one screen, the user may scroll through the list by selecting More button 5530.

The user may halt all activity on a particular issue by selecting it from the display area 5510 and then selecting Halt Issues button 5520.

Figure 56:
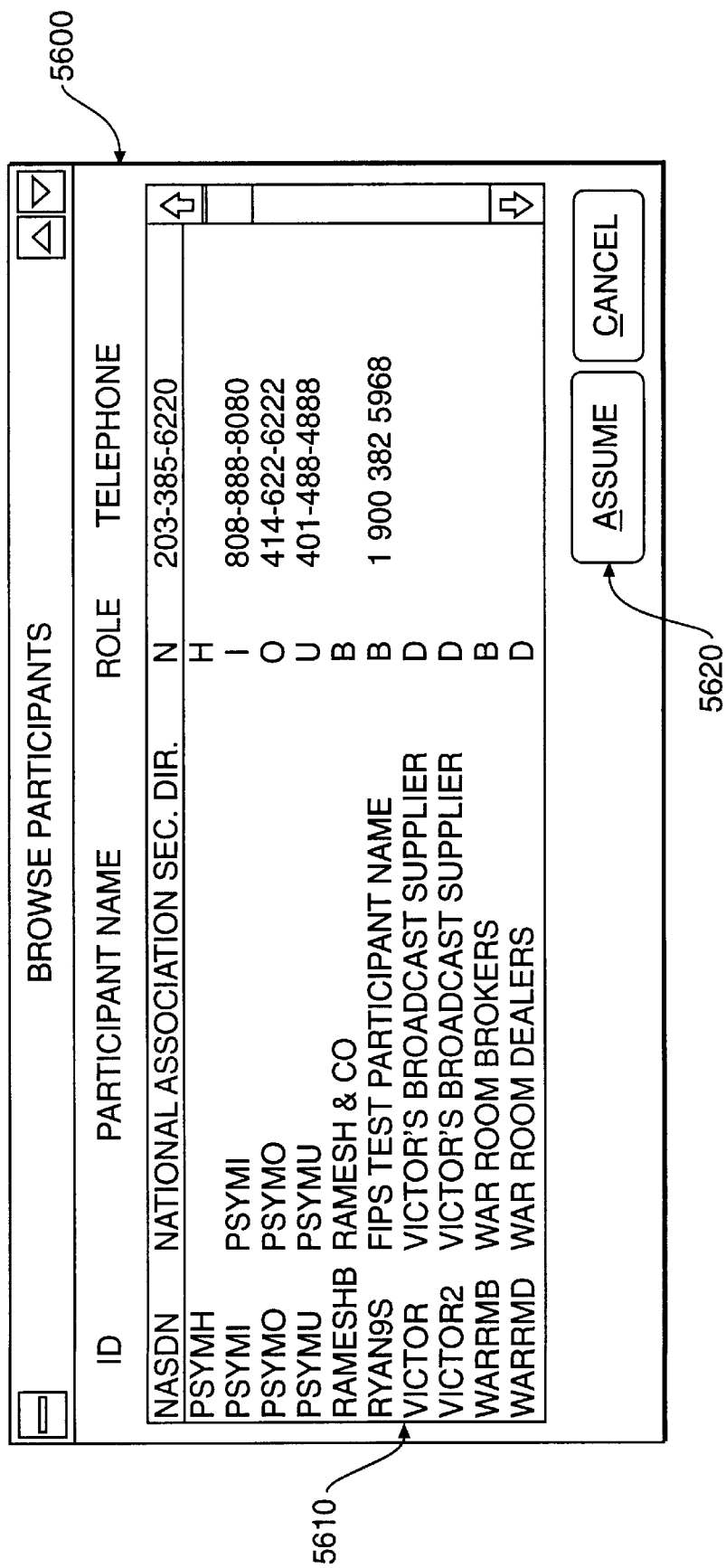
FIG. 56 is an illustration of an Administrative User's Browse Participant's window.

If a user selects the Browse Participants function 5420 from menu 5400 shown in FIG. 54, FIPS displays the Browse Participants window 5600 shown in FIG. 56. FIPS displays in area 5610 information about the participants including the participant ID, the name, the role, and the telephone number.

If a user selects a particular participant in area 5610 and then selects Assume button 5620, the user assumes the role of that participant.

VI. MESSAGE FORMATS

In addition to the functionality FIPS provides, FIPS has an infrastructure which lends itself to bond trading. The FIPS' infrastructure supports workstation access, and provides a message handling system with high integrity. The infrastructure also allows the configuration to be flexible enough to maximize system performance and support growth, provides fault tolerance to maximize availability, and provides brokers and dealers equal access.

As described earlier in the description of the FIPS architecture, the FIPS services of FIG. 1 are invoked by sending a message formatted in the IPC/UOW standard to FIPS host 210.

Broadcast messages are sent from the FIPS host 210 using the User Datagram Protocol (UDP). Only applications connected via the Internet Protocol will receive these messages; asynchronously attached applications cannot receive these messages. The broadcast messages are sent to a subnet address and are sequenced and time-stamped so the receiver can detect lost messages.

There are three types of messages: Transaction messages sent from an external application to the FIPS host application; Response messages returned from the FIPS host; and Broadcast messages sent from FIPS host.

Figure 57A:
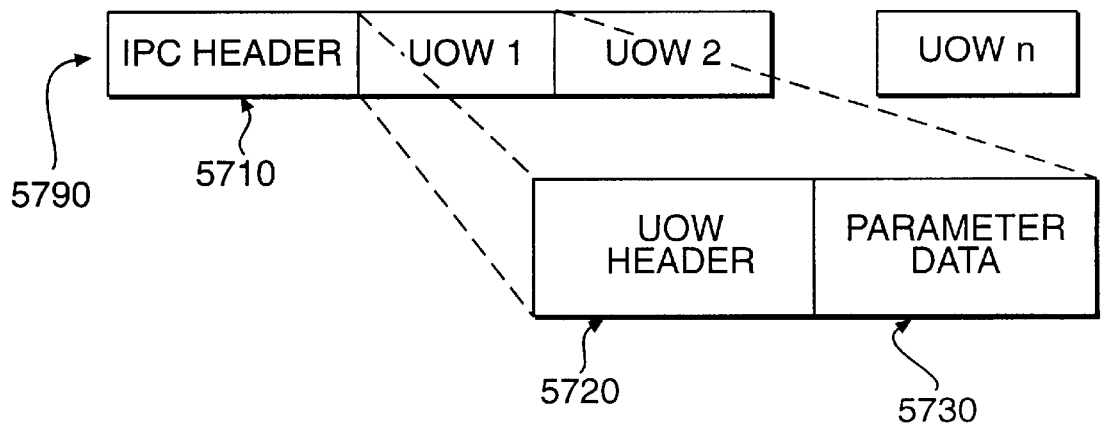
FIG. 57(a) is an illustration of an IPC message structure of a request message.
Figure 57B:
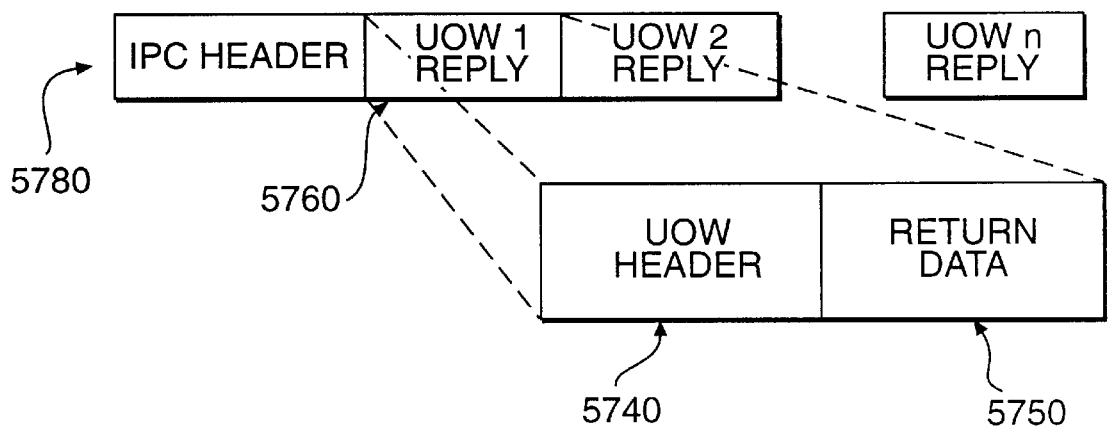
FIG. 57(b) is an illustration of an IPC reply message.

Messages, and their corresponding response, consist of an IPC header and one or more Units of Work (UOW) as shown in FIG. 57. The IPC header defines how to process the message as a whole. Each UOW is a specific application request.

Broadcast messages consist of a broadcast header and one UOW. The UOW formats for transaction and broadcast requests are the same.

In Transaction message formats, all requests and replies begin with a standard header, called the IPC-header. In a request message, an IPC header 7510 may be followed by one or more UOWs whose formats are operation dependent as shown in FIG. 57(*a*). Each UOW itself has a standard header 5720 which identifies its type of operation followed by parameter data 5730 for the particular operation.

In a reply message, the IPC header 5740 is followed by one UOWs for each UOW in the corresponding request as shown in FIG. 57. Each UOW reply consists of a UOW header 5740 identifying the UOW, followed by return data 5730 containing the information corresponding to the UOW.

When multiple UOWs occur in a message, each UOW must begin on an even byte boundary. Therefore, all UOWs have been defined as an even length. The order and number of UOWs depend on the application, but the order of the UOWs in the reply IPC message 5780 is the same as the order of the UOWs in its associated request IPC message 5790. FIG. 58 provides examples of the types of UOW codes.

CONCLUSION

A computerized trading platform to record trades and quotes has been described which provides transparency, reliability, and regulation to the trading of bond securities. The described system is a simple-to-use platform for users to post bond quotes for dissemination to other users.

Furthermore, the above-described invention provides a computerized trading platform for monitoring trade activities in the bond trading arena for compliance with SEC regulations.

It will be apparent to those skilled in the art that various modifications and variations can be made in the presently preferred embodiment of the FIPS system of the present invention without departing from the spirit or scope of the invention. Thus, it is intended that the present invention cover the modifications and variations of this invention provided they come within the scope of the appended claims and their equivalents.

It will be apparent to those skilled in the art that various modifications and variations can be made in the presently preferred embodiment of the FIPS system of the present invention without departing from the spirit or scope of the invention. Thus, it is intended that the present invention cover the modifications and variations of this invention provided they come within the scope of the appended claims and their equivalents.

What is claimed is:

1. A quote-driven system for reporting quotes for debt issues comprising:
    a host processing system containing issue databases having information about debt issues available to be traded, quote databases containing data about quotes of the debt issues available to be traded, and trade databases for maintaining data about trades; and
    a plurality of user stations, connected to the host processing system, for providing users an ability to access the issue and quote databases, said user stations including:
        display means for displaying data from the issue databases and the quote databases,
        input means for receiving user inputs about quotes of the issues available to be traded and identifying the data from the issue databases and the quote databases to be displayed on the display means for providing to the host processing system the user inputs,
        communications means for receiving the data to be displayed from the host processing system and for transmitting the user inputs to the host processing system; and
        trade input means for inputting data to the trade databases indicating that a trade was executed.

2. The system of claim 1, wherein the data contained in the quote databases comprise information about bid and offer prices for the debt issues,
    wherein the display means includes means for displaying data from the quote databases, and
    wherein the input means includes means for providing to the host processing system user inputs about quotes for the issues available to be traded and identifying the data from the quote databases to be displayed on the display means.

3. The system of claim 1 wherein
    the host processing system includes participant databases having information about the users of the system, and wherein
        the input means includes means for providing to the host processing system user inputs about the current user of the system.

4. The system of claim 1 or 2 wherein
    the display means includes means for displaying the data organized into markets which are predefined subsets of debt issues available to be traded, and wherein
    the input means includes means for providing to the host processing system user inputs identifying the markets.

5. In a quote-driven system for reporting quotes for debt issues having a plurality of user stations for receiving user inputs and requesting information and for providing the user inputs and requesting information to a host processor, the host processor comprising:
    a memory containing issue databases having information about debt issues available to be traded, quote databases containing data about quotes of the debt issues available to be traded, and trade databases for maintaining data about trades;
    communications means, coupled to the memory means, for receiving from the plurality of user stations user inputs about quotes for the issues to be traded, for receiving requests for data from the issue databases and the quote databases, for providing the requested data to the requesting one of the plurality of user stations, and for receiving from the plurality of user stations data indicating actual trade executions; and
    processing means, coupled to the communications means and the memory, for controlling the memory and the communications means, for transferring to the memory the received requests and user inputs, and for transferring to the communications means the requested data.

6. The host processor of claim 5, wherein the data contained in the quote databases comprise information about bid and offer prices for the debt issues.

7. The host processor of claim 5 further including participant databases having information about users of the system.

8. The host processor of claim 5, wherein trades of debt issues are made through broker's brokers, thereby preserving anonymity of dealers of the debt issues.

9. The host processor of claim 5, wherein the processing means does not match bid and offer prices to automatically execute trading of debt issues.

10. In a quote-driven system for reporting the trading of debt issues having a host processing system storing databases, a plurality of user stations, each connected to the host processing system and each comprising:

display means for displaying data from issue databases, quote databases, and trade databases in the host processing systems, the issue databases containing information about debt issues available to be traded, the quote databases containing data about bid and offer prices for the debt issues available to be traded, and the trade databases containing data about executed trades including high, low and average trade values for specific time periods;

input means for receiving user inputs about trades of the issues available to be traded and identifying the data from the issue databases and the quote databases to be displayed on the display means and providing to the host processing system the user inputs, said input means further including means for receiving user inputs about executed trades, and communications means for receiving the data to be displayed from the host processing system and for transmitting the user inputs to the host processing system.

11. The user stations of claim 10 wherein the display means of each user station includes
      means for displaying data from the quote databases, and wherein
   the input means includes
      means for providing to the host processing system user inputs about quotes for the issues available to be traded and identifying the data from the quote databases to be displayed on the display means.

12. The user stations of claim 10 wherein the host includes participant databases having information about users of the system, and wherein
      the input means includes means for providing to the host processing system user inputs about the current user of the system.

13. The user stations of claim 10, wherein trades of debt issues are made through broker's brokers, thereby preserving anonymity of dealers of the debt issues.

14. The user stations of claim 10, wherein the host processing system does not match bid and offer prices to automatically execute trading of debt issues.

15. The user stations of claim 10 or 11 wherein the display means includes means for displaying the data organized into markets which are predefined subsets of the debt issues available to be traded, and wherein
   the input means includes means for providing to the host processing system user inputs identifying the markets.

16. A method for reporting the trading of debt issues comprising the steps, executed by a data processing system and a plurality of user stations, of:

displaying at user stations data from issue databases, quote databases, and trade databases, the data from the issue databases containing information about debt issues available to be traded, the data from the trade databases containing data about bid and offer prices for the debt issues available to be traded, and the data from the trade databases containing data about executed trades;

receiving from user stations user inputs about quotes for the issues available to be traded;

receiving from user stations data about executed trades; and providing at the user stations identifications of the data from the issue databases and the quote databases to be displayed on the display means.

17. The method of claim 16 further including the steps of:

displaying data from the quote databases;
   providing to the data processing system user inputs about quotes for the issues available to be traded; and
   identifying the data from the quote databases to be displayed on the display means.

18. The method of claim 16 further including the step of providing to the data processing system user inputs about a current user of the system.

19. The system of claim 1, wherein trades of debt issues are made through broker's brokers, thereby preserving anonymity of dealers of the debt issues.

20. The system of claim 1, wherein the host processing system does not match bid and offer prices to automatically execute trading of debt issues.

21. The method of claim 16, wherein trades of debt issues are made through broker's brokers, thereby preserving anonymity of dealers of the debt issues.

22. The method of claim 16, wherein the data processing system does not match bid and offer prices to automatically execute trading of debt issues.

23. The method of claim 16 or 17, further including the steps of:

displaying the data organized into markets, and
   providing to the data processing system user inputs identifying the markets.

* * * * *